(12) United States Patent
Adjakple et al.

(10) Patent No.: US 9,693,366 B2
(45) Date of Patent: Jun. 27, 2017

(54) END-TO-END ARCHITECTURE, API FRAMEWORK, DISCOVERY, AND ACCESS IN A VIRTUALIZED NETWORK

(71) Applicant: INTERDIGITAL PATENT HOLDINGS, INC., Wilmington, DE (US)

(72) Inventors: Pascal M. Adjakple, Great Neck, NY (US); Peter S. Wang, E. Setauket, NY (US); Kai Liu, S. Huntington, NY (US); Ulises Olvera-Hernandez, Kirkland, CA (US); Saad Ahmad, Montreal (CA); Shamim Akbar Rahman, Cote St. Luc (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 312 days.

(21) Appl. No.: 14/039,133

(22) Filed: Sep. 27, 2013

(65) Prior Publication Data
US 2014/0086177 A1 Mar. 27, 2014

Related U.S. Application Data

(60) Provisional application No. 61/706,469, filed on Sep. 27, 2012, provisional application No. 61/730,834, filed on Nov. 28, 2012.

(51) Int. Cl.
*H04L 12/16* (2006.01)
*H04W 4/00* (2009.01)
(Continued)

(52) U.S. Cl.
CPC ............ *H04W 74/04* (2013.01); *H04L 67/10* (2013.01); *H04W 4/003* (2013.01); *H04W 12/08* (2013.01);
(Continued)

(58) Field of Classification Search
CPC ....... H04W 4/003; H04W 8/18; H04W 12/08; H04W 48/18; H04W 74/04; H04W 76/02; H04L 67/10
See application file for complete search history.

(56) References Cited

U.S. PATENT DOCUMENTS

2005/0083846 A1* 4/2005 Bahl .................... H04W 99/00
370/236
2005/0260997 A1* 11/2005 Korale et al. ............. 455/452.2
(Continued)

FOREIGN PATENT DOCUMENTS

EP        2434822 A1    3/2012
KR  10-2009-0066079 A   6/2009
(Continued)

OTHER PUBLICATIONS

3rd Generation Partnership Project (3GPP), SP-100891, "Interworking Between Mobile Operators Using the Evolved Packet System and Data Application Providers", 3GPP TSG SA Plenary Meeting #50, Istanbul, Turkey, Dec. 13-15, 2010, 5 pages.
(Continued)

*Primary Examiner* — Shaq Taha
*Assistant Examiner* — Ryan Kavleski
(74) *Attorney, Agent, or Firm* — Youngae Kim

(57) ABSTRACT

Systems, methods, and instrumentalities are disclosed such that a WTRU may obtain network operator agnostic wireless access for a service. The WTRU may receive a system information (SI) broadcast from a radio access network (RAN) node. The SI broadcast may indicate that an operator of the RAN node supports service-based network access. The WTRU may send a service request to a virtual service provider to request the service. The WTRU may receive a service response from the virtual service provider. The WTRU may receive a service response from the virtual service provider, the service response indicating a mobile
(Continued)

network operator (MNO) to use for obtaining the service and subscription information for accessing the MNO, wherein the MNO is different than the operator of the RAN node. The WTRU may access the MNO to obtain the service.

36 Claims, 40 Drawing Sheets

(51) Int. Cl.
　　H04W 74/04　　(2009.01)
　　H04W 12/08　　(2009.01)
　　H04W 48/18　　(2009.01)
　　H04L 29/08　　(2006.01)
　　H04W 8/18　　(2009.01)
　　H04W 88/10　　(2009.01)
(52) U.S. Cl.
　　CPC .............. *H04W 48/18* (2013.01); *H04W 8/18* (2013.01); *H04W 88/10* (2013.01)

(56) References Cited

U.S. PATENT DOCUMENTS

| | | | |
|---|---|---|---|
| 2009/0042601 A1* | 2/2009 | Wang et al. | 455/553.1 |
| 2010/0017861 A1* | 1/2010 | Krishnaswamy et al. | 726/7 |
| 2013/0107825 A1* | 5/2013 | Cherian et al. | 370/329 |
| 2013/0183991 A1* | 7/2013 | Bosch et al. | 455/450 |
| 2013/0225123 A1* | 8/2013 | Adjakple | G06Q 20/322 455/406 |
| 2013/0303203 A1* | 11/2013 | Wang | H04W 68/00 455/458 |
| 2015/0103769 A1* | 4/2015 | Kaichis | H04W 16/04 370/329 |

FOREIGN PATENT DOCUMENTS

| | | |
|---|---|---|
| WO | WO 2010/008635 A1 | 1/2010 |
| WO | WO 2011/016947 A2 | 2/2011 |

OTHER PUBLICATIONS

3rd Generation Partnership Project (3GPP), SP-110350, "Interworking Between Mobile Operators Using the Evolved Packet System and Data Application Providers", TSG SA Meeting #51, Bratislava, Slovakia, Jun. 6-8, 2011, pp. 1-6.

3rd Generation Partnership Project (3GPP), Tr 22.852 V0.3.0, "Technical Specification Group SA, Study on RAN Sharing Enhancements (Release 12)", Aug. 2012, pp. 1-22.

3rd Generation Partnership Project (3GPP), TR 33.919 V8.0.0, "Technical Specification Group Services and System Aspects, 3G Security, Generic Authentication Architecture (GAA), System Description (Release 8)", Dec. 2008, pp. 1-17.

3rd Generation Partnership Project (3GPP), TS 22.228 V12.3.0, "Technical Specification Group Services and System Aspects, Service Requirements for the Internet Protocol (IP) Multimedia Core Network Subsystem (IMS), Stage 1 (Release 12)", Sep. 2012, pp. 1-43.

3rd Generation Partnership Project (3GPP), TS 23.251 V11.0.0, "Technical Specification Group Services and System Aspects, Network Sharing, Architecture and Functional Description (Release 11)", Sep. 2011, pp. 1-28.

3rd Generation Partnership Project (3GPP), TS 32.240 V11.4.0, "Technical Specification Group Services and System Aspects, Telecommunication Management, Charging Management, Charging Architecture and Principles (Release 11)", Jun. 2012, pp. 1-45.

3rd Generation Partnership Project (3GPP), TS 33.102 V8.6.0, "Technical Specification Group Services and System Aspects, 3G Security, Security Architecture (Release 8)", Mar. 2010, pp. 1-68.

3rd Generation Partnership Project (3GPP), TS 33.221 V8.0.0, "Technical Specification Group Services and System Aspects, Generic Authentication Architecture (GAA), Support for Subscriber Certificates (Release 8)", Dec. 2008, pp. 1-25.

3rd Generation Partnership Project (3GPP), TS 33.401 V8.8.0, "Technical Specification Group Services and System Aspects, 3GPP System Architecture Evolution (SAE), Security Architecture (Release 8)", Jun. 2011, pp. 1-99.

3$^{rd}$ Generation Partnership Project (3GPP), TR 22.951 V10.0.0, 3$^{rd}$ Generation Partnership Project; Technical Specification Group Services and System Aspects; Service aspects and requirements for network sharing (Release 10), Mar. 2011, pp. 1-19.

Cox, Preston A., "Mobile Cloud Computing: Devices, Trends, Issues, and the Enabling Technologies", IBM, developerWorks, Mar. 11, 2011, pp. 1-9.

"3rd Generation Partnership Project; Technical Specification Group Services and System Aspects; Generic Authentication Architecture (GAA); Generic Bootstrapping Architecture (GBA) (Release 10)", 3GPP TS 33.220 V10.1.0, Mar. 2012, 75 pages.

\* cited by examiner

SD = Security Domain
OP = OPerator

SD = Security Domain
OP = OPerator

SIM: Service Identity Module or Subscriber Identity Module
VHE: Virtualization Stratum Home Environment

END-TO-END ARCHITECTURE, API FRAMEWORK, DISCOVERY, AND ACCESS IN A VIRTUALIZED NETWORK

CROSS REFERENCE TO RELATED APPLICATIONS

This application claims the benefit of U.S. Provisional Patent Application No. 61/706,469, filed on Sep. 27, 2012, and U.S. Provisional Patent Application No. 61/730,834 filed Nov. 28, 2012, the contents of which are hereby incorporated by reference herein.

BACKGROUND

The delivery of services through both fixed and mobile networks is often based on one of two fundamental models: operator-specific access and operator-independent access. For example, operator-specific access may be associated with the delivery of one or more services where network access is fixed to a specific network operator through one or more of a subscription-based scheme (e.g., user holds a subscription to an Internet Service Provider (ISP); user holds a subscription to a Mobile Network Operator (MNO)) and/or through a pre-paid-based scheme (e.g., user buys credit that can be used a posteriori to access services provided by a service provider such as a MNO or/and ISP). Operator-independent service delivery may be associated with the delivery of one or more services where the services are provided independently from the network operator and/or through multiple service providers. For example, social Networking (e.g., Facebook, Twitter, etc.), mailing services (e.g., Google Mail, Yahoo Mail, etc.), stock quoting services, weather services, WTRU-based location services (e.g., location services provided by Android), and/or the like may be examples of operator-independent services.

Today's model may rely on a WTRU accessing physical resources to access services or subscriptions when using whether the operator-specific access or operator-independent access. Additional techniques may be specified to provide a wider or more diverse means of accessing resources or services.

SUMMARY

Systems, methods, and instrumentalities are disclosed such that a WTRU may obtain network operator agnostic wireless access for a service. The WTRU may select a virtual network (VN) and may indicate the selected VN in a PreAttach message. The PreAttach message may include one or more of a VN capability, or a VN identifier.

The WTRU may receive a system information (SI) broadcast from a radio access network (RAN) node. The SI broadcast may indicate that an operator of the RAN node supports service-based network access. The WTRU may send a service request to a virtual service provider to request the service. The service request may be sent as part of an attach request (e.g., an access cloud service type). The attach request may include an indication to support dynamic CN extension. The service request may include one or more of a service type, a service duration, a quality of service (QoS), a validation method, or a payment method. The service request may include a global Access Point Name (APN) (e.g., a network identifier, a virtual network (VN) identifier, or an operator identifier, etc.).

The WTRU may receive a service response from the virtual service provider. The service response may be received in a detach message. The service response may indicate a mobile network operator (MNO) to use for obtaining the service and subscription information for accessing the MNO. The MNO may be different than the operator of the RAN node. The WTRU may lack a subscription with the operator of the RAN node or the MNO.

The WTRU may attach to the RAN node in a limited state in order to determine an operator network to use for accessing the service. The limited state may limit at least one of an amount of time the WTRU that may be allowed to be attached, a destination the WTRU may be allowed to access, a priority associated with requests sent by the WTRU, or one or more bearer parameters for the WTRU. The WTRU may authenticate with the MNO, e.g., based on the subscription information received in the service response.

The WTRU may establish a first network connection using a first radio access technology. The WTRU may utilize the first network connection to communicate with a server virtualizing resources for a second radio access technology utilized by the WTRU.

The WTRU may be a light WTRU, which may communicate with a cloud WTRU. The cloud WTRU may perform a processor or memory intense function (e.g., re-authentications, temporarily storing videos, etc.).

BRIEF DESCRIPTION OF THE DRAWINGS

A more detailed understanding may be had from the following description, given by way of example in conjunction with the accompanying drawings.

DETAILED DESCRIPTION OF ILLUSTRATIVE EMBODIMENTS

A detailed description of illustrative embodiments will now be described with reference to the various figures. Although this description provides a detailed example of possible implementations, it should be noted that the details are intended to be exemplary and in no way limit the scope of the application. In addition, the figures may illustrate flow charts, which are meant to be exemplary. Other embodiments may be used. The order of the messages may be varied where appropriate. Messages may be omitted if not needed, and additional flows may be added.

Figure 1A:
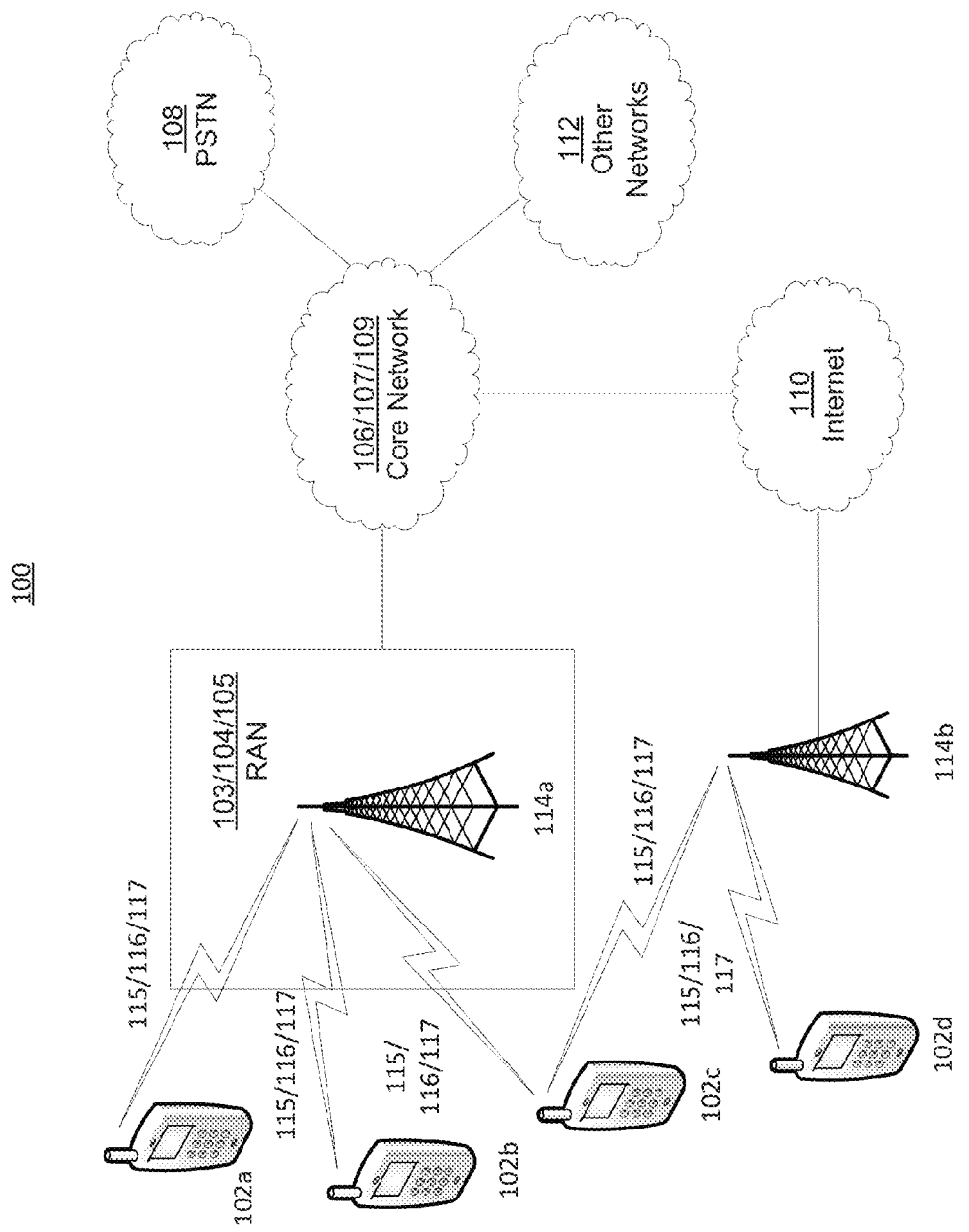
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
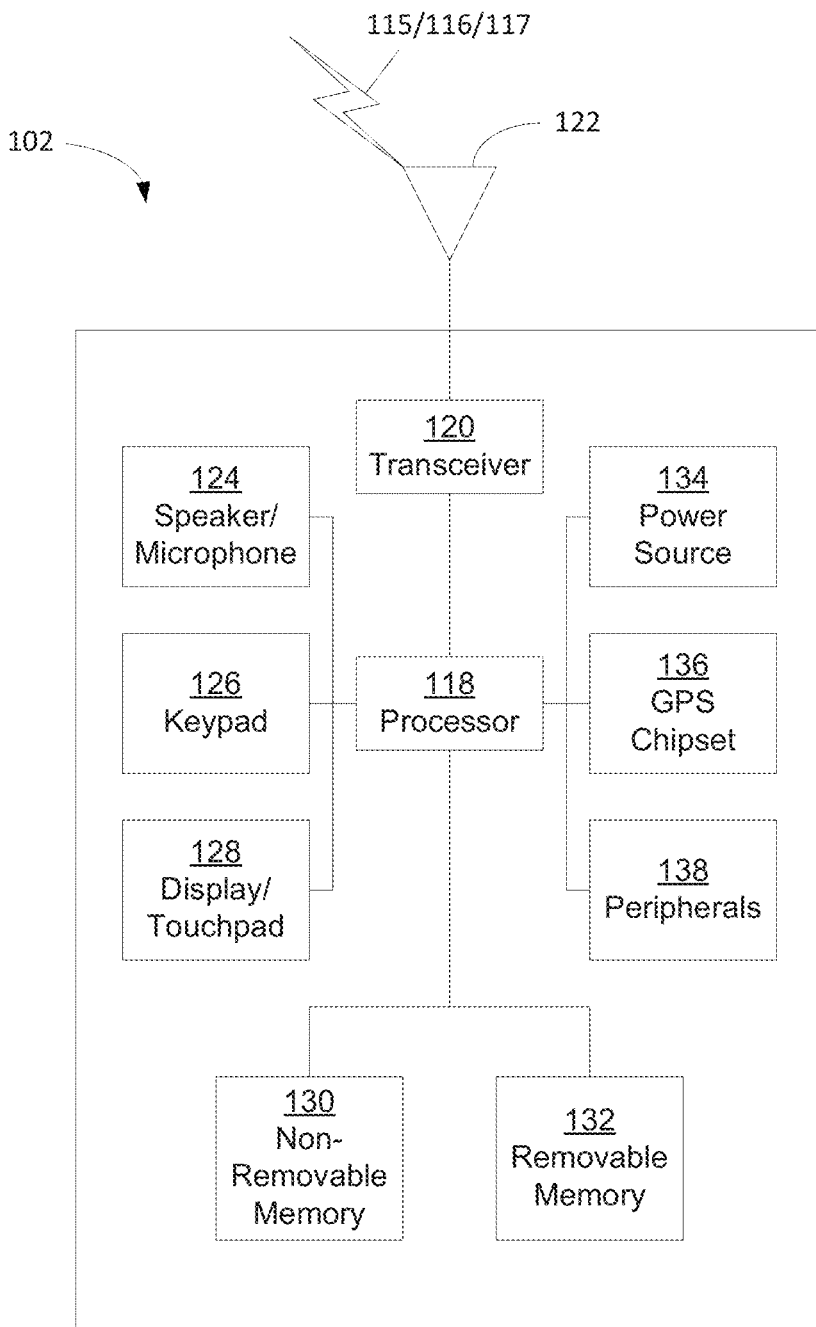
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
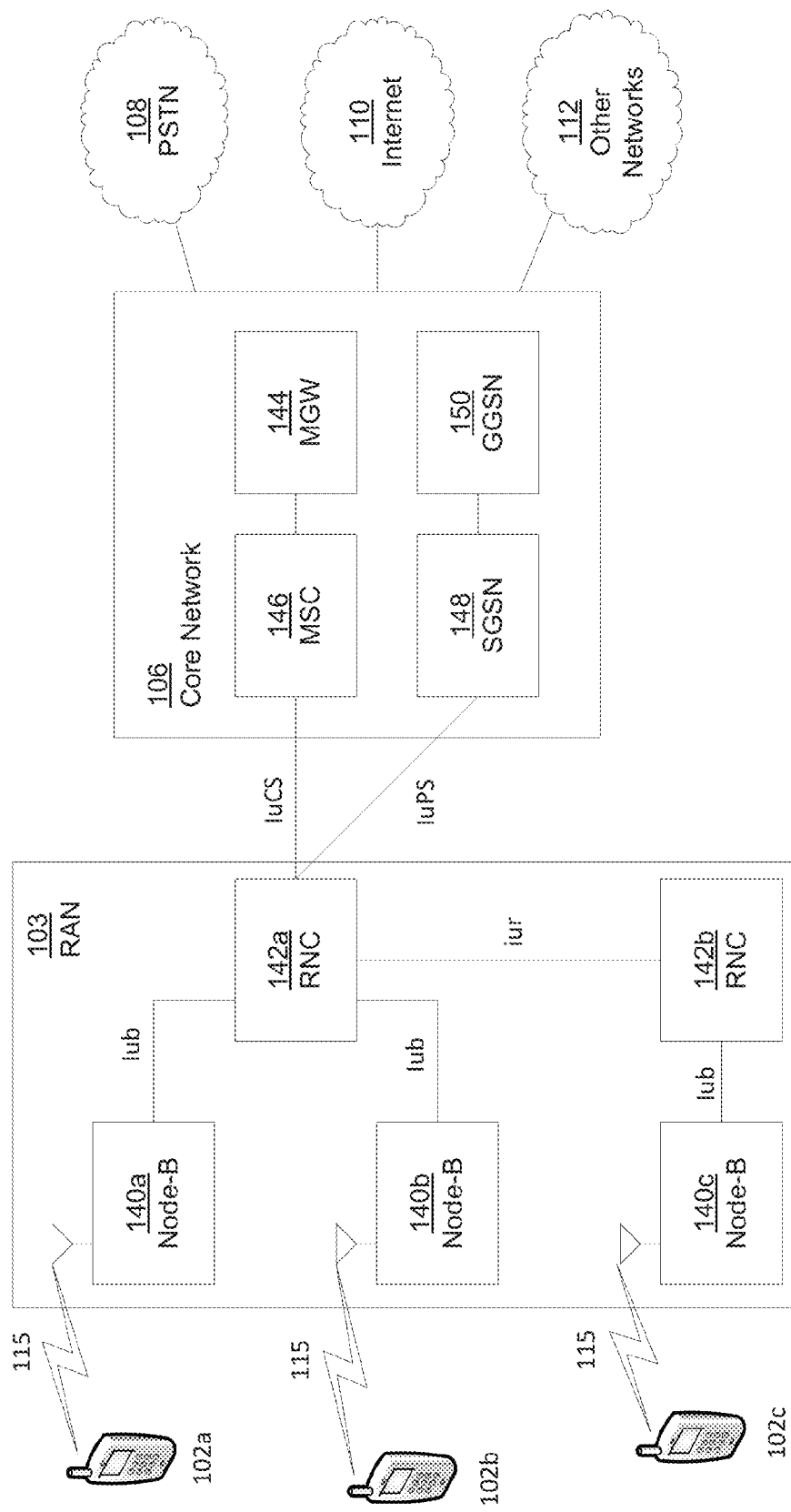
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 1D:
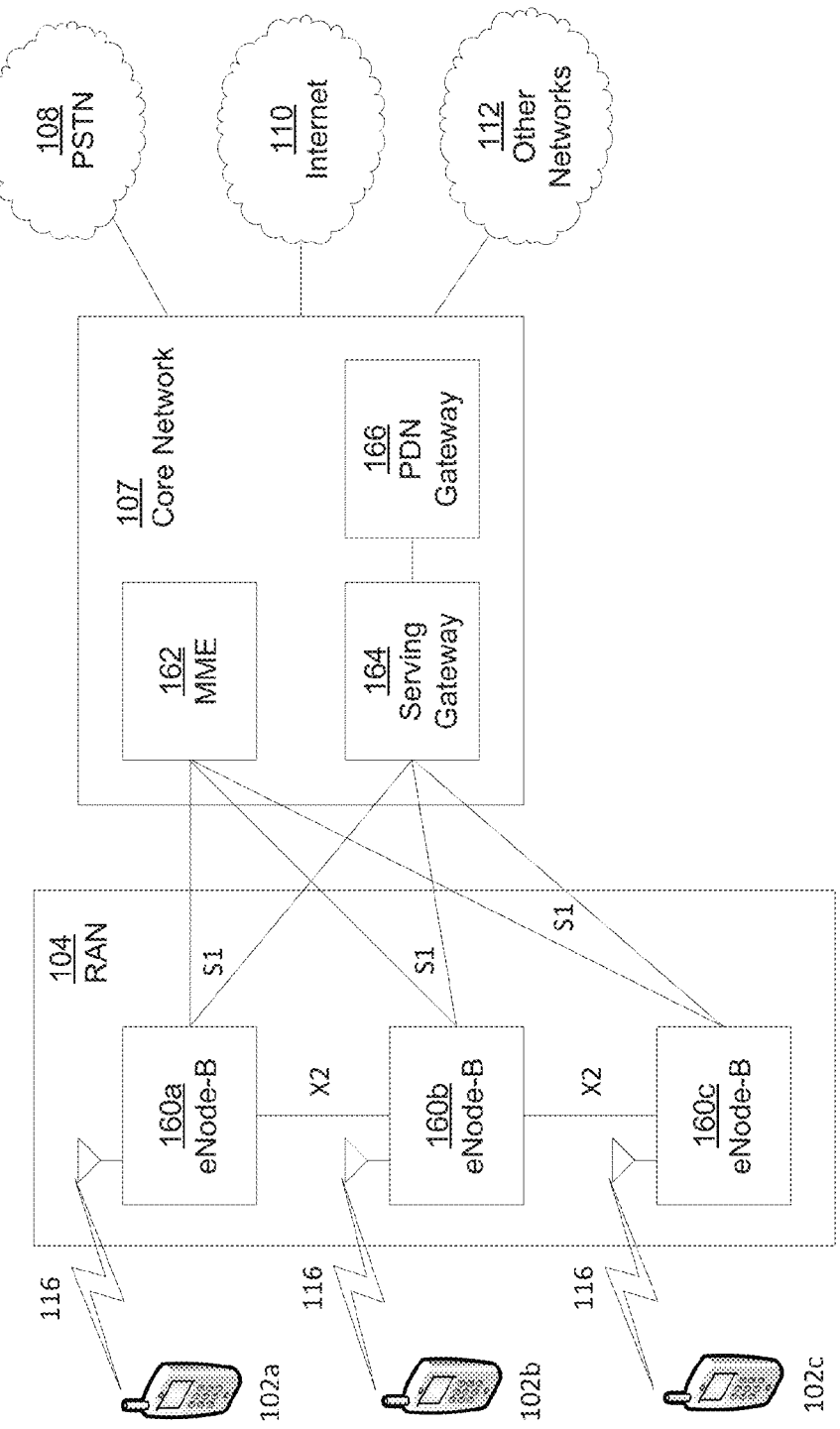
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102*a*, 102*b*, 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
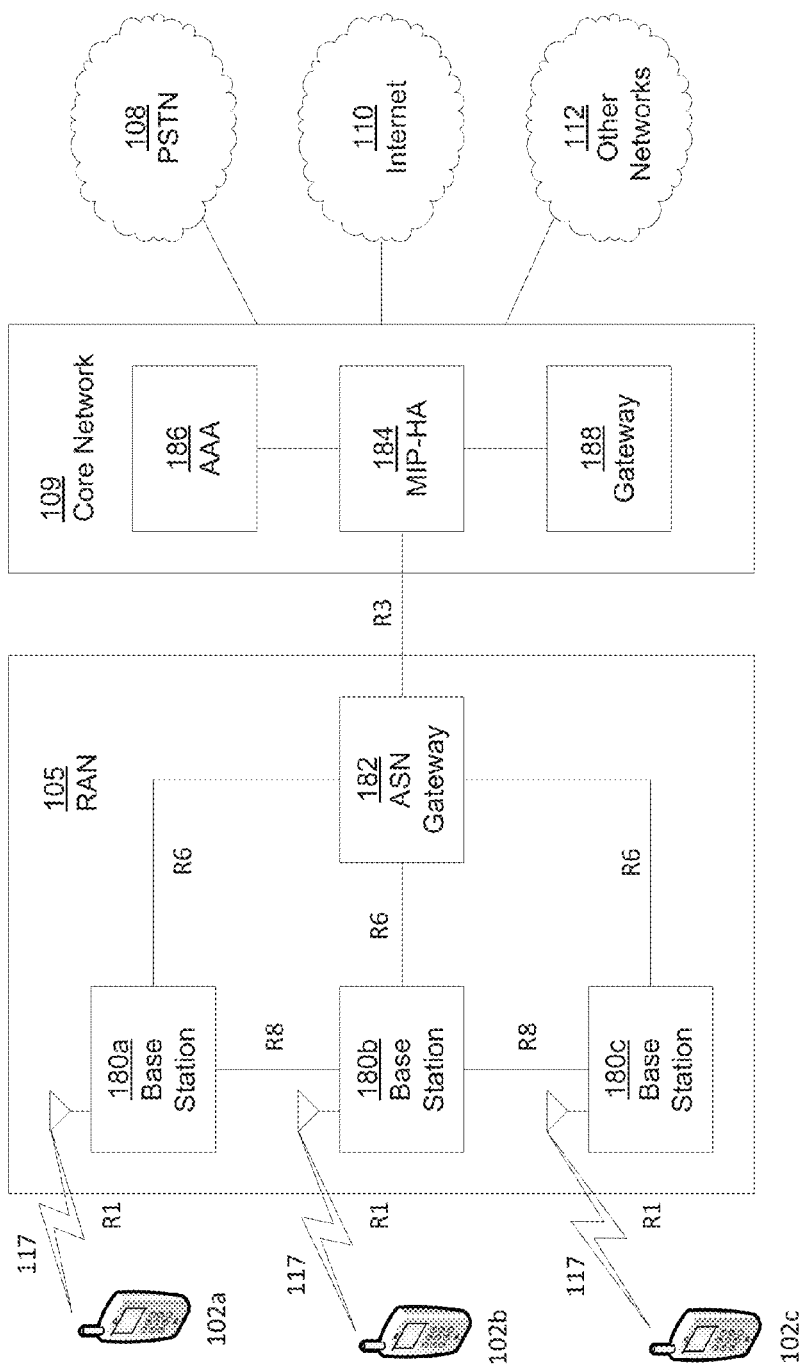
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The delivery of services through fixed and/or mobile networks may be based on one or more models, e.g., operator-specific access, operator-independent access. For example, operator-specific access may be associated with the delivery of one or more services where network access is fixed to a specific network operator through one or more of a subscription-based scheme (e.g., user holds a subscription to an Internet Service Provider (ISP), a user may hold a subscription to a Mobile Network Operator (MNO)) and/or through a pre-paid-based scheme (e.g., user buys credit that can be used a posteriori to access services provided by a service provider such as a MNO or/and ISP). Operator-independent service delivery may be associated with the delivery of one or more services where services may be provided independently from the network operator and/or through multiple service providers. For example, social Networking (e.g., Facebook, Twitter, etc.), mailing services (e.g., Google Mail, Yahoo Mail, etc.), stock quoting services, weather services, WTRU-based location services (e.g., location services provided by Android), and/or the like may be examples of operator-independent services.

Under these models in certain circumstances the user may enter into a service contract and/or pay for services that may not have received. The user may pay for services that may potentially not be used (e.g., pre-paid services that may not be redeemed). The pre-paid model may be considered an attempt to provide a certain degree of freedom (or feeling of freedom) for end-users who do not want to commit to the liabilities of a service agreement. The end-user may achieve this freedom at the expense of paying costly services in advance of any use.

When utilizing the pre-paid services, an end-user may purchase a Universal Integrated Circuit Card (UICC) loaded with subscription applications such as SIM and/or USIM, which may provide the user authentication credentials and/or an identity to access the network. Such UICC information may tie the user to the network provider that issues the UICC. In addition, pre-paid credits may be subjected to an expiry date, which may lead to subscribers losing money as unused credit eventually expires.

In addition, since there are many services decoupled from the Network Operator (e.g., so called over-the-top services such as Skype voice services and/or the like), the particular services available to a given user may or may not be available on a particular network. Decoupled services also pose a problem for network operators since network operations may act as a pipeline that carries services that may clutter their networks without an additional benefit other than charging for the use of the pipe.

A user may be tied to a network provider limiting the ability of the user to freely choose services and/or tariffs, e.g., regardless of the service model. The user may be unable to pay solely for the consumed service at the time the service is consumed. This is often still the case today despite the move by many network operators toward more network sharing model to save on network deployment and operation cost.

Figure 2:
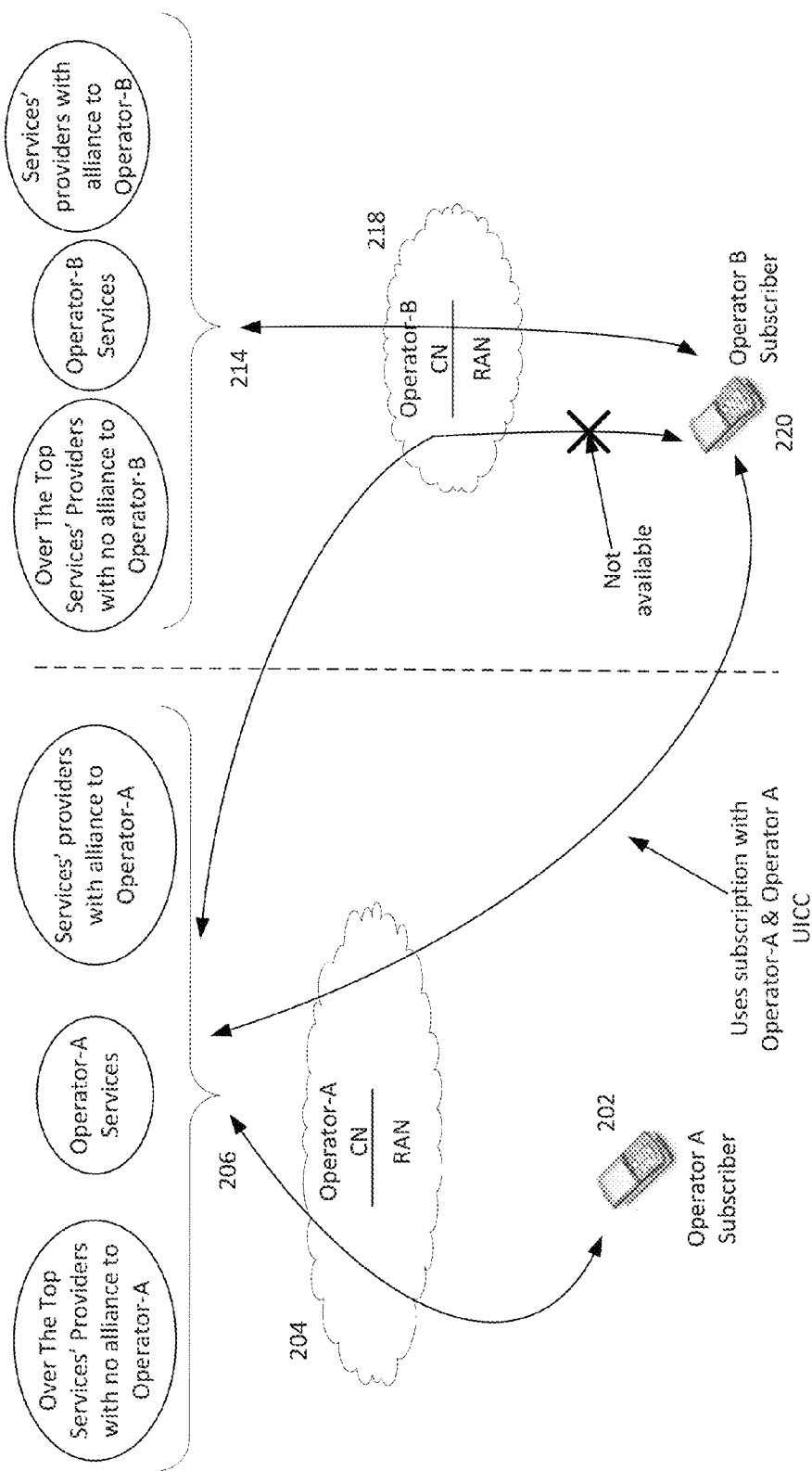
FIG. 2 illustrates an example of a service paradigm without network sharing.
Figure 3:
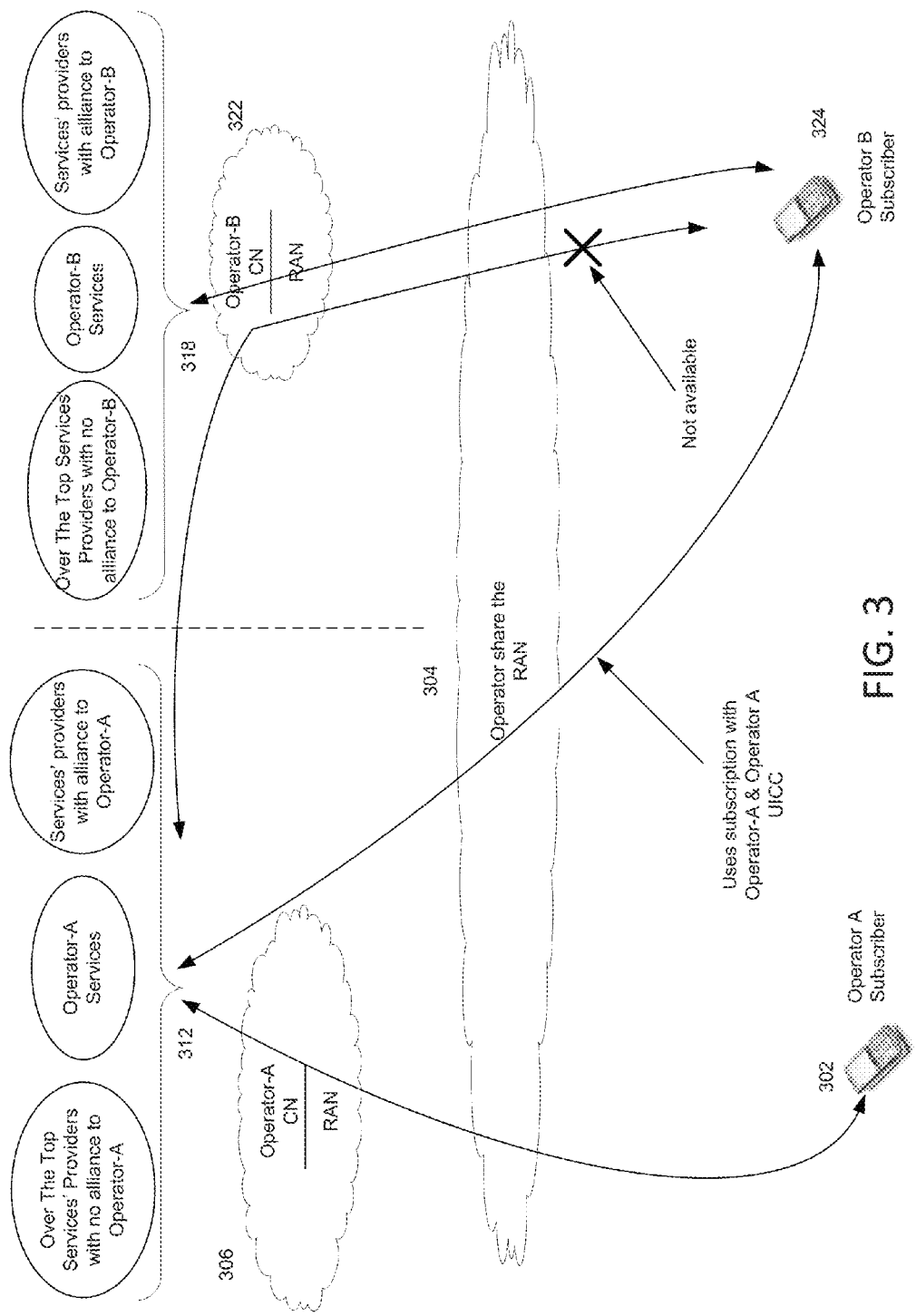
FIG. 3 illustrates an example of a service paradigm with radio access network sharing.
Figure 4:
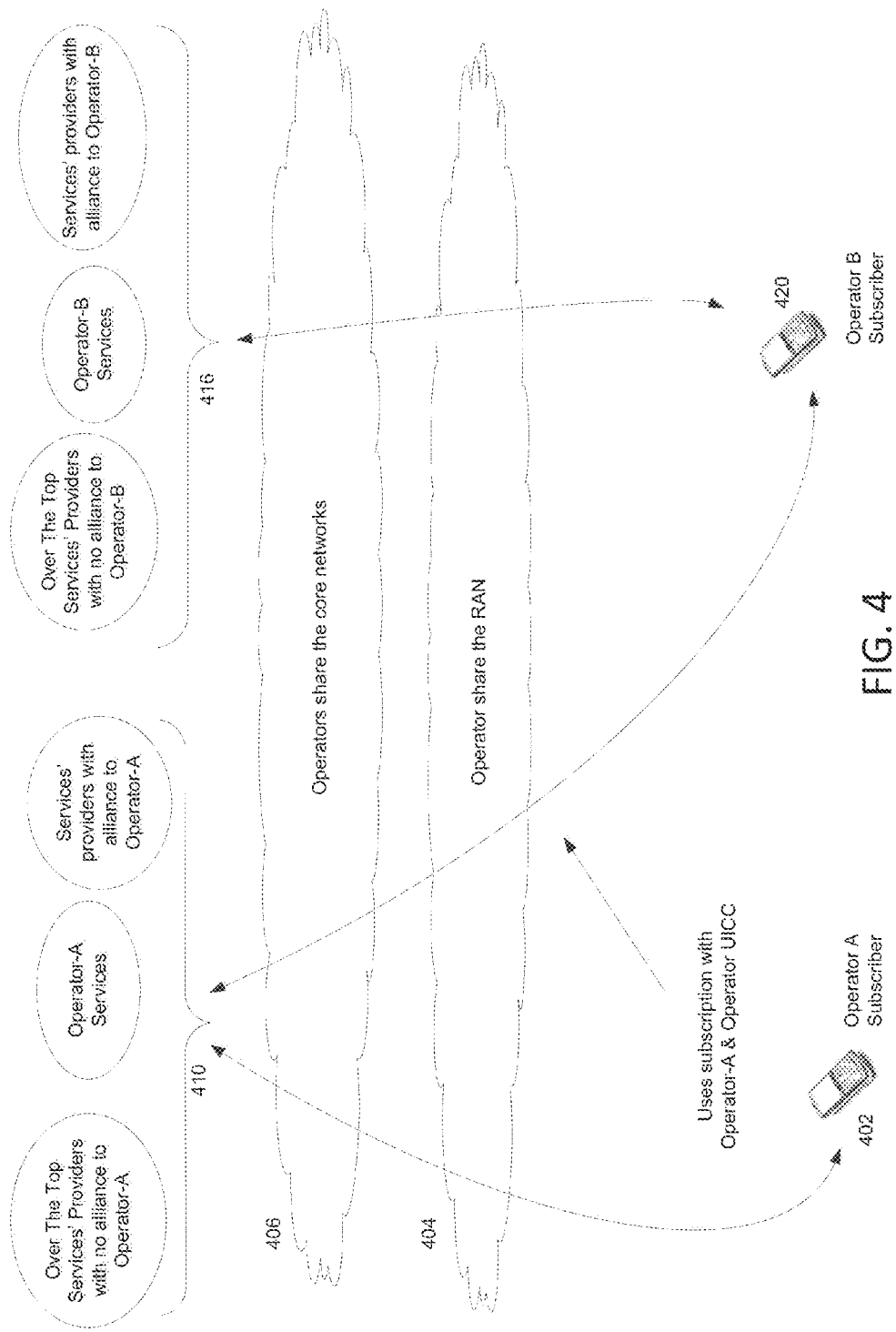
FIG. 4 illustrates an example of a service paradigm with radio access network sharing and core network element sharing.
Figure 5:
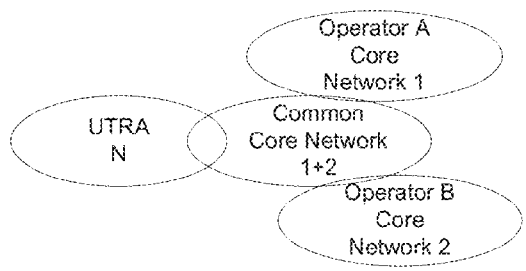
FIG. 5 illustrates an example of two operators sharing Universal Terrestrial Radio Access Network (UTRAN).
Figure 6:
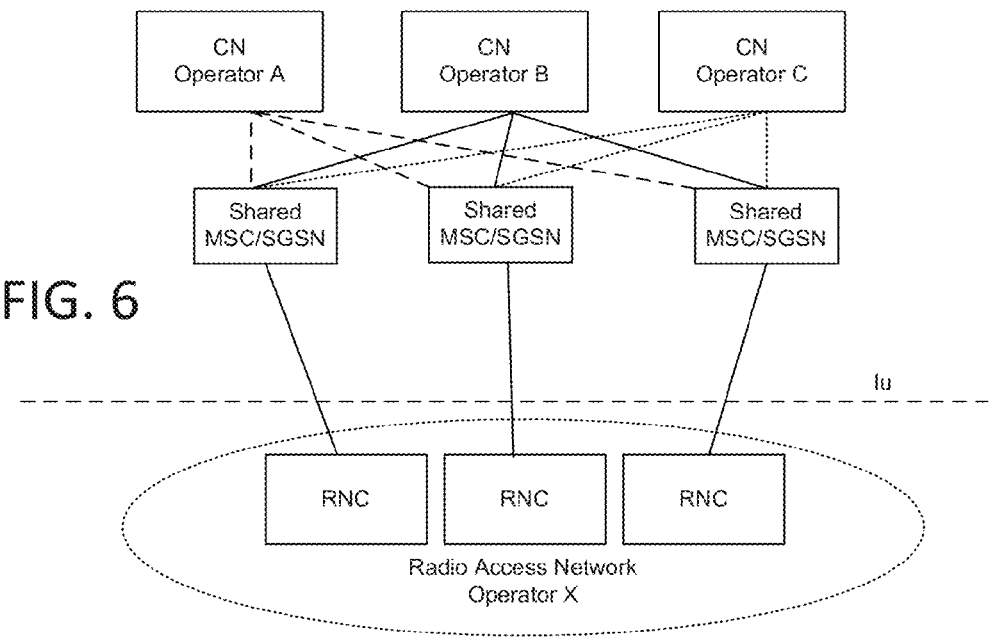
FIG. 6 illustrates an example of a Gateway Core Network (GWCN) configuration for network sharing.
Figure 7:
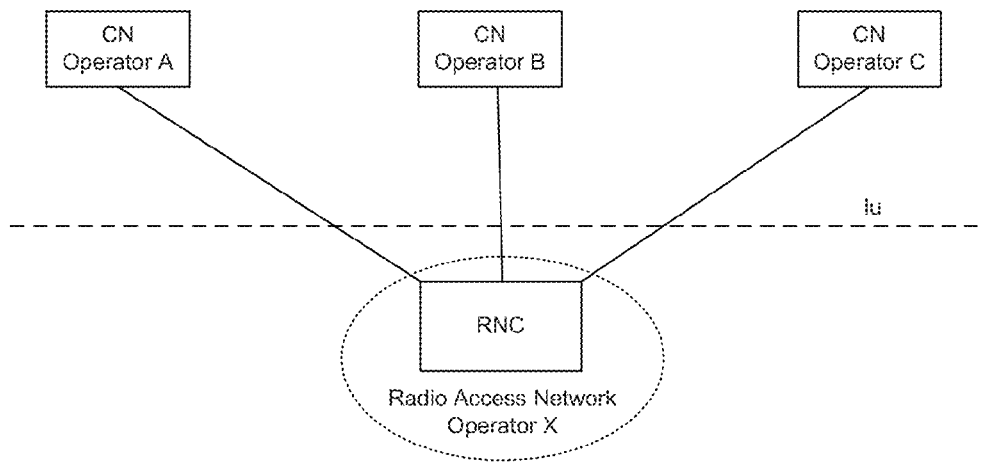
FIG. 7 illustrates an example of a Multi-Operator Core Network (MOCN) in which multiple CN nodes may be connected to the same RNC and the CN nodes may be operated by different operators.
Figure 8:
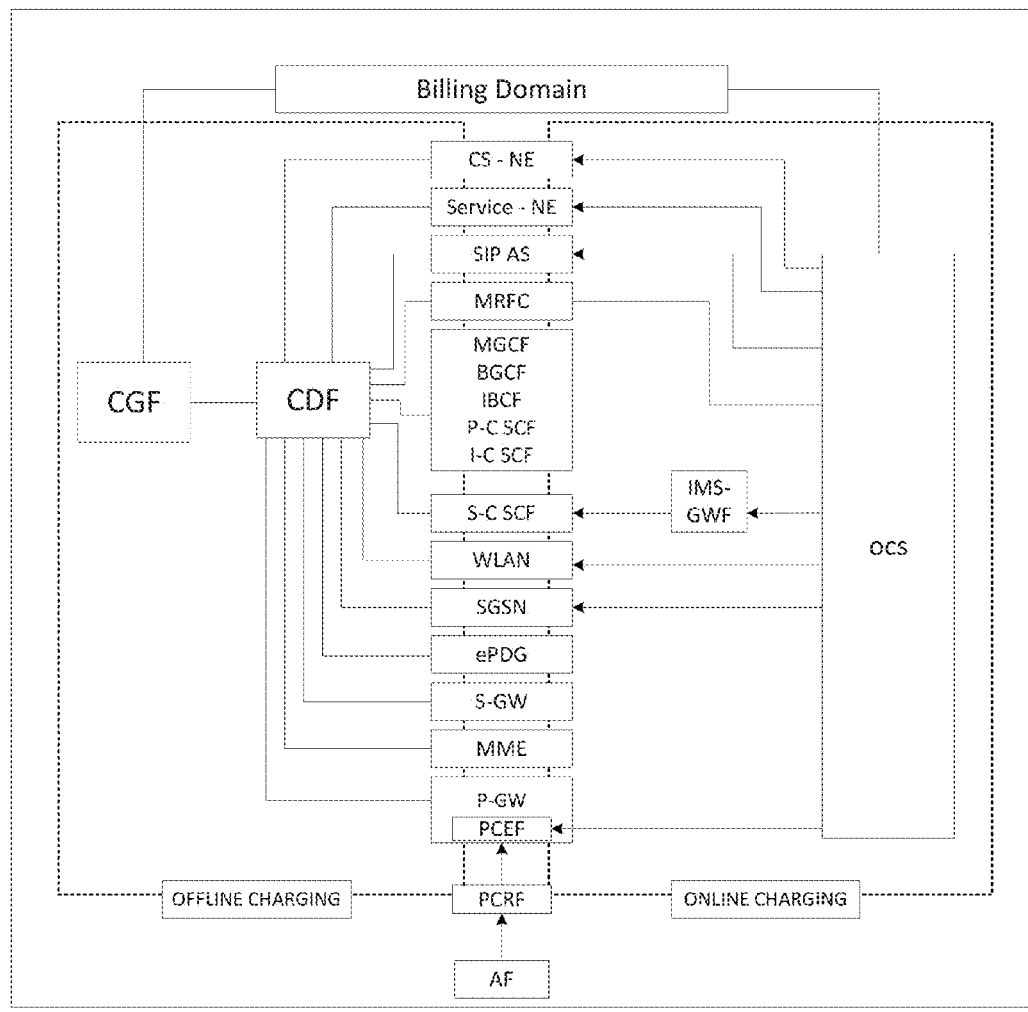
FIG. 8 illustrates an example of a 3GPP logical ubiquitous charging architecture and information flow.
Figure 10:
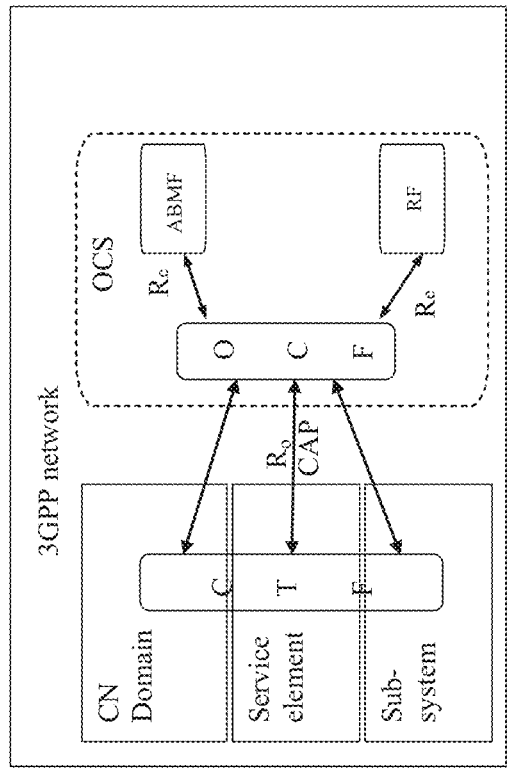
FIG. 10 illustrates an example of a 3GPP logical ubiquitous online charging architecture.
Figure 9:
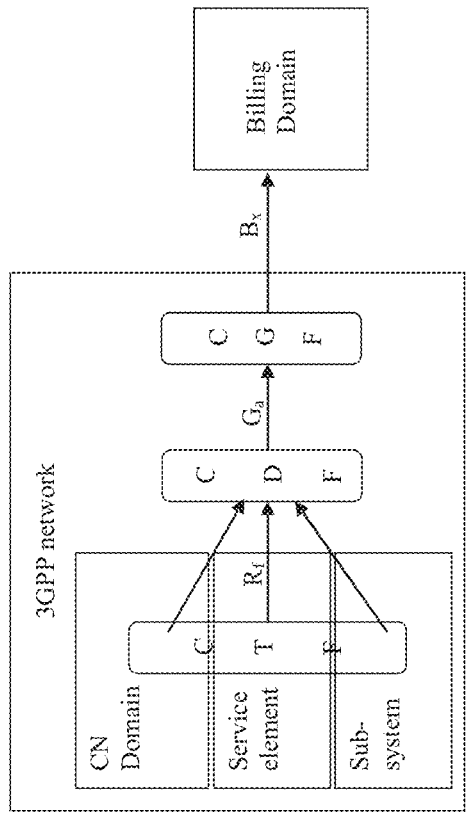
FIG. 9 illustrates an example of a 3GPP logical ubiquitous offline charging architecture.

The FIG. 2, FIG. 3, and FIG. 4 illustrate examples of service models where the users may be locked into an agreement with a given operator. For example, FIG. 2 illustrates an example of a service paradigm without network sharing. As illustrated in FIG. 2, the Operator A subscriber 202 may be allowed to access Operator A's services 206, e.g., via Operator A's RAN 204. Operator B subscriber 220 may access Operator B's services 214, e.g., via Operator B's RAN 218. The Operator B subscriber 220 may be able to access Operator A's services 206, e.g., Operator A's RAN 204, provided the Operator B subscriber 220 has a subscription with Operator A. The Operator B's subscriber 220 may not be allowed to access Operator-A's services 206, e.g., via Operator's B's RAN 218. FIG. 3 illustrates example of a service paradigm with radio access network sharing. As illustrated in FIG. 3, Operator A's subscriber 302 and Operator B's subscriber 324 may access Operator A's services 312 and Operator B's services 318, e.g., via a shared RAN 304, Operator A's core network (CN) 306, and/or Operator B's CA 322. As illustrated in FIG. 3, the Operator B subscriber 324, for example, may not be allowed to access Operator A's services 312, e.g., via Operator B's CN 322. FIG. 4 illustrates an example of a service paradigm with radio access network sharing and core network element sharing. As illustrated in FIG. 4, the Operator A's subscriber 402 and Operator B's subscriber 420 may access Operator A's services 410 and Operator B's services 416, e.g., via a shared RAN 404, and/or a shared CN 406. FIG. 5 illustrates an example of two operators sharing UTRAN. FIG. 6 illustrates an example of a Gateway Core Network (GWCN) configuration for network sharing (e.g., besides shared radio access network nodes, the core network operators may share core network nodes). FIG. 7 illustrates an example of a Multi-Operator Core Network (MOCN) in which one or more CN nodes (e.g., Operator A, Operator B, Operator, etc.) may be connected to the same RNC and the CN nodes may be operated by different operators. FIG. 8 illustrates an example of a 3GPP logical ubiquitous charging architecture and information flow. FIG. 9 illustrates an example of a 3GPP logical ubiquitous offline charging architecture. FIG. 10 illustrates an example of a 3GPP logical ubiquitous online charging architecture.

In one or more core network sharing architectures, there may be network entities that are not shared. For example, entities such as the PCRF (Policy and Charging Rules Function), the HSS (Home Subscriber Server) which may include the HLR (Home Location Register), the AuC (Authentication Center), and/or the EIR (Equipment identity register) may be unshared (e.g., for billing and policy purposes).

Sharing networks and network infrastructure has become a very important part of 3GPP systems. For example, sharing networks and network infrastructure may be a way for operators to share the heavy deployment costs for mobile networks, especially in the roll-out phase. One or more network-sharing scenarios may be provided, e.g., depending on different operator strategies, and/or based on rules and legislation in different countries. 3GPP systems may not be fully designed for network sharing between different operators, although some support for network sharing exists since the 3GPP Release 99. For example, the equivalent PLMN feature in Release 99 allows operators to share a common UTRAN, with certain parts of the core networks also shared between the operators.

In the mobile telephony marketplace, functionality that may enable various forms of network sharing may be provided. For example, one or more functions for network sharing not included in prior to Release 6 in 3GPP UTRAN based access networks, before Release 8 in 3GPP E-UTRAN based access networks, and before Release 10 in 3GPP GERAN based access networks may be provided.

There are numerous examples of scenarios wherein network sharing may be utilized. For example, network sharing scenarios may include one or more of multiple core networks sharing a common radio access network, geographically split network sharing, network sharing over common geographical area, common spectrum network sharing, multiple radio access networks sharing a common core network, and/or the like. FIG. 6 and FIG. 7 illustrate example network architectures that may be utilized to support one or more of the network sharing scenarios.

For the Evolved Packet System (EPS), the packet-switched (PS) domain of FIG. 6 and FIG. 7 may be relevant to EPS network resource sharing. For E-UTRAN access FIG. 6 and FIG. 7 may be applicable, although an MME may replace the SGSN, an eNodeB may replace the RNC, and the S1 reference point may replace the Iu interface.

Support for interworking between Mobile Operators, e.g., using the Evolved Packet System and Data Application Providers (MOSAP) may be provided. For example, mobile operators may increase flexibility of data services delivery on different devices. The data services may be hosted by the mobile operators in their data centers within 3GPP domain and/or may be hosted by 3rd party data application providers that could be outside of the mobile operator domain. For example, individual mobile operators may negotiate agreements with data application providers. These agreements may lead to proprietary additional functionality in 3GPP networks that may result in non-standard 3GPP interfaces. With the advent of various models for services delivery (e.g., cloud computing, application stores, etc.), mobile operators may attempt to minimize upgrades to the network and associated backend integration.

The mobile operator may have the opportunity to explore various charging models in this interworking scenario with data service providers. For example, sample services/capabilities that mobile operators provide to data application providers may be one or more of customized billing/charging, promotional services, group addressing capabilities, identity services, statistics, location services, voice services, and/or the like.

Enabling mobile operators to use enhanced functionalities and interfaces to adapt to the rapidly changing industry models be provided. This may enhance network sharing of one or more types of resources. For example, one or more functions and/or architectural frameworks for authentication, authorization, policy, charging, mobility, session continuity, or other like aspects for various interworking scenarios may be defined.

In an example, the GSMA OneAPI initiative may define a supported set of lightweight and Web friendly APIs to allow mobile and other network operators to expose useful network information and capabilities to Web application developers. For example, the GSMA OneAPI may reduce the effort and time that may be utilized to create applications and content that may be portable across mobile operators. OneAPI may include a set of APIs that may expose network capabilities over HTTP. OneAPI may be provided, which may be based on Web standards and principles. A network operator or service provider may implement OneAPI. GSMA OneAPI may complement client-side and Web APIs by providing a missing piece; namely, access to network capabilities and information, regardless of operator, via Web applications rather than through device clients.

Cloud computing and network virtualization may be integrated with networks (e.g., mobile networks) to facilitate resource delivery. For example, smart phones, tablets, and cloud computing are converging into a rapidly growing field of mobile cloud computing. Cloud computing may be described as the trend in which resources (e.g., processing power, data storage, network logic, protocols, algorithm logic, etc.) may be provided to a local client on an on-demand basis, usually by means of the Internet. In the case of mobile cloud computing, additional significant benefits may be realized. For example, many mobile devices may have significant constraints imposed upon them, e.g., because of the importance and desirability of smaller sizes, lower weights, longer battery life, and/or other features or functionality. Such constraints may limit the types of hardware utilized and/or software development for these devices. Cloud computing may allow devices to avoid these constraints by letting the more resource intensive tasks be performed on the cloud systems that do face these constraints, thus allowing the results to be sent to the device. Therefore, cloud computing for mobile devices is a very appealing and potentially lucrative trend.

Virtualization may refer to a set of techniques for making a given physical resource (e.g., machine, network, etc.) appears as multiple logical resources. For example, using virtualization, multiple users may have access to the same underlying physical resource, e.g., simultaneously, for example, even if the devices operate with different service requirements. The users of the devices may be unaware that they are sharing one or more resources in a network. One or more aspects of resource virtualization may overlap and/or include concepts (terms) such as cloud services, on-demand computing, server load balancing, and/or the like.

Internet cloud computing may be an example of virtualization that may lead to the emergence of virtual network operators (e.g., network operators that don't own physical network infrastructure). For example, virtual service providers may be a group of operators or service providers that may specialize in the delivery of Infrastructure as a Service (IaaS) or Platform as a Service (PaaS) or Software as a Service (SaaS).

Table 1 illustrates the potential benefits of the virtualization for various stakeholders. In addition, virtualization may provide operators a unique opportunity for flexibility and network scalability on demand, for example facilitating payment for the part of the physical network that is used and when it is used.

TABLE 1

| Operators | Developers |
|---|---|
| May enable business models from an infrastructure. May attract innovative web developers to networks to deliver consumer experiences. May enrich mobile consumers' experiences | May provide access to the global mobile consumer market, e.g., simply and quickly with rapid deployment across many operators. May lower the technical and commercial barriers to entry. |
| Vendors | Consumers |
| May reduce industry fragmentation and drives growth of applications. May encourages Operator integration with highly innovative developers. May provide consistent access to network enablers backed by industry standards enables a business opportunity for Operators simplified by platforms support of OneAPI. | May provide potential for apps with web and mobile access that take advantage of location & payment services. May be faster availability of innovative applications and services. |

A Dual SIM mobile phone may be a phone that may include two SIM cards. Dual-SIM adapters may be provided for use in mobile phones to allow the mobile service provided to include two SIMs, and to switch from one to the other as desired. Such an arrangement may be referred to as a standby dual-SIM phone. Some phones may be provided that may natively work with two SIMs, both of which may be active at the same time. These may be referred to as active dual-SIM phones. Triple-SIM phones may be provided.

Dual-SIM and/or multi-SIM operation may allow the use of two services without utilizing two phones at the same time. For example, the same handset may be used for business and private use with separate numbers and bills. In an example, the same handset that is used domestically may be used for international travel, with an additional SIM for the country being visited. Using multiple SIM cards may allow the user to take advantage of different pricing plans for calls and text messages to certain destinations as well as mobile data usage.

These phones have until recent years been largely eschewed by the larger phone manufacturers partly due to their close ties with mobile phone networks who would prefer that customers use a single network exclusively. Manufacturers (e.g., Nokia, Samsung, etc.) may provide phones with one or more SIM cards. Such manufacturers may target customers for example from developing countries, where the customer may experience national as well as international roaming. Mobile phones with built-in simultaneous dual SIM capability may allow one or more SIMs to be active (e.g., active simultaneously) and may allow calls to be received on either number at any given time. Many multi-SIM phones may have one or more transceivers built-in, where one transceiver may support 2G and 3G while another may support 2G but not 3G. Dual SIM Phones, which may be referred to as Dual SIM Dual Standby (DSDS) may provide the ability to have one or more active SIMs (e.g., simultaneously active SIMs), using a single transceiver.

The FIG. 8, FIG. 9, and FIG. 10 illustrate example 3GPP logical charging architectures. As illustrated in FIG. 8, the domains that generate charging data records (e.g., event based charging or session based charging) for processing by either the offline charging system or the online charging system may be categorized into one or more of the core network domain (e.g., CS, PS, WLAN, etc.), the Service element domain (e.g., MMS, LCS, PoC, MBMS, SMS, etc.), and/or the Sub-system (e.g., IMS) domain.

Service network may refer to one or more service domains. For example, service network may refer to one or more of over the top (OTT) service providers network domain (e.g., these providers may or may not have alliance with any specific operator), operator service network domain, third party service providers network domain, application providers network domain, application developers network domain, content providers network domain, financial institution service network domains, ID providers network domain, service broker network domain, and/or the like.

The landscape in the wireless and mobile communication industry is evolving at an accelerated pace with an increasing flexibility of data services delivery on different devices with integration between the different stakeholders of the industry. Some of these changes may take place with an assumption that the user may have subscription to at least one operator and is locked by service agreement to that operator. Such an assumption may overlook the fact that users demand services based on subscriber preferences and not MNO capabilities.

Operators over the years have managed to maintain control of the resources provided to their subscribers, despite the fast changing industry landscape. With the perpetual problem of subscriber churn and the fall of entry-barriers against one or more industry players, operators may be beginning to differentiate products and services in areas such as personalization, service bundling, co-branding, charging, single sign-on, quality of service, and/or the like. These trends may lead to a true change in a paradigm, e.g., where the user may have more control pushed from the network/operator to the device. For example, the user may be able to select desired services on the spot regardless of which MNO may offer them and with or without cellular subscription.

The current mobile service models may lead to the end-user being locked to an operator that may or may not satisfy her/his service needs, and/or operators may miss out on profits service providers may enjoy, e.g., using the Network Operator as a pipe. Techniques may be specified further satisfying end-user preferences. For example, services may be provided to an end-user based on subscriber preferences even though those preferences may be unfilled by current MNO capabilities. In an example, service providers may attempt to provide ubiquitous Network Accessibility (e.g., services may be delivered anywhere, anytime and to any user based on user credentials and/or the ability of the user to pay). Providing ubiquitous network accessibility may include provide services without reliance on a MNO as middle man, without a prior subscription, and/or without a prior service agreement. Doing so may avoid network-based limitations and may enable access to multiple networks, better QoS (e.g., higher data rates) and/or better network utilization.

Techniques may be provided so that the end-user may be charged (e.g., while roaming), e.g., based on the services that she/he may demand and not on the location where these services may be delivered. Further techniques may be provided for consistent user experience and/or to hide the underlying network and service complexity to the user while delivering the desired resources. Using various architectures and models, these goals may be met while enabling Network Operators to profit from services running across their networks. This may be the case, if the user may access any service, anywhere, anytime, e.g., based on user credentials and/or the ability of the user to pay without a prior subscription to an operator. Such a scheme may allow service providers to offer services that include both the Service and the Access Network (e.g., Google, Yahoo, Apple, Facebook, etc.). The schemes may include Network Operators offering one or more Network Resources for Service Providers and/or equipment vendors offering professional services, for example including operating the Network.

One or more architectures, descriptions of various functional entities thereof, and an API frame work are described herein, which may enable the implementation of one or more of these performance goals. For example, the techniques described herein may enable operator virtualization, which may be referred to interchangeably as multi-operator device access or service based access or operator agnostic access or operator and access technology agnostic access or operator and service provider agnostic access or operator and service provider and technology agnostic access. The operator virtualization may be achieved with or without prior subscription to the network operator(s) whose network(s) may be accessed and/or with or without SIM card/UICC from the operator(s) whose network(s) may be accessed. The user may receive services, e.g., via multiple network operators simultaneously (e.g., receiving services at essentially the same time from the perspective of the user) and may select these network operators dynamically. For example, the user may request service(s) through one or more of multiple operators' networks at a given time (e.g., simultaneously), may receive service(s) through one or more of multiple operators' networks at a given time (e.g., simultaneously), and/or may maintain service(s) through one or more of multiple operators' networks. The requesting services, receiving services, and/or maintaining services may be performed with sequential approach or nearly simultaneous approach or a combination of sequential, nearly simultaneous and simultaneous approaches.

The virtualization of the network resources may be achieved using dynamic resource pooling across multiple networks, for example, if the networks are distributed between several stakeholders. In an example, the network (e.g., access network, core network, cellular network, non-cellular network, etc.) resources may be virtualized into the cloud. Providing virtualized resource in the cloud may include the outsourcing of the network processing capability, storage capability, and/or networking logic/capability into the cloud.

The virtualization of WTRU resources may include the virtualization of the UE identity (e.g., also referred to as a WTRU identity). The UE identity/WTRU identity may include the various WTRU addressing identities, WTRU authentication and security credentials, WTRU service and resource usage profile, and/or the like.

In an example, the proposed methods, systems, instrumentalities, and architectures may facilitate the virtualization into the cloud of the services provided to the user or other network services (e.g., charging and billing support system, operations support system, etc.). These services may be provided in the sense of cloud computing paradigm (e.g., SaaS/PaaS/IaaS).

Methods, systems, instrumentalities, and architectures are provided that may support security, authentication, user privacy, cross-stakeholders (e.g., operators, virtual operators, OTTs, third party providers, application and content providers, financial institutions, service brokers, ID providers, etc.) policy, charging and rules management, and/or other like functions.

While one or more examples described herein may be described using examples of the purchase of communication services, the methods, systems, and instrumentalities described herein may be applied to on-line mobile commerce (e.g., purchase of services/goods online) payment and/or offline mobile commerce (e.g., the scenarios where the user purchases services or goods from a physical store and pays using a mobile phone equipped with a near filed communication (NFC) capability).

Figure 11:
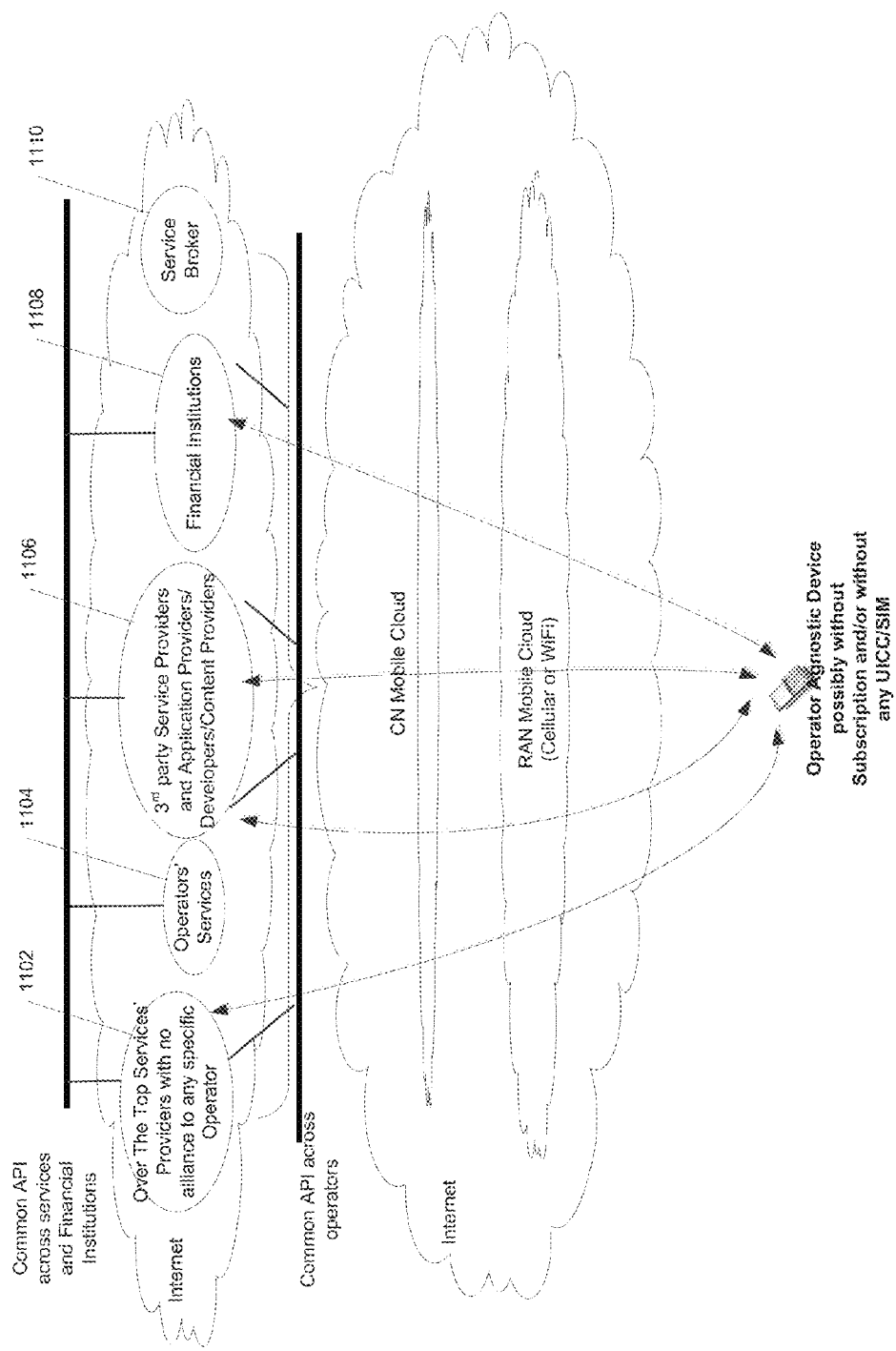
FIG. 11 illustrates an example of Operator Agnostic Access where one or more operators may be virtualized and the network resources and/or WTRU resources/services are provisioned dynamically in the cloud.

FIG. 11 illustrates an example where one or more operators may be virtualized and the network resources and/or WTRU resources/services may be provisioned dynamically in the cloud. Example of actors at the virtualization network level may include one or more of over the top service providers 1102 with or without alliance to any specific network operators, third party service providers 1106, application providers, application developers, and/or content providers 1106, mobile virtual network operators (MVNOs) 1104, operator (e.g., in the role of service providers), financial institutions 1108 (e.g., banks, credit card companies, PayPal, etc.), ID providers, service brokers 1110, and/or the like. As an example, the service broker 1110 may be an entity that may act as a broker of services between the service providers and the access networks providers creating a service market.

Figure 12A:
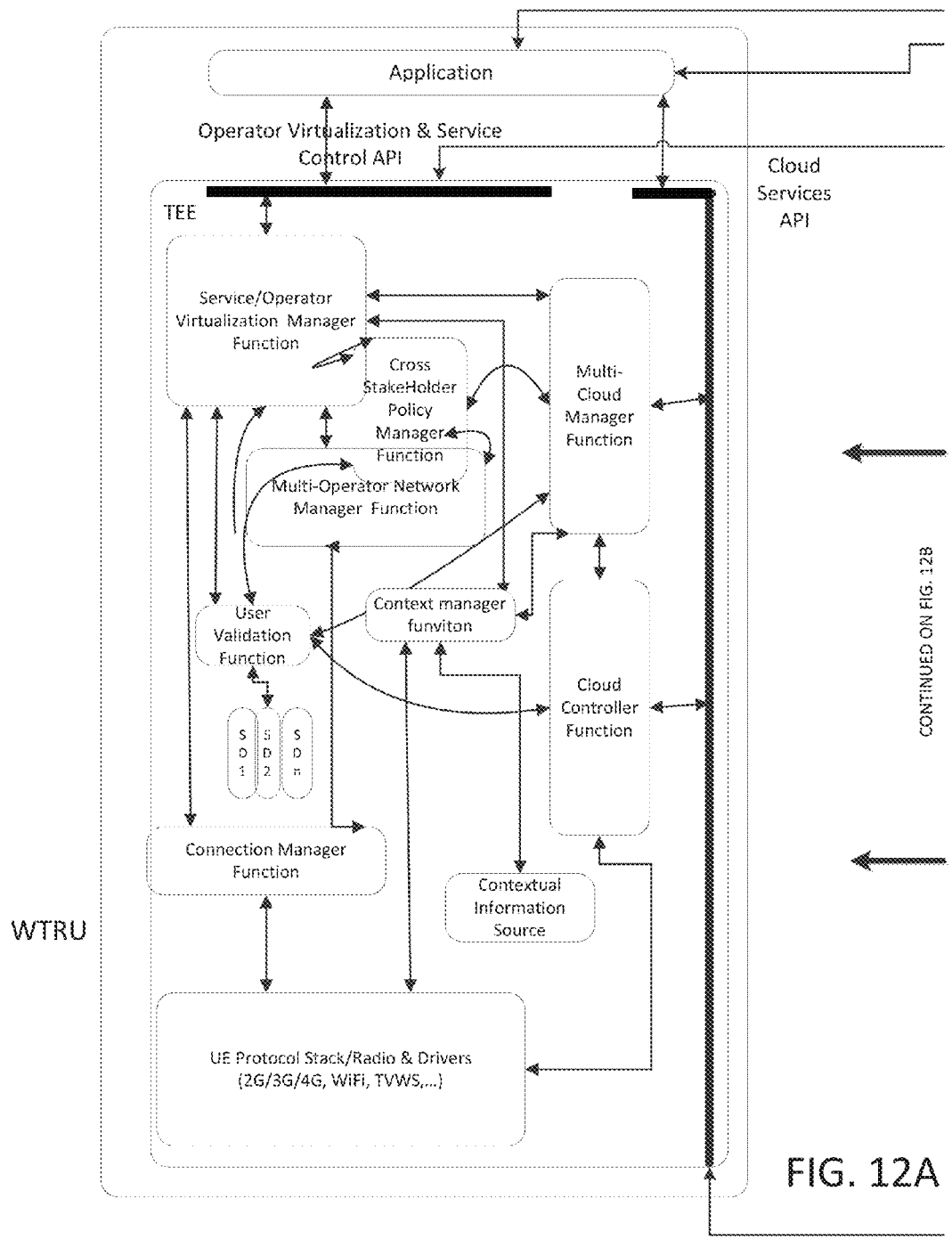
FIGS. 12A, 12B, and 12C illustrate an example of an end-to-end architecture of a virtualized network that may include WTRU architecture and network architecture.
Figure 12B:
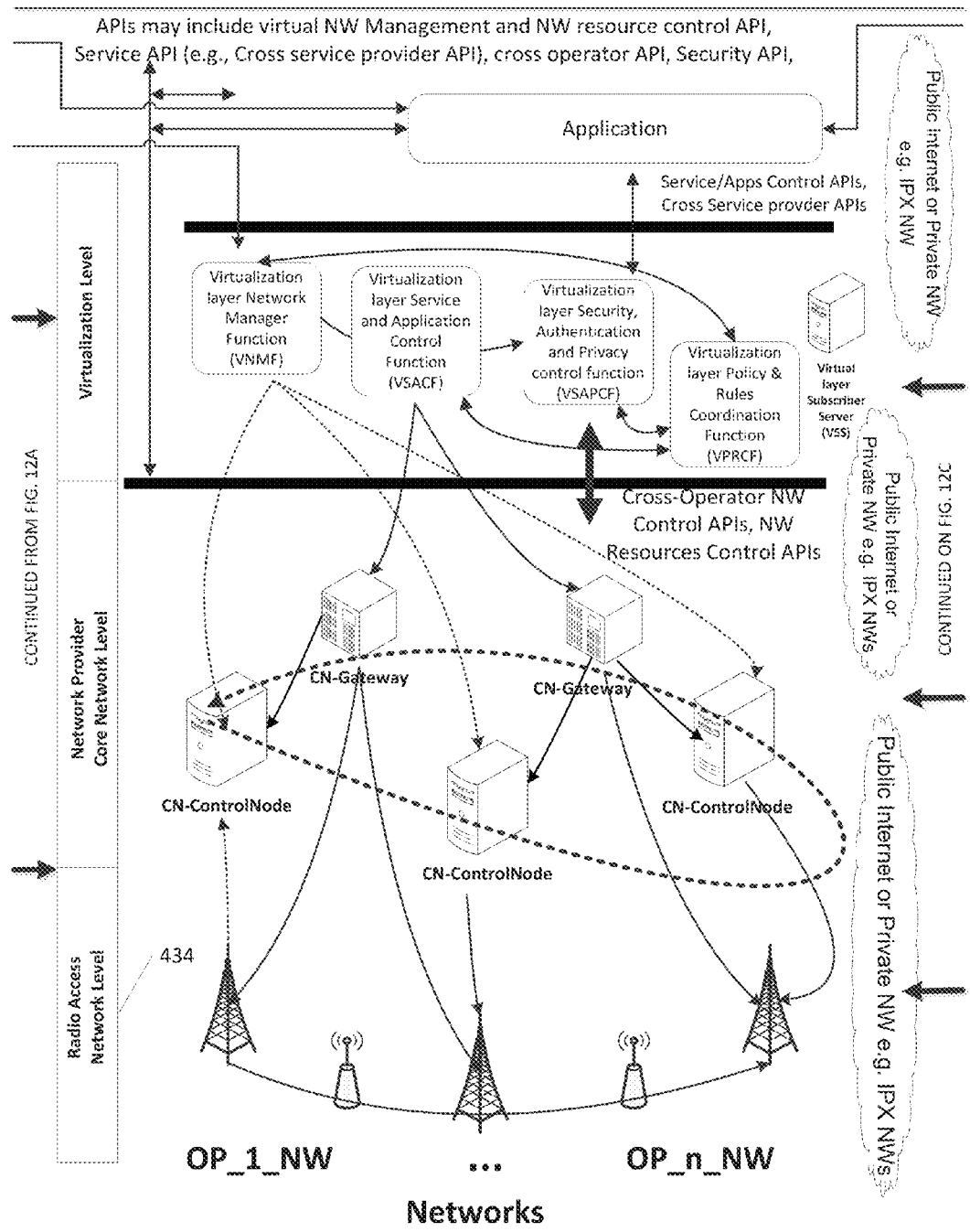
Figure 12C:
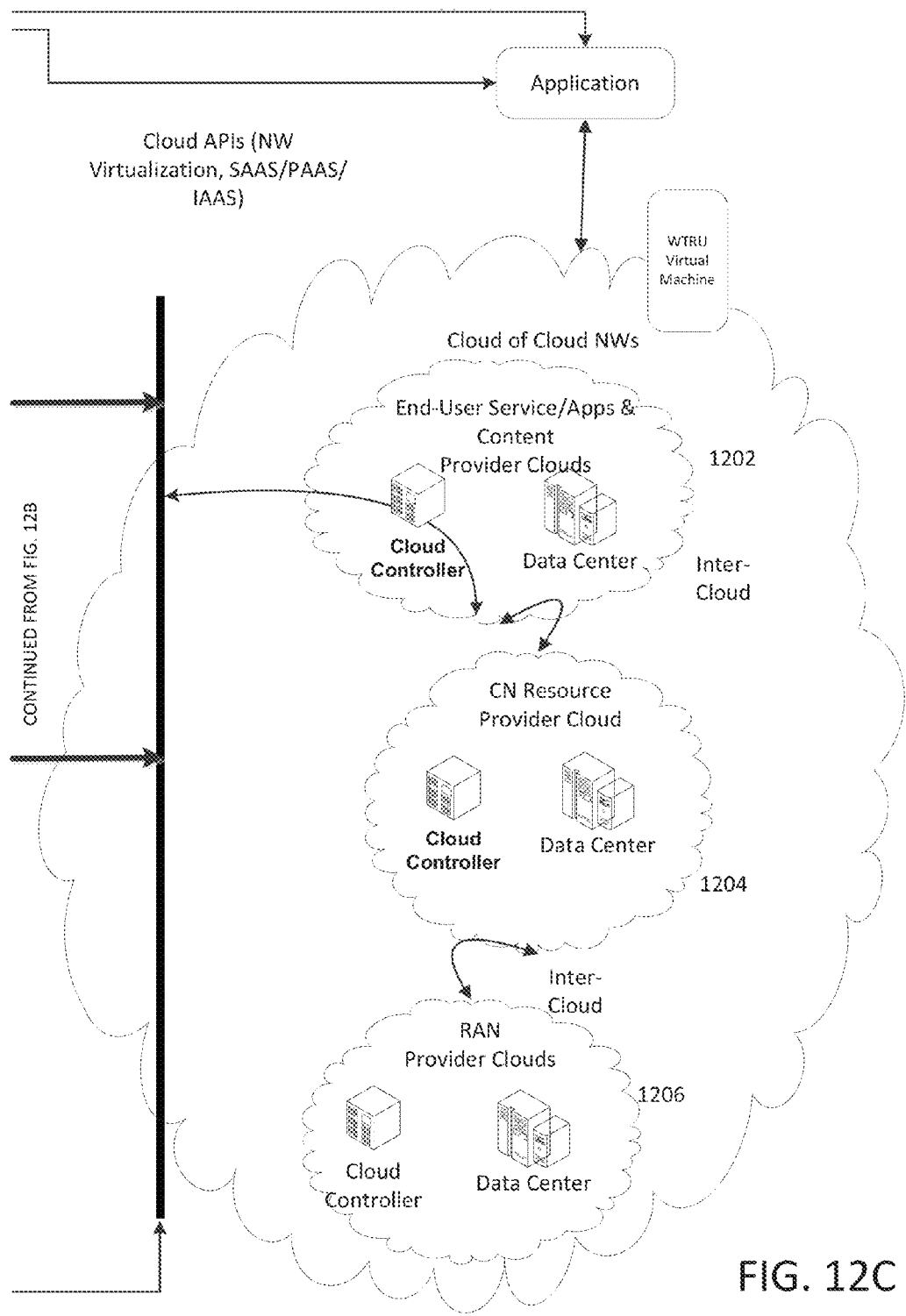

FIGS. 12A, 12B and 12C illustrate an example of an end-to-end architecture of a virtualized network that may include the WTRU architecture (e.g., as illustrated in FIG. 12A) and the network architecture (e.g., as illustrated in FIGS. 12B and/or 12C). The network architecture may be described as architecture of a network of networks that may include one or more of a radio access network, a core network, a service network, a cloud network, and/or the like. The architecture may be a multi-dimension architecture. For example, in a first dimension, the operators may be virtualized. In a second dimension, the network resources (e.g., computation resources, storage resources, networking logic, protocol and algorithms logic, etc.) may be virtualized into the cloud. An example use case in support of such network resources virtualization in the context of the radio access network may be the case of reconfigurable radio systems. In a third dimension, the network resources may be virtualized in the sense of dynamic resource pooling across multiple networks. An exemplary use case for this scenario may be radio access network resources (e.g., spectrum, radio resource block, cells, etc.) sharing. In a fourth dimension, the WTRU resources (e.g., computation resources, storage resources, networking logic, protocol and algorithms logic, etc.) may be virtualized into the cloud. An example of a use case in support of such network resources virtualization in the context of the radio access network may be the case of reconfigurable radio systems. In a fifth dimension, the services (e.g. business logic) provided to the users or other business support services (e.g. charging and billing support system, operator support system, etc.) may be virtualized into the cloud. One or more of these dimensions (in any combination) may be integrated and activated together, for example as depicted in FIG. 12A, FIG. 12B, and FIG. 12C. In other example architectures, a subset of the dimensions may be realized, for example as illustrated in FIG. 13A, and FIG. 13B, or FIG. 14A, FIG. 14B, and FIG. 14C. TEE may be referred to as a Trusted Execution Environment.

In an example, the WTRU may have one or more service associations (e.g., simultaneous associations from the perspective of the user), for example through multiple operators. The WTRU may have multiple security associations with multiple operators. In an example, the security association may be realized through a single association from the device perspective. For example, there may be a single security association from the device perspective while from the network perspective, the association may be replicated in the context of each stakeholder involved in the orchestration of the service delivered to the user.

Figure 13A:
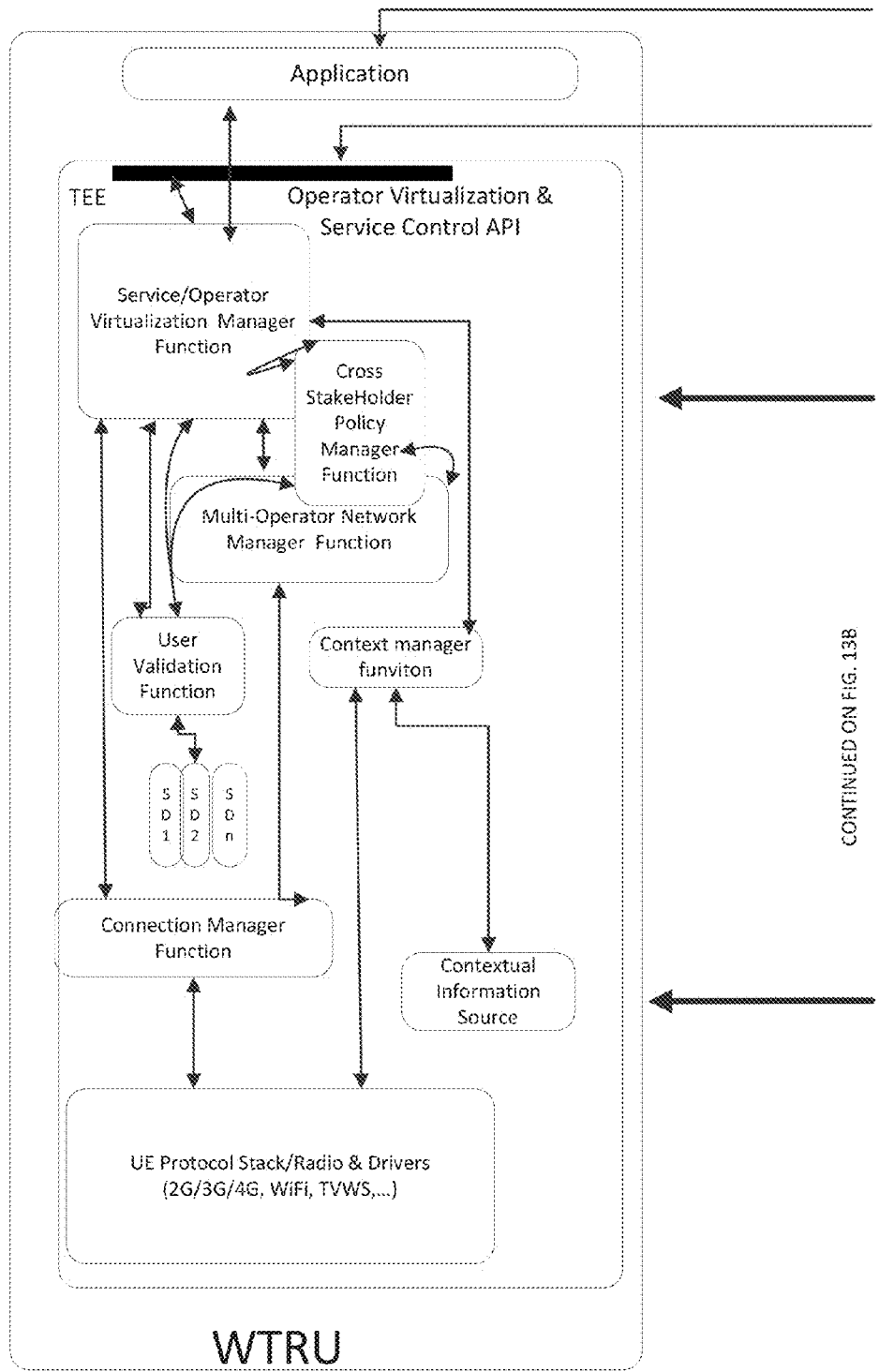
FIGS. 13A, and 13B illustrate an example of an end-to-end virtualized network architecture where the operators may be virtualized in a context where neither the WTRU nor the network uses cloud computing.
Figure 13B:
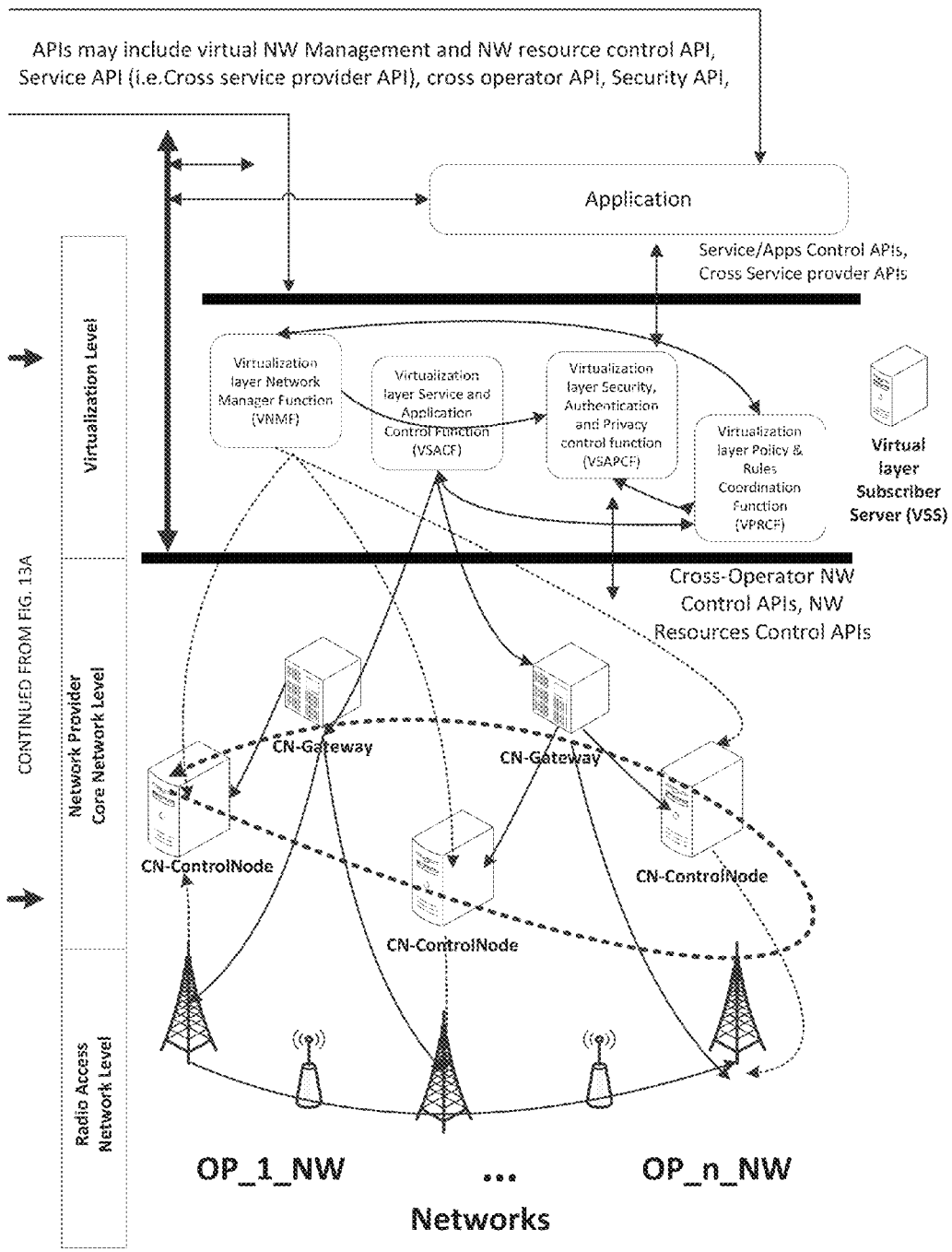

FIG. 13A, and FIG. 13B illustrate an example of an end-to-end virtualized network architecture where the operators may be virtualized in a context where neither the WTRU nor the network (e.g., radio access network of core network or service network) may use cloud computing.

Figure 14A:
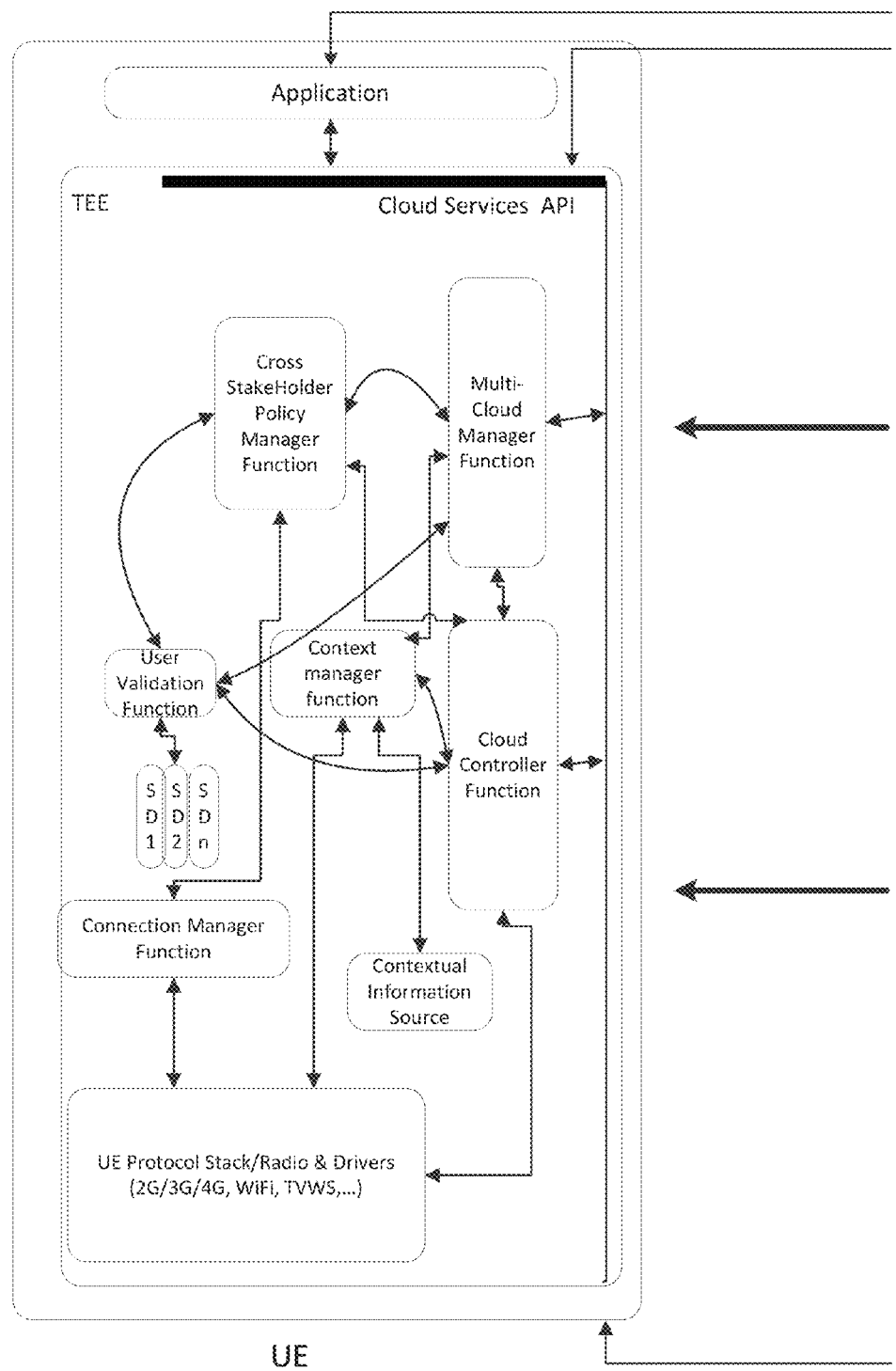
FIGS. 14A, 14B, and 14C illustrate an example of an end-to-end virtualized network architecture where the operator is not virtualized but the WTRU and/or the infrastructure network may make use of cloud computing.
Figure 14B:
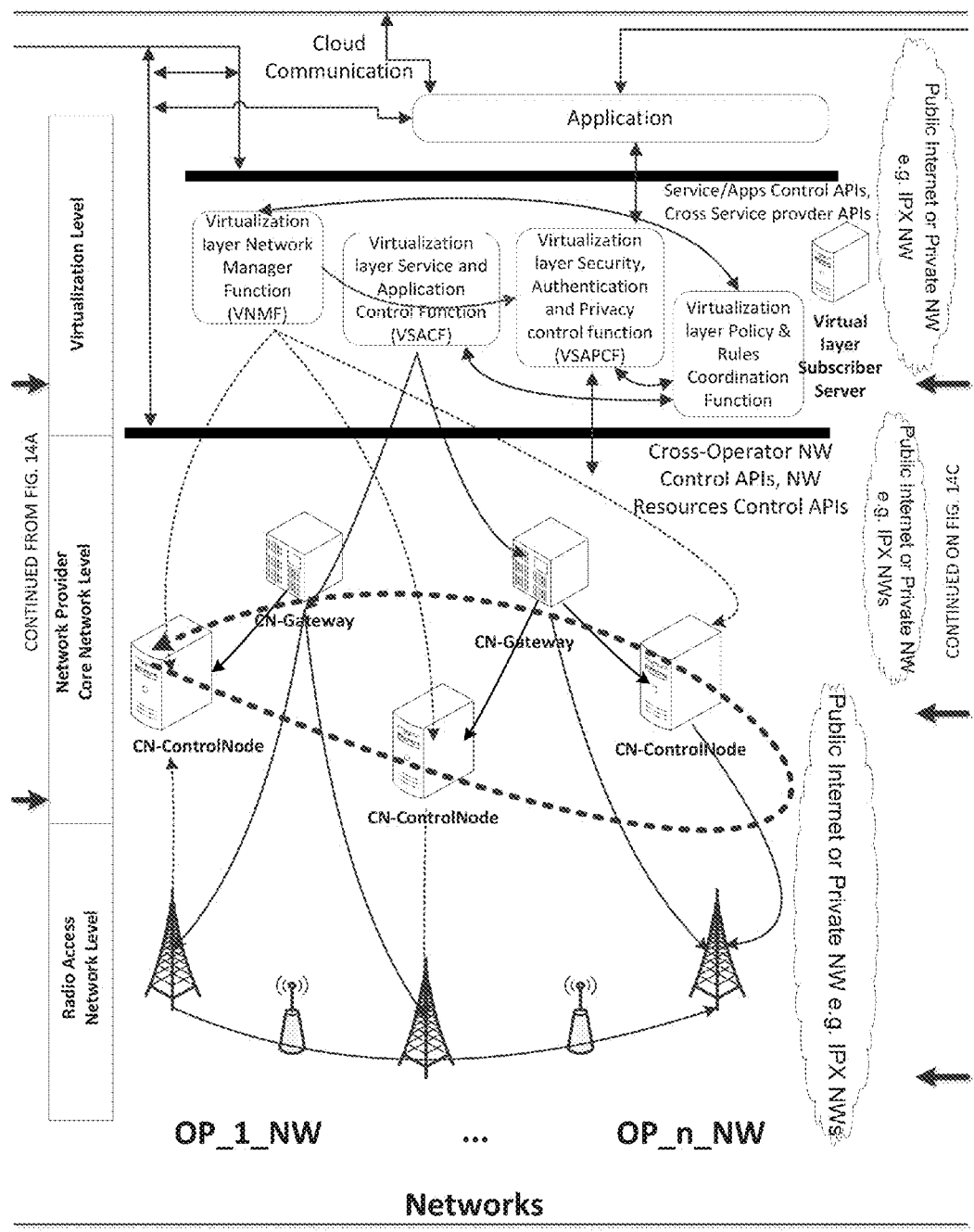
Figure 14C:
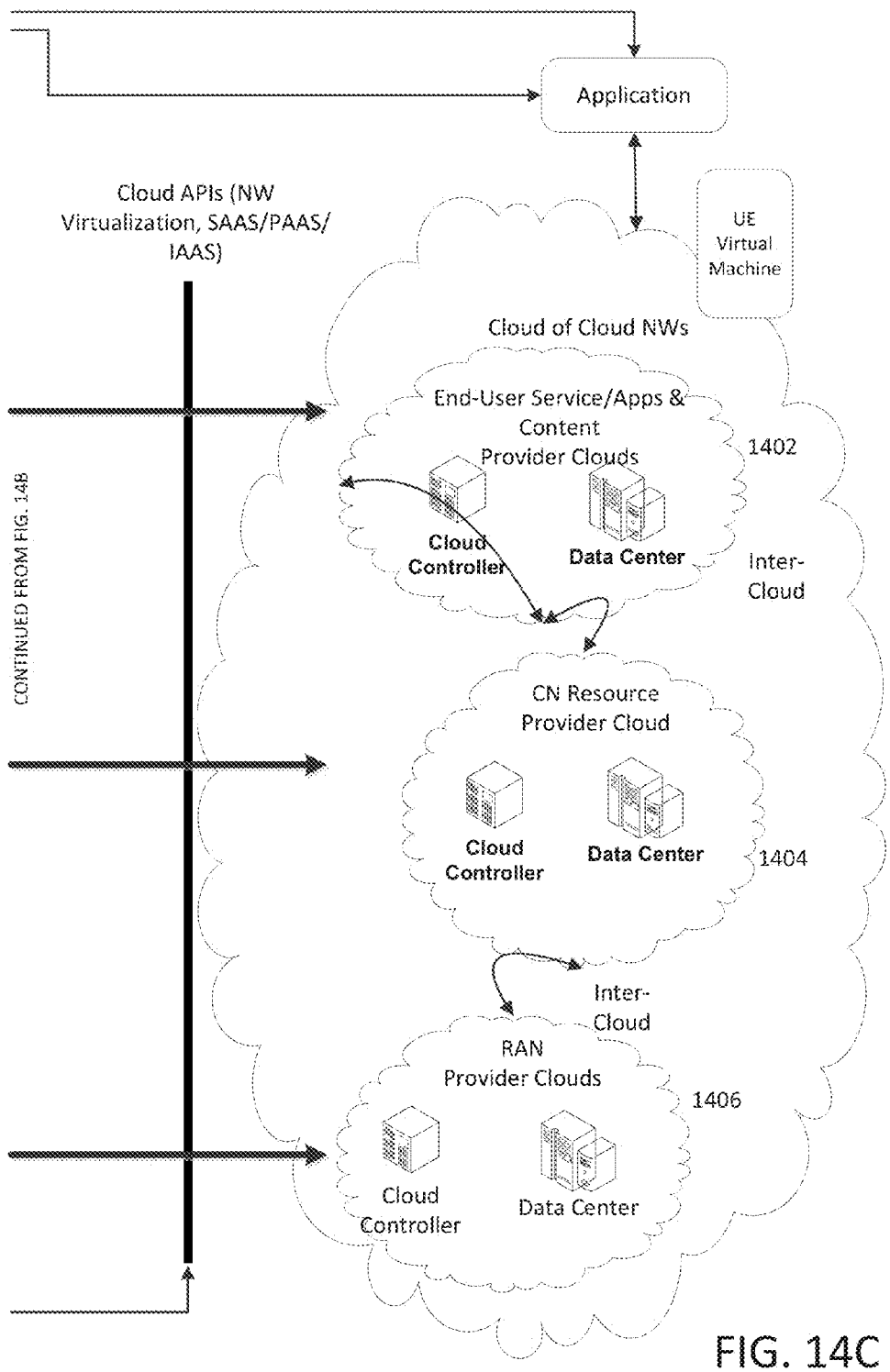

FIG. 14A, FIG. 14B, and FIG. 14C illustrate an example of an end-to-end virtualized network architecture where the operator may not be virtualized but the WTRU and/or the infrastructure network may make use of cloud computing.

In an example, the radio access network (e.g., GERAN, UTRAN, EUTRAN, 802.xx, etc.) may be a network of multiple radio access networks of the same or different RAT (Radio Access Technology) or different RATs. The radio access network may belong to one or multiple network operators (e.g., OP_1_NW to OP_n_NW, as illustrated in FIG. 12B, FIG. 13B or FIG. 14B). For example, a mobile virtual network operator (MVNO) may deploy a radio access network that may be a collection of radio access networks or slices of radio access networks from multiple network operators. The radio access network may be shared among multiple network operators.

Support for Operator Virtualization (e.g., Consumer centric access, WTRU centric access, MOD, service base access, or operator agnostic access or operator and access technology agnostic access or operator and service provider agnostic access or operator and service provider and technology agnostic access, etc.) or other virtualization dimension described herein may be provided. For example, in order to support network operator virtualization (e.g., a network operator agnostic access or service based access/WTRU centric system) or other virtualization dimensions described herein, the radio access network may provide one or more of the following functions. For example, the radio access network may provide an indication (e.g., via common or dedicated messages) to the WTRUs of support for operator agnostic access or any other virtualization dimension described herein. Such an indication may be in the form of a virtual PLMN ID or the ID of a universal PLMN or one or more of the indicators/parameters related to the Cloud computing support. The indication may be a dummy PLMN ID (e.g., an ID of a PLMN which doesn't exist) or a cloud ID. In an example, the indication may take the form of an enumeration of values. For example, the enumeration may include service based access supported, service based access not supported, service based access and non-service based access supported, etc. The enumerated values may be coded as numerical 0, 1, 2, etc. The numerical values may correspond to the expressions. Such indication may include an indication and/or list of the services (e.g., or service providers) provided by each operator and their attributes such as price or price indication, quality of service (QOS), quality of experience (QOE) attributes, and/or the like.

In an example, the radio access network may provide processing of the WTRU capability for support for service based access. In an example, the radio access network may provide a Service Node Selection. This Service Node Selection may determine the association between one or more of the virtualization layer network management function (VNMF) and the WTRU, the virtualization layer service and application control function (VSACF) and the WTRU, the virtualization layer security, authentication and privacy control function (VSAPCF) and the WTRU, and/or the virtualization layer subscriber server (VSS) (e.g., as illustrated in FIG. 12B, FIG. 13B or FIG. 14B), and the WTRU. The service node selection function may enable the RAN to associate the WTRU with an entity in the operator virtualization layer. The determination of such an association may be based on input from the WTRU and/or the user. The input may include information such as one or more of an identifier for the WTRU (or temporary identifier), the service node identifier or name, access point name (APN), and/or any order parameter that the RAN may use to direct the WTRU request toward the appropriate service node.

In an example, the radio access network may provide support for the routing of the request of a service to a specific service provider, for example based on the URI (uniform resource identifier). In an example, the radio access network may provide control and/or coordination of one or more core networks.

In an example, the core network (e.g., an EPC) may be a network of several different technology core networks (e.g., EPC, UTRAN core network, GPRS core network, GSM core network, etc.) and may belong to one or multiple network operators. For example, a mobile virtual network operator (MVNO) may deploy a core network that may be a collection of core networks and/or slices of core network from multiple network operators. The MVNO may have its own HSS which may be mapped to the VSS or to an entity within the VSS, for example.

An interface may be defined for the VSS (or HSS) to interact with the service network (or an entity in the virtualization layer) and/or with the network elements at the core network level and/or with the network elements at the radio access network level. This interface/API may receive subscription information from the service layer and/or other parameters (e.g., types of applications/services that the user has subscribed and other user preferences).

IMSI may be used as an input key to receive the user data from the VSS and/or HSS. In virtualized network architecture, a WTRU may not have an IMSI number or may have multiple IMSI numbers since it may connect to multiple operator networks. Other identities may be defined and be used as input key for the retrieval of the relevant data from the VSS (or the HSS) by the Service layer or any other entity located in the virtualization layer, located at the core network level, and/or located at the radio access network level. In an example, there may be a mapping between the IMSI/temporary IMSI and other WTRU identification(s). For example, one or more of the following identifications may be used to retrieve the WTRU subscription information from the VSS (or HSS) and/or may be mapped to the IMSI/temporary IMSI or used in replacement of IMSI/Temporary IMSI or in combination with some form of IMSI/Temporary IMSI: B-number or any other call specific identity (e.g., URI, MSISDN, etc.); Credit Card number associated with the subscriber (e.g., in a hashed format); a Unique proximity ID; WTRU serial number (e.g., IMEI, etc.); a private IMS identity; a public IMS identity, a permanent IP address assigned to the WTRU, and/or some other WTRU identification and/or a combination of any of these identities.

The virtualization layer on the network side may include one or more of the following high level functions: the Virtualization layer Network Manager Function (VNMF); the Virtualization layer Service and Application Control functions (VSACF); the Virtualization layer Security, Authentication and Privacy Control Function (VSAPCF); the Virtualization layer Subscriber Server (VSS); the Virtualization layer Policy and Rules Coordination function (VPRCF); and/or other virtualized functions (e.g., as illustrated in FIG. 12B, FIG. 13B or FIG. 14B). These functions may be implemented separately in separate logical entities/nodes within the network and/or may be implemented in any combination within the same logical entity/node within the network. In an example, these functions may be implemented within multiple logical entities within the network. The functions may be implemented in communication network nodes. For example, in the case of evolved packet network, these functions may be implemented in the core network nodes or in the radio access node. In another example, these functions may be implemented in a virtualization layer node or nodes. These logical functions may enable the virtualization of the operators (e.g., network operators), the virtualization of the network resources into the cloud, the pooling of network resources across multiple operator networks, and/or the virtualization of other service logics (e.g., end user application service logic, charging & billing logic, operation support system logic, etc.) into the cloud. The logical functions may be configured to orchestrate a seamless service experience and/or enable one or more of cross stakeholder (e.g., MNOs, OTTs, third party application and content providers, financial institutions, etc.) service controls, cross stakeholders policy, rules management and arbitration, cross network resource virtualization (e.g., the network resource may be abstracted and presented to the WTRU in a way that remove individual network peculiarities), cross-stakeholder authentication, security and privacy management, and/or the like.

The virtualization layer functions in the network may interact with one or more entities (e.g., functional entities) in the WTRU (e.g., service/operator virtualization manager, cross-stakeholder policy manager, cloud manager, etc. (e.g., as illustrated in FIG. 12A, FIG. 13A or FIG. 14A).) for a seamless orchestration and control of the services delivered to the WTRU. In an example, the virtualization layer in the network may expose to the upper layer application the APIs for the control of different aspects or dimensions of the virtualization. Those APIs may include the APIs for one or more of the control of the virtualization of the operators, the virtualization of network resources (e.g., computation resources, storage resources, networking logic, protocol and algorithms logic, etc.) into the cloud, and/or the virtualization and control of the pooling of network resources across multiple operators. Through these APIs, the virtualization layer (e.g., on the network side) may interface with the WTRU, the cloud networks, the core network and/or the radio access networks either directly (e.g., without the invocation of the upper layer application of these entities or indirectly through the upper layer applications, for example as illustrated in FIG. 12A, FIG. 12B, and FIG. 12C. The virtualization layer in the WTRU may interface with the virtualization layer in the network, the core networks, the radio access networks and/or the cloud networks either directly (e.g., without the invocation of the upper layer application of these entities) or indirectly through the upper layer applications for example as illustrated in FIG. 12A, FIG. 12B, and FIG. 12C.

The virtualization layer functions of the service network may render functionality in coordination with each other. The various virtualization layer functions may render their functionality in coordination with virtualization functions located in the WTRU. In an example, the virtualization layer functions of the service network may render functionality independent of virtualization functions located within the WTRU. For example, different stakeholders participating in the orchestration and delivery of the services to the WTRU may have different policies and rules across the various architecture layers depicted in the proposed architecture (e.g., security, authentication and privacy management, service authorization, QOS/QOE, management of the various key network performance indicator or thresholds such as various mobility thresholds, session management threshold, etc.).

In an example, the implementation of the cross-stakeholders policy manager functional entity may be performed in the WTRU. The policy and rules managers in the WTRU may coordinate the policies and rules across the stakeholders and may arbitrate between the various stakeholders in case of conflicts based on user policy preferences, context and/or other considerations such as price, service level agreements, QOS/QOE, etc. In an example, the cross-stakeholder policy manager function (VPRCF) (e.g., implemented in the network side of the proposed architecture as opposed to the WTRU side (e.g., as illustrated in FIG. 12B, FIG. 13B, or FIG. 14B)) may coordinate the policies and rules across the stakeholders and may arbitrate between the various stakeholders in case of conflicts based on one or more of user policy preferences, context and/or other considerations such as price, service level agreements independent of the cross-stakeholder management function located in the WTRU. In an example, both the cross stakeholder policy manager function located in the WTRU and the VPRCF may act together for the coordination of the policies and rules across the stakeholders and may act together for the arbitration between the various stakeholders in case of conflicts based on one or more of user policy preferences, context and/or other considerations such as price, service level agreements, QOS/QOE, etc.

As illustrated in FIG. 12B, FIG. 13B, or FIG. 14B, the VNMF may be configured to manage the virtualized network resources and/or control the operator's network resources across several stakeholders (e.g., operators). The VNMF may be responsible for the setup and management of the virtualized bearers into each stakeholder network. The VNMF may be responsible for the management of the cloud bearers. In an example, the VNMF may interface with other entities in the network or in the WTRU, for example using an application interface (API) primitives (e.g., as illustrated in FIG. 12B) for one or more of the following tasks. For example, the VNMF may interface and/or may employ the API primitives to interact with the mobile service cloud networks and/or peer service networks to form a network of networks for a vaster networking and/or ubiquitous services provisioning. In an example, the VNMF may interface and/or may employ the API primitives to interact with various operator's networks (e.g., CN) and/or their related radio access networks for providing end-user/WTRU connectivity to services and applications. For example, end-user/WTRU connectivity to services and applications may include the command and control interactions with the operator networks controlling node (e.g., MME/SGSN) for connection and network resource management. The end-user/WTRU connectivity to services and applications may include traffic used to establish for the end-user the service or application traffic path over the operator networks gateway nodes (e.g., S-GW/P-GW/GGSN) towards the VSACE node described herein. In an example, the VNMF may interface and/or may employ the API primitives to interact directly with the end-user or WTRU to help the WTRU determine the suitable radio access network and operator's core network paths for control or data purposes with respect to the services or applications the mobile device end-user selected based on the end-user/UE's location or attachment point with the network. In an example, the VNMF may interface and/or may employ the API primitives to maintain user profile(s) from various network operators (e.g., may be connected to various MMEs from different network operator). In an example, the VNMF may interface and/or may employ the API primitives to maintain mobility management information when the WTRU moves between different operator networks. In an example, the VNMF may interface and/or may employ the API primitives in order to interact with the financial institution or the charging entity connected to financial institution to ensure the user has the financial/charging credentials to access the virtual network system. In an example, the VNMF may interface and/or may employ the API primitives to provide a list of available services and applications to the users and charging information related to those services/applications.

In an example, the VNMF may implement some or all of the following network configurations. For example, the VNMF may be configured to provide coordination with the WTRU, other virtualization layer functions, and/or other layer network nodes (e.g., CN control node and/or CN GW nodes) for cross-operator mobility across the various operators' networks (e.g., cross-operator mobility subscriber/user profile information). In an example, the VNMF may be configured to provide coordination with the WTRU, other virtualization layer functions, and/or other layer network nodes (e.g., CN control node and/or CN GW nodes) for support of inter-operator routing (e.g., flow mobility across operator, flow aggregation across operator, etc.). In an example, the VNMF may be configured to provide coordination with the WTRU, other virtualization layer functions, and/or other layer network nodes (e.g., CN control node and/or CN GW nodes) for the discovery of service or service providers or operators or any other stakeholder. In an example, the VNMF may be configured to provide coordination with other virtualization layer functions for the establishment and association of security, authentication, and/or privacy context with the WTRU across the various stakeholder domains. In an example, the VNMF may be configured to provide coordination with other virtualization layer functions, such as the VSS, for the management and distributions of user identification across stakeholder (e.g., cross operator) domains and/or with the WTRU. In an example, the VNMF may be configured to support access authorization (e.g., query the VSS for access authorization). In an example, the VNMF may be configured to control/coordinate with other virtualization layer functions and/or other layer network nodes (e.g., CN control node and/or CN GW nodes) for session establishment with the WTRU. In an example, the VNMF may be configured to support service authorization (e.g., query the VSS for service authorization).

As illustrated in FIG. 12B, FIG. 13B, or FIG. 14B, the VSACF may provide service orchestration, for example independent of network providers. The VSACF may be the central point of knowledge (e.g., context) about the services being consumed by the WTRU at any given point in time. For example, the VSACF may manage the service capability/catalogue of the network (e.g., for broadcast of available services across the access networks).

The VSACF may be a combination of one or more of the following node roles or functionalities. For example, the VSACF may be configured to be a central repository that has the knowledge of some or all of the services and/or applications that the virtualized network (e.g., the service network and/or the virtualized network cloud) and other cloud or peer networks provide. The VSACF may have knowledge of the terms for using these services or applications. In an example, the VSACF may be configured to be a gateway node of the virtualized network towards some or all of the services and/or applications that the virtualized network provides to the end-users/WTRUs. For example, the services and/or applications may reside in other peer networks or cloud networks.

In an example, the VSACF may be configured to be a network platform, infrastructure and resource place where some or all of the services and/or applications may be directly stored, maintained, and/or serviced. In an example, the VSACF may be configured to provides virtual network operator control over third party applications running on the network, for example by providing interfaces and/or specific APIs to the application function or application server. The application server may be able to push certain policies for the specific application through this functional node. In a virtualized network the VSS may receive subscriber information from various sources, for example including the services and application used by the WTRU (e.g., Facebook, Twitter, etc.). Therefore, the VNMF may be configured to fetch the relevant information from the applications to build the subscriber profiles and may send the information to the VSS.

In an example, the VSACF may be configured to assist VNMF node is selecting the network based on the services and/or application that the user is interested in. Some application may utilize a single sign on (SSO) or similar user sign in method. The VSACF may be configured to interact with the authentication node (e.g., VSAPCF) to provide such sign on method.

The VSAPCF may be configured to provide one or more of cross stakeholder security, authentication, or privacy control. For example, the VSAPCF may include an ID provider functions, for example to provided identity and assert the validity of those identities to other service providers or stakeholders. The VSAPCF may include a single sign on function and may manage security, authentication, and/or integrity credentials across the various stake holders.

The VSAPCF may interface with the virtualized service network subscriber record database and/or with one or more of the operator's network HSS for subscriber record store, retrieval, and/or updating. In an example, the VSAPCF may interact with the virtualization layer subscriber server for subscriber information outside of individual operator HSS.

The VSAPCF may be configured to command and/or perform directly with the end-user/WTRU authentication and/or security key agreement procedures. For example, the authenticated end-user/WTRU may gain universal security clearance status within this virtualized service network, its affiliated operator's network, radio access networks, and/or the coordinated peer service networks and cloud networks. In addition to authenticating the WTRUs, the VSAPCF may authenticate each of the multiple operators which may be part of the virtual network. The multiple operator authentication may be performed by AuC (Authentication Center)

and/or other network node of the various networks, for example by calculating and sending authentication parameters to the VN authentication function (e.g., VSAPCF). The VN authentication function may then analyze the parameters and confirm the authentication to each of the networks in the VN.

The VSAPCF may authenticate different operator and third party applications. The operator may provide this as a service to the third party application server/application function to use operator authentication process for the application instead of having application specific authentication. This may be achieved through a specific API between the VSAPCF and the application function. The VSAPCF may interact with the financial institutions to authorize the user for payment so that the user is able to use the services of the virtual network. The VSAPCF may have users' credit card information or other financial credentials used by the financial institution to authorize the payment. The VSAPCF may assist the operator's network controlling node (e.g., MME/SGSN) for end-user/WTRU authentication and/or security key agreement procedures.

As illustrated in FIG. 12B, FIG. 13B, or FIG. 14B, the virtual subscriber server (VSS) may be the subscriber server that may reside in the virtualization layer. For example, the VSS may be an overlay subscriber server that spans across multiple operator networks' home subscriber servers (HSSs). In an example, the VSS may act as the subscriber server for the trusted entity that provides security and dynamic subscription credentials to the user or the subscriber in support of the virtualization scheme. The VSS may interact with some or all the functions in the virtualization layer. The VSS may interact with high layer applications.

The VSS may include one or more of the following functions. For example, the VSS may be configured to provide support for cross-operator mobility across the various operators' networks (e.g., cross-operator mobility subscriber/user profile information). In an example, the VSS may be configured to provide support for inter-operator routing (e.g., flow mobility across operator, flow aggregation across operator, etc.). For example, the VSS may control the subscriber/user service level agreement information for inter-operator routing. In an example, the VSS may be configured to provide support for the discovery of services, service providers, operators, and/or any other stakeholder.

In an example, the VSS may be configured to provide security, authentication, and/or privacy control policy and rules across stakeholders' information generation. In an example, the VSS may be configured to provide user identification handing and/or cross stakeholder (e.g., cross operator) identification handling. For example, the VSS may provide the appropriate relations among some or all the identifiers uniquely determining the user in a across operator system and/or other stakeholder systems. In an example, the VSS may be configured to provide access authorization. For example, the VSS may authorize the user for network access across operator networks. The VSS may provide basic authorization for MT/session establishment and/or service invocation across operator networks or other stakeholders' networks. The network may be a network dynamically selected by the user at the time of service. The network may or may not have prior service agreement with the VSS owner.

In an example, the VSS may be configured to provide service authorization support. For example, the VSS function may provide basic authorization for MT call/session establishment and/or service invocation across operator networks or other stakeholders' networks. The network may be a network dynamically selected by the user at the time of service. The network may or may not have prior service agreement with the VSS owner. In an example, the VSS may be configured to provide access to the service profile data for use across multiple stakeholder domains (e.g., operator networks). The VSS may update across stakeholder domains any changes in user subscription status (e.g., access authorization status, service authorization status, etc.).

The VSS may interact (e.g., may have interfaces with) to the network nodes of the stakeholders involved in orchestration and service delivery to the user. For example, the VSS may interact with the SGSN and/or MME in the EPC domain. In an example, may interact with IM CN subsystems (such as SIP application server, OSA SCS, IM-SSF and/or CSCF) or other application function (e.g., third party authentication function). In an example, the VSS may interact with the CS domain nodes (e.g. GMSC, MSC/VLR, etc.). In an example, the VSS may interact with the GPRS domain (e.g. SGSN, GGSN, etc.). In an example, the VSS may interact with gsmSCF, 3GPP AAA server, applications server, and/or the GUP server.

As illustrated in FIG. 12B, FIG. 13B, or FIG. 14B, the VPRCF may be a central function for service delivery in the multi-stakeholder service environment. For example, the VPCRF may consolidate and/or coordinate policies and rules across the various stakeholders. As indicated herein, the stakeholder here may be one or more of network operators, virtual network operators, one or more service providers (e.g., Amazon, Google, Yahoo, Apple, Facebook, Twitter, etc.), an application provider, an application developer, content providers, a financial institutions (e.g., banks, PayPal, etc.), an ID provider (e.g., Open ID providers such as Google, Yahoo, MySpace, etc.), the device manufacturer, service broker, and/or any other trusted entity. The stakeholder might also be the user or the subscriber.

The VPCRF may be configured to implement the logic for the resolution of conflicts across multiple stakeholders. For example, the VPCRF may include conflict resolution logic that takes as an input the preferences of the user or subscriber, rules of the user or subscriber, policy of the user or subscriber, the service level agreement, the desired QOS/QOE, the price, the context, and/or any other relevant input.

The VPCRF may render some or all of its functionalities in coordination with the virtualization functions in the WTRU. For example, the VPCRF may perform one or more functions in coordination with the cross stakeholder policy manager function in the WTRU. In an example, the VPCRF may perform some or all of its functionality alone.

The policies that the VPCRF may coordinate with the policy manager function in the WTRU may include each of the VPCRF policies or a subset of the VPCRF policies. By way of example, the policy and rules implemented by the VPCRF and/or policy manager function may include one or more of the following. For example, the VPCRF and/or policy manager function may implement Inter-operator mobility Policy (IOMP). IOMP may allow the configuration of multiple rules (e.g., at the WTRU and/or in the NW) to make a decision on which operator to prioritize for access in a validity area. In an example, the VPCRF and/or policy manager function may implement Inter-System Mobility Policy (ISMP). For example, ISMP may allow the configuration of multiple rules (e.g., at the WTRU and/or in the NW) to make a decision on which interface to prioritize for access in a validity area and/or considering the results from the IOMP rules. In an example, the VPCRF and/or policy manager function may implement Inter-operator routing policy (IORP) for the control of traffic offload and/or flow aggregation across multiple operators. IORP may allow the configuration of multiple rules (e.g., at the WTRU and/or in the NW) to make a decision on which operator should be used for transporting a given packet in a validity area. The IORP rules may be flow based (e.g., service data flow, packet flow, IP flow), bearer based, session based, service based and/or WTRU based and may be seamless offload rules or non-seamless offload rules. Examples of seamless offload rules may include IP Flow Mobility (IFOM) rules which may be used to specify the operator to be used when a traffic flow is classified using one or more of a source IP address, a source port, a destination IP address, a destination port, QoS, domain name, and/or the like. The routing criteria of the packets may also be based on time of the day, validity area, and/or the access point name (APN). Example seamless offload rules may include Multiple Access PDN Connectivity (MAPCON) rules that may be similar to IFOM, but the routing decision may be based on APN being used rather than or in addition to using a source IP address, a source port, a destination IP address, a destination port, and/or QoS, domain name. In an example, the VPCRF and/or policy manager function may implement Inter-System Routing Policy (ISRP). ISRP may allow the configuration of multiple rules (e.g., at the WTRU and/or in the NW) to make a decision on which access technology should be used for transporting a given packet in a validity area, for example considering the results from the IORP rules. The IORP rules may be flow based (e.g., service data flow, packet flow, IP flow), bearer based, session based, service based and/or WTRU based and may be seamless offload rules and/or non-seamless offload rules. Examples of seamless offload rules may include IP Flow Mobility (IFOM) rules which may be used to specify the operator to be used when a traffic flow is classified using one or more of a source IP address, a source port, a destination IP address, a destination port, QoS, domain name, and/or the like. The routing criteria of the packets may also be based on time of the day, validity area, and/or the access point name (APN). Example seamless offload rules may include Multiple Access PDN Connectivity (MAPCON) rules that may be similar to IFOM, but the routing decision may be based on APN being used rather than or in addition to using a source IP address, a source port, a destination IP address, a destination port, and/or QoS, domain name. In an example, the VPCRF and/or policy manager function may determine discovery information. For example, the discovery information may be policies used to assist the WTRU in efficient discovery of operators in the validity area. The discovery rules/policy may be used to assist the WTRU for the efficient discovery of services, service providers, and/or any other stakeholder. The discovery rules/policy may be used to assist the WTRU in efficient discovery of access technology in the validity area once an operator is selected. In an example, the VPCRF and/or policy manager function may implement security, authentication, and/or privacy control policy and rules across stakeholders. In an example, the VPCRF and/or policy manager function may implement charging policies (e.g., cross stakeholder charging rules). In an example, the VPCRF and/or policy manager function may implement virtualization layer rules for idle RAT/frequency selection priority in idle mode and/or RAT/inter-frequency handover in active mode (e.g., once an operator is selected and an access technology such as 3GPP versus WLAN versus WiMax is selected). In an example, the VPCRF and/or policy manager function may implement QoS policy. In an example, the VPCRF and/or policy manager function may implement one or more of user policies, subscriber policies, user preferences, subscriber preferences, user rules, and/or subscriber rules. In an example, the VPCRF and/or policy manager function may implement policy conflict mediation and resolution rules (e.g., rules for prioritization and pre-emptions across policies of various stake holders).

The VPRCF may be viewed as a policy and rules superset that may include one or more of a virtualization layer access network discovery and selection function (vANDSF), a virtualization layer policy and charging rule (vPCRF), and/or a virtualization layer subscriber profile ID (vSPID). The subscriber profile ID may be used for RAT/Frequency selection priority rules. The vANDSF may include IOMP, ISMP, IORP, ISRP and/or discovery information. In an example, the vANDSF may include the ISMP, ISRP, and a subset of the discovery information described above (e.g., the access network discovery) as is typical in a current ANDSF. The vANDSF may be used to configure the WTRU while the SPID may be used to configure the Access Point (e.g., eNB). The vANDSF may be used to configure the network (e.g., access pint such as eNB), and the SPID may be used to configure the WTRU. The VPRCF may have an interface to the application function (AF). The application function (AF) may be located in the same network domain as the virtual service provider network domain or in a network domain outside of the virtual service provider network domain. Such a domain may be a 3GPP domain or a non-3GPP domain (e.g., financial institution, third party service provider, etc.).

The VPRCF may interact with the WTRU (e.g., the cross stakeholder policy manager in the WTRU) for policy configuration data. For example, the VPRCF may interact with the WTRU based on triggering (e.g., by the WTRU and/or by the network) of one or more of a request for network connection, a request of service, direct request from the device (e.g., user action, subscriber action, expiration of a timer, etc.) and/or a direct network request (e.g., expiration of a timer). The triggers may be a result of one or more of a mobility event, a routing event (e.g., decision for service and traffic routing though one operator versus the other), a change in security, and/or a change in any of the policy data (e.g., security policy). The VPRCF may receive configuration information from the WTRU. The VPCRF may supply policy configuration information to the WTRU.

The VPRCF may provide to other functions in the network policy decision, policy data and/or rules and may otherwise assist other functions in the network to make policy decisions or use policy data and rules. For example, the VPRCF may coordinate policies and/or charging rules with the peer entity (e.g., client) in the WTRU. In an example, the VPRCF may coordinate policies and/or charging rules with the various policy and rule entities of the stakeholders involved in the orchestration of service delivery to the subscriber. The VPRCF may resolve or mediate conflicts of policies and rules in coordination with the WTRU and various stakeholders involved in the orchestration of service delivery to the subscriber. The VPRCF may configure the policy manager function in the WTRU with a global set of policy and rules valid across stakeholders.

In an example, the VPRCF may provision a WTRU policy and rule manager located in the cloud network with the policy and rules. For example, a network (e.g., an operator) serving the WTRU may contact the WTRU policy manager image in the cloud to download policy and rules information on how interact and deliver services to the WTRU. In an example, the WTRU policy manager located in the cloud may provision the VPRCF with the policies and the rules as it relates to a given WTRU. The WTRU may signal to the VPCRF the user or the subscriber own policy and rules.

The VPCRF may coordinate policies across some or all the dimensions of virtualization as described herein (e.g., operator virtualization, service virtualization, protocol stack virtualization across the various network layer such as radio access network layer, core network layer, application layer and/or service layer, and/or the like) and for some or all services.

As illustrated in FIG. 12B, FIG. 13B, or FIG. 14B, service application (Apps) control APIs and/or cross service provider APIs may be provided. The service Apps control APIs primitives may enable the services or applications providers to register or deregister, to install or de-install, to activate or deactivate, to update (upgrade or downgrade) or announce the provisioning of the designated services or applications over a service network (and the networked cloud).

Service Apps Control APIs may be a set of one or more interface primitives that enable the services and/or applications providers to register, deregister, install, de-install, activate, deactivate, update (e.g., upgrade or downgrade), and/or announce the provisioning of the designated services or applications over a service network (and the networked cloud). The Service Apps Control APIs may begin to enable the network service supply side to break the MNO monopoly. The Service Apps Control APIs may be used by one or more of the service application, application providers, application operators, the virtualized service network operators, the virtualized network cloud operators, and/or the like.

Although service and application providers may follow certain procedural steps to avail the designated service or application over the service network to the end users, the following APIs description does not enforce any execution order. For example, the Service Apps Control APIs may be used to register or de-register a service or application. For example, a service or application provider may perform the service or application registration to the service network to make entrance of the designated service or application to the service network (e.g., legally). During the registration, the provider may inform the network of one or more of the service/application name, the service/application functionality description, the service/application classification (e.g., the user/viewer-rating), the network-resource and/or network equipment hosting (of designated service/application) request, the end-user-requirement (e.g., monetary & equipment class or capacity), the monetary-arrangement-proposal-between the provider & the network, and/or the like.

The service network may grant the registration. Granting the registration may include one or more of granting an operating license, granting a contract with possibly revised resource support, establish monetary terms, establish the contract duration, establish the provider's obligation, and/or the like. The service network may grant the registration and allocate network resource or network connection resources for the provider for further installation or update actions. The service network may grant the registration with partial grant with conditions.

The service network may reject the registration for one or more reasons (such as not needed, too expensive, no resources, etc.). The rejection may include one or more of a reason code, a suggested remediation for reapply actions, or other rejection information.

The Service Apps Control API may be used to deregister a service or application. For example, a service or application provider may perform de-registration to remove the designated service or application from the service network.

The Service Apps Control API may be used to install or de-install a service or application. For example, the Service Apps Control API may be used install a service or application, in which case the service or application provider may perform the service or application installation to the service network equipment/platform (e.g., which may include both hardware and software and user-equipment-software). In an example, the service or application provider may use an installation of special connectivity or links between the network gateway and the provider's own platform (e.g., so the provider provides the hardware/software and user-software-downloads through the service network gateway and the special connection) to realize the designated service or application over the service network.

In an example, the Service Apps Control API may be used to uninstall a service or application. For example, a service or application provider may, for various reasons, uninstall its hardware/software for the provisioning of the specific service and application, or stop the special connectivity/links towards the service network gateway node.

The Service Apps Control API may be used to activate or deactivate a service or application. For example, a service or application provider may perform the service or application activation to make the designated service/application ready to serve. For example, the activation command/message may trigger the service network operator making announcements to its serving public. For various reasons, the service or application provider may perform the service/application deactivation, for example using the Service Apps Control API. The deactivation command/message may trigger the service network operator making announcements to its serving public.

The Service Apps Control API may be used to update (e.g., Upgrade or Downgrade) a service or application. For example, a service or application provider may upgrade the service or application for service improvement and/or application version upgrade to achieve better user experience. In an example, upgrading may or may not cause the older version be become unserviceable. The service or application provider may downgrade the service or application due to various reasons, for example the service or application provider may perform the service/application downgrade for monetary purposes.

The Service Apps Control API may be used to perform a service announcement for a service or application. A service announcement may be made either by the service network operator and/or by the service/application provider. For example, the service announcement may be an announcement of a service availability, a service upgrade announcement, a service advertisement, and/or the like.

The above described primitives for the Service Apps Control API between a service/application providers and a service network operator may be extended to a group of service network operators or to a Cloud network operator.

As illustrated by example in FIG. 12B, FIG. 13B, or FIG. 14B, the Cross Service Provider APIs may be utilized to accessing virtual resources. For example, the Cross Service Provider APIs may be a set of interface primitives that may be used by service network operators (e.g., service network operators willing to coordinate) for the exchange of information about available or sought after services/applications. The Cross Service Provider APIs may be a set of interface primitives that may be used by service network operators for the exchange of information about available or sought-for network resources and/or other interactions that may be used to coordinate resource and/or service provisioning in order to serve end-users. For example, the Cross Service Provider APIs may be used to attempt to provide universal availability/access to services and/or application anytime, anywhere, and to anyone.

For example, the Cross Service Provider APIs may be utilized to advertise and/or request available resources. For example, a set of primitives may be used such that an operator may advertise the availability of unused/accessible services/applications and/or unused/accessible network resources. Based on the advertisement, other operators may request using the available services/resources.

For example, an operator/service provider may be utilized to Cross Service Provide API to send a service or resource availability announcement. As an example, the service network operator may distribute the service or resource availability announcement to other service network operators to indicate the availability of one or more of services/applications/software, network resources (e.g., infrastructure, platform, etc.), connectivity resources (e.g., BW from point A to point B, etc.), resource types (e.g., CS/PS), offering policies (e.g., time duration, charging rate, etc.), and/or the like.

In an example, an operator/service provider may be utilized to Cross Service Provide API to send a service or resource request. For example, the service network operator may distribute the service or resource request to other service network operators to request that another service network operator allow the requesting service provider to use one or more of the services/application and/or network resources. For example, service or resource request may be a request to use the services or resources that were indicated as available in a service or resource availability announcement.

In an example, an operator/service provider may be utilized to Cross Service Provide API to send a service or resource request response. For example, the response may be a grant, where the responding service provider grants resource, for example based on the terms included in the request. In an example, the service or resource request response may be a rejection. For example, the rejection may indicate that the request was rejected and/or that there is no further possibility for the use of the request services and/or resources. In an example, the service or resource request response may be a type of negotiation request. For example, the negotiation request may propose different, and/or additional terms for the use of the request services and/or resources.

In an example, the Cross Service Provider APIs may be utilized to request service and/or resource help. For example, the Cross Service Provider APIs may include one or more primitives that may be used by an operator to distribute the list of services/applications and/or network resources that the sending operator would like help obtaining or using. For example, the request may ask for/seek help from an operator to obtain and/or use the services/application and/or network resources.

As an example, the Cross Service Provider APIs may include a service or resource help request announcement. The service or resource help request announcement may be sent to other service operators to indicate the sender's desire to obtain and/or use certain services/applications and/or network resources. For example, the service or resource help request announcement may indicate the sender's desire to obtain and/or use one or more of a specific service/application (e.g., by name and time, etc.), a SaaS, a certain connectivity (e.g., BW from A to B) request, a certain infrastructure/platform, a resource/service according to a certain buying/renting monetary proposal (e.g., paying rate, terms, etc.), and/or the like.

In an example, the Cross Service Provider APIs may include a service or resource offering bid request. The service or resource offering bid request may be a message that is sent to a service network provider that requested help for a service or resource. For example the service or resource offering bid may be sent in response to a service or resource help request announcement. The service or resource offering bid may include a bid to supply services/applications or network resources to a service provider who requested the help. For example, the service or resource offering bid may include terms such as one or more of a time of service/resources, duration of services/resources, an amount of services/resources, monetary terms, and/or the like.

In an example, the Cross Service Provider APIs may include a service or resource offering bid response. For example, the service or resource offering bid response may be an agreement, wherein a bid request may be granted using the previously discussed or offered usage terms (e.g., the terms include in the service or resource offering bid request). The service or resource offering bid response may be a rejection. For example, the rejection may indicate that the request was rejected and/or that there is no further possibility for help using the request services and/or resources. In an example, service or resource offering bid response may be a type of negotiation request. For example, the negotiation request may propose different, and/or additional terms for the help with the request services and/or resources.

In an example, Cross Operator Network Control APIs may be a set of primitives used by a service network operator to enable the service network operator to interact with the physical network providers, for example to enable the virtual network operation. The physical network provider may be a commercial mobile network, such as 3GPP network in GSM/GPRS, UTRA, and/or E-UTRA. For example, the Cross Operator Network Control APIs may be used to command/request a physical network to join/leave the service network operation. For example, the physical network may or may not have a prior agreement (e.g., may be differed by the paying rate). The Service Network may ask a particular physical network that lacks prior agreement with the service network to accommodate some of the service network operation on behalf of a particular member WTRU when the WTRU starts connecting to the physical network for service network operation.

As illustrated in FIG. 12B, FIG. 13B, or FIG. 14B, the Cross Operator Network Control APIs and/or Network Resource Control APIs may be provided. The Cross Operator Network Control APIs may be used to advertise directly and/or command the physical network provider to advertise the available services/applications from the service network operator and/or from the cloud network. In an example, the Cross Operator Network Control APIs may be used to command/request a part of the physical network to participate to/retreat from a particular service network operation. In an example, the Cross Operator Network Control APIs may be used to command/request a part of the physical network to participate to/retreat from a particular service network operation for one or more specific WTRUs. In an example, the Cross Operator Network Control APIs may be used to command/request a physical network to allow/provide a WTRU with certain number of services and/or service actions. The services/actions may include one or more of directly verifying the paying credibility of the WTRU, passing the verification of the paying credibility of the WTRU with a certain financial service center, allowing WTRU registration directly with the service network operator, allowing WTRU to perform authentication directly with the Service Network operator, allowing or disallowing the physical network serving a particular WTRU from using/allocating a particular service (e.g., service or mobility specific actions), and/or the like. Allowing or disallowing the physical network serving a particular WTRU from using/allocating a particular service may include, for example, one or more of allowing/disallowing handover, allowing/disallowing roaming, allowing/disallowing area change, allowing/disallowing CS services, allowing/disallowing PS services, allowing/disallowing location services, allowing/disallowing proximity services, and/or the like.

In an example, the Network Resource Control APIs may be a set of interface primitives and/or action semantics that may be used between a service network operator and a physical network provider and/or between one physical network provider to another physical network provider for providing ubiquitous services to the WTRUs. For example, physical network C-plane and/or U-plane connectivity establishment actions with the service network or with a neighboring physical network provider may be controlled using the Network Resource Control APIs. For example, the Network Resource Control APIs may provide a logical path between a Node-A (e.g., a node serving a WTRU using a service) and a Node-B (e.g., a node in the service network). As an example, the Node-A may be within a requested physical network and Node-B may be a service network node or a neighboring physical network node that is requesting/commanding Node-B to perform some service or use some resource. In an example, the Network Resource Control APIs may provide a physical path between a Node-A to a Node-B through routing over other networks. The other networks may be non-3GPP mobile networks such as WiFi, WiMAX, cable networks, and/or microwave networks. In an example, the Network Resource Control APIs may be used to indicate one or more of time requirements, BW requirements, QoS requirements, routing/priority handling requirements, and/or the like. In an example, the Network Resource Control APIs may be used to indicate charging offerings and/or charging requirements. In an example, the Network Resource Control APIs may include a request to share one or more of a RAN node, a CN control node, and/or CN gateway node.

As described herein, a cloud network may be utilized to provide virtualized access to services/applications and/or network resources. Different types of cloud networks (e.g. end user service application level, general internet cloud network, core network specialized cloud network, access network specialized cloud network, billing specialized cloud network, etc.) may be provided.

For example, a cloud network (which may be referred to as a simple cloud herein) may be a cloud of cloud networks, for example including cloud controllers and data centers. The simple cloud network may include different types of cloud networks, for example one or more of specialized networks, service logic clouds, general purpose business logic, utilities clouds, and/or the like. For example, the cloud as depicted in the architecture may include one or more of a cloud network at the radio access network level, a cloud network at the core network level, and/or a cloud network at the service level. The cloud network at the service level may include one or more of specialized service clouds, general purpose clouds, other business support related clouds, and/or the like.

The cloud architecture may be configured to expose APIs at each level of the cloud. For example, there may be APIs to access the radio access network, APIs to access the core network level, and/or APIs to access the high layer service level. The signaling (e.g., control plane protocol) bearers as well as other traffic bearers (e.g., application signaling and user traffic) may effectively be routed through a very flat cloud network architecture thereby reducing overall end-to-end latency. The actual signaling and traffic network may be handled by the same node, e.g., as a result of outsourcing each level of the access network (e.g., RAN & core network) into the cloud. This may allow further optimization of the protocol stack architecture and further optimization of the functional split between the RAN and the core network for example.

The WTRU may communicate with the cloud at one or more levels (e.g., radio network level, core network level, higher layer service/application level, etc.). The cloud may hold instances and/or a WTRU virtual machine, which may be a type of replica of the WTRU instance into the cloud.

The WTRU architecture, e.g., as illustrated in FIG. 12A, FIG. 13A, or FIG. 14A may be a multi-dimension virtualization WTRU architecture. For example, the architecture depicted in as illustrated in FIG. 12A, FIG. 12B, and FIG. 12C may be a user centric architecture where the WTRU may access the network on a service basis, for example regardless of the operator network used, the service provider used, and/or the radio access technology used. In another dimension, the WTRU resources (e.g., computation resources, storage resources, networking logic, protocol and algorithms logic, etc.) may be virtualized into the cloud. An example of a use case in support of such network resource virtualization in the context of the radio access network may be the case of reconfigurable radio systems. For example, a layer of the radio protocol stack could be dynamically reconfigured with one or more of a protocol logic, baseband and radio processing algorithms, an operation frequency spectrum, and/or an operation bandwidth located in the cloud. In another example, the implementation of the radio protocol in the WTRU may be a shell (e.g., light client) whiles the actual processing and the algorithms may reside in the cloud. For example, assuming radio link control (RLC) logic is virtualized in the cloud, the WTRU may establish one connection based on onboard radio protocol logic and may use that connection to access the cloud-remote radio link logic.

In another dimension, the WTRU implementation of the services (e.g., business logic) provided to the users or other business support services (e.g., tracking of real time charging and remaining credit, etc.) may be virtualized into the cloud. These dimensions may be integrated and/or activated together, for example as illustrated in FIG. 12A, FIG. 12B, and FIG. 12C. In an example, the architecture may include more or fewer dimensions, for example as depicted by the WTRU architectures presented in FIG. 13A, and FIG. 13B, and FIG. 14A, FIG. 14B and FIG. 14C.

One or more of the service/operator virtualization manager function, the multi-operator network function, the cross stakeholder policy manager function, and/or the user validation function may be configured to implement the operator virtualization logic. For example, the operator virtualization logic may facilitate WTRU access to any service or application seamlessly through any operator network or multiple operator network simultaneously (e.g., at essentially the same time from the perspective of the user).

One or more of the multi-cloud manager functions, the cloud controller function, the cross stakeholder policy manager function, and/or the user validation function may be configured to implement the logic of the WTRU resource virtualization (e.g., computation resources, storage resources, networking logic, protocol and algorithms logic, etc.) into the cloud. For example, the decision making logic to use an onboard radio protocol logic for a particular service or a connection versus a remote cloud radio protocol logic for the same service or versus a radio protocol logic as per the reconfigurable radio system approach may be implemented by these functions.

The architecture may have provisioning for separate security domains for each stakeholder. The stakeholder may be a network operator, a virtual network operator, a service provider (e.g., Amazon, Google, Yahoo, Apple, Facebook, Twitter, etc.), an application provider, an application developer, a content provider, a financial institution (e.g., banks, PayPal, etc.), an ID provider (e.g., Open ID provider such as Google, Yahoo, MySpace, etc.), a device manufacturer, service broker, and/or any other trusted entity.

The security domain may house security credentials (e.g., user security credentials, device security credentials, etc.), virtual currencies, virtual credit cards, virtual SIM enabled credit cards, and/or the like. The user validation function may interact with the security domain(s) to validate the user identity and/or the device identity as per the security level requirements of the service being delivered and/or as per the security level requirements of the stakeholder(s) the device is in interaction with.

The service virtualization manager may be the functional entities in the WTRU that implement the logic for one or more of services discovery, services control, and/or access to the services independently of which operator network is used and/or independent of the service provider. The service virtualization layer may implement an abstraction logic that may decouple service logic from operators' specific (e.g., proprietary) implementation of the network. The service virtualization manager may implement APIs for the application that may allow the users, the application developers, the service providers, etc. to control how the services are accessed in a standardized way, for example by providing the user a uniform service experience across network and across service providers. The APIs may include APIs for applications residing directly in the device and/or APIs to interact with the virtualization layer in the network or to interact with the applications residing in the network above the virtualization layer APIs. The service virtualization function may interact with the virtualization layer service and application entity for the orchestration of service delivery to the user independently of the network provider or service provider. The service/operator virtualization manage function may poll for detail on broadcasted services or for available services (e.g., service or application catalogue) and/or service attributes (e.g., NW resource requirement, pricing, minimum QOS requirement, security credential requirements, etc.). The service virtualization manager may interact with the virtualization layer function in the network (e.g. VNMF), for example for the selection of the operator network that may be used for the delivery of each specific service. The service virtualization function may interact with the VSACF and/or the VSAPCF for the selection of the security level for a given service and/or the deployment of that security level.

The Service virtualization function may interact with the cross-stakeholder policy function to ensure the user accesses the services in compliance with the set of policies defined by the user, the operators, the service providers, and/or any other participant stakeholder. The set of policies used by the service virtualization function may be a set of coherent policies derived by the cross stakeholder policy function based on the stakeholder individual policy set. The service virtualization function may lack direct access to individual stakeholders' policy set. The service virtualization function may interact with the cloud manager, for example to control what cloud network is used to outsource WTRU resources into the cloud.

Multi-Operator Network Manager Function may be provided. The Multi-Operator Network Manager Function in the WTRU may handle one or more of the virtualized Operators' Networks. These networks may be networks in which the WTRU has previously operated in, in which the WTRU is currently operating in, in which the WTRU is about to operate with, that has been detected by the WTRU, under which the virtual service network(s) the WTRU has previously operated with. Under which the virtual service network(s) the WTRU is currently operating with, and/or under which the virtual service network(s) the WTRU is about to operate with. The WTRU may or may not have a subscription (or prior subscription) with the involved virtualized operators.

In the Multi-Operator Network Manager Function, for each Operator's network the WTRU may collect (e.g., or together with the Cross Stakeholder Police Manager Function) various access permission/restriction information, security and data protection information, node ID/address/configuration and network routing information, traffic throughput and QoS information, charging rate information, and/or the like. The collection may be received from the Cross Stakeholder Police Management Function, the Service/Operator Virtualization Manager Function, and/or the Connection Manager Function. The Multi-Operator Network Manager may interact with the virtualized service network VNMF entity for updating relevant information for one or more of the relevant Operator's networks.

Based on the WTRU state and/or the input from the Service/Operator Virtualization Manager Function, the Multi-Operator Network Manager may provide input to or advise over the Connection Manager Function for the employing/maintaining/switching in or out of a certain Operator's network for a certain service/application that the end-user/WTRU has chosen to run.

Cross Stakeholder Policy Manager Function may be provided. The Cross Stakeholder Policy Manager Function in the WTRU may be a function supporting service delivery in the multi-stakeholder service environment. For example, the Cross Stakeholder Policy Manager Function may consolidate and/or coordinate policies and rules across the various stakeholders. The stakeholders may be one or more of network operators, virtual network operators, one or more service providers (e.g., Amazon, Google, Yahoo, Apple, Facebook, Twitter. etc.), an application provider, an application developers, content providers, a financial institutions (e.g., banks, PayPal, etc.), an ID provider (e.g., Open ID providers such as Google, Yahoo, MySpace, etc.), the device manufacturer, a service broker, and/or any other trusted entity. The stakeholder may be the user or the subscriber. The subscriber may be the same as the user or may be different. For example, in the enterprise scenario, an employee may be the user of a service and the enterprise may be the subscriber of the service.

The policy manager function may implement the logic for the resolution of conflicts across multiple stakeholders. Such conflict resolution logic may use as an input, the preferences, rules and policy of the user or subscriber, the service level agreement, the desired QOS/QOE, the price, the context, and/or any other relevant input.

The policy manager may render any of its functionalities in coordination with the virtualization functions in the network (e.g., VNMF, VSACF, VSAPCF, VPRCF or VSS, cloud UE virtual machine, etc.). In an example, the policy manager may perform some or all of its functionality alone.

By way of example, the policy and rules implemented by policy manager function may include any of the following. For example, the policy manager function may implement Inter-operator mobility Policy (IOMP). IOMP may allow the configuration of multiple rules (e.g., at the WTRU and/or in the NW) to make a decision on which operator to prioritize for access in a validity area. In an example, policy manager function may implement Inter-System Mobility Policy (ISMP). For example, ISMP may allow the configuration of multiple rules (e.g., at the WTRU and/or in the NW) to make a decision on which interface to prioritize for access in a validity area and/or considering the results from the IOMP rules. In an example, policy manager function may implement Inter-operator routing policy (IORP) for the control of traffic offload and/or flow aggregation across multiple operators. IORP may allow the configuration of multiple rules (e.g., at the WTRU and/or in the NW) to make a decision on which operator should be used for transporting a given packet in a validity area. The IORP rules may be flow based (e.g., service data flow, packet flow, IP flow), bearer based, session based, service based and/or WTRU based and may be seamless offload rules or non-seamless offload rules. Examples of seamless offload rules may include IP Flow Mobility (IFOM) rules which may be used to specify the operator to be used when a traffic flow is classified using one or more of a source IP address, a source port, a destination IP address, a destination port, QoS, domain name, and/or the like. The routing criteria of the packets may be based on time of the day, validity area, and/or the access point name (APN). Example seamless offload rules may include Multiple Access PDN Connectivity (MAPCON) rules that may be similar to IFOM, but the routing decision may be based on APN being used rather than or in addition to using a source IP address, a source port, a destination IP address, a destination port, and/or QoS, domain name. In an example, policy manager function may implement Inter-System Routing Policy (ISRP). ISRP may allow the configuration of multiple rules (e.g., at the WTRU and/or in the NW) to make a decision on which access technology should be used for transporting a given packet in a validity area, for example considering the results from the IORP rules. The IORP rules may be flow based (e.g., service data flow, packet flow, IP flow), bearer based, session based, service based and/or WTRU based and may be seamless offload rules and/or non-seamless offload rules. Examples of seamless offload rules may include IP Flow Mobility (IFOM) rules which may be used to specify the operator to be used when a traffic flow is classified using one or more of a source IP address, a source port, a destination IP address, a destination port, QoS, domain name, and/or the like. The routing criteria of the packets may be based on time of the day, validity area, and/or the access point name (APN). Example seamless offload rules may include Multiple Access PDN Connectivity (MAPCON) rules that may be similar to IFOM, but the routing decision may be based on APN being used rather than or in addition to using a source IP address, a source port, a destination IP address, a destination port, and/or QoS, domain name. In an example, policy manager function may determine discovery information. For example, the discovery information may be policies used to assist the WTRU in efficient discovery of operators around the validity area. The discovery rules/policy may be used to assist the WTRU for the efficient discovery of services, service providers, and/or any other stakeholder. The discovery rules/policy may be used to assist the WTRU in efficient discovery of access technology in the validity area once an operator is selected. In an example, policy manager function may implement security, authentication, and/or privacy control policy and rules across stakeholders.

In an example, the policy manager function may implement charging policies (e.g., cross stakeholder charging rules). In an example, the policy manager function may implement virtualization layer rules for idle RAT/frequency selection priority in idle mode and/or RAT/inter-frequency handover in active mode (e.g., once an operator is selected and an access technology such as 3GPP versus WLAN versus WiMax is selected). In an example, the policy manager function may implement QoS policy. In an example, the policy manager function may implement one or more of user policies, subscriber policies, user preferences, subscriber preferences, user rules, and/or subscriber rules. In an example, the policy manager function may implement policy conflict mediation and resolution rules (e.g., rules for prioritization and pre-emptions across policies of various stake holders).

The policy manager may interact with the network (e.g., Virtualization functions in the network such as VNMF, VSACF, VSAPCF, VPRCF, VSS, cloud UE virtual machine, etc.) for policy configuration data. The interaction may be used, for example, upon the triggering (e.g., by the WTRU or by the network) of a request for network connection, a request of service, a direct request from the device (e.g., user action, subscriber action, expiration of a timer, etc.), direct network request (e.g. expiration of a timer), and/or the like. The triggers may be a result of mobility event, routing event (e.g. decision for service and traffic routing though one operator versus the other), change in security, change in policy data (e.g. security policy), and/or the like.

The policy manager may receive configuration information from the network. The policy manager may supply policy configuration information to the network (e.g., user or subscriber preferences, rules and policies, etc.). The policy manager may provide to other functions in the WTRU information such as policy decisions, policy data, rules, and/or otherwise assist other functions in the WTRU to make policy decisions and/or use policy data and rules. The policy manager may coordinate policies across some or all dimensions of virtualization (e.g., operator virtualization, service virtualization, protocol stack virtualization across the various network layer such as radio access network layer, core network layer and application and service layer, and/or the like).

User Validation Function may be provided. The User Validation Function may be the function in the WTRU that may be responsible for the validation of the user credentials. For example, the User Validation Function may be responsible for the validation of user credentials with respect to each stakeholder. In a network and a service delivery paradigm, the network operator may control how the service is delivered to the user and may determine that the device accessing the network and its services are trustworthy. The device may authenticate the network and may determine that a network is accessing a genuine and trustworthy network. In the context of service delivery though a virtualized network and the associated multi-stakeholder service environment, it may be determined that the user accessing the network and the services has the proper credentials. For seamless delivery of services, the user validation may coordinate the security credentials among the various stakeholders while maintaining separation between security domains, e.g., to provide seamless deliver of service.

The user validation function may implement the logic that maintains security, authentication, integrity, and/or privacy association between the user and the various stakeholders involved in the orchestration of service or services. The user validation function may coordinate across multiple security domains and may derive a global cross stakeholder security credentials for a given connection or service. There may be multiple security contexts and/or security associations (e.g. one-to-one security context and one-to-one security association) between the user and the various stakeholders involved. In an example, there may be a single security context (e.g. credential) or a security context association for any given session regardless of how many stakeholders (e.g. operators) are involved.

The User Validation Function may render some or all of it functionalities in coordination with the virtualization functions in the network (e.g. VNMF, VSACF, VSAPCF, VPRCF or VSS, cloud UE virtual machine), for example with the network virtualization layer security, authentication and privacy control function. In an example, the user validation function may perform some or all of its functionality alone.

The user validation function may interact with the network functions (e.g. VSAPCF) and the various security domains on the WTRU for security data configuration. This configuration may, for example, take place upon the triggering (e.g., by the WTRU and/or by the network) of a request for network connection, a request of service, upon a direct request from the device (e.g., user action, subscriber action, expiration of a timer, etc.), upon a direct network request (e.g., expiration of a timer), and/or the like. The triggers may be a result of mobility event, routing event (e.g., decision for service and traffic routing though one operator versus the other), change in security, change in policy data (e.g., user or subscriber policy, rules or preference, etc.), and/or the like.

The User Validation Function may receive configuration information from the network. The user validation function may supply security configuration information (e.g., credential) to the network (e.g., user or subscriber preferences, rules and/or security to the network).

The User Validation Function may maintain separation between the device user domains and may conceal related detail to other functions. An example of multiple users' scenario is when the device is shared between multiple users.

The security User Validation Function may abstract the security processing logic from the individual security domain implementation. The security user validation function may decouple the other functions from the detail of security logic.

The user validation function may control the provision and the use of the parameter (e.g. identity, key, or addressing number, etc.) that may be used to access a network. For example, there may be a number (e.g., similar to 911) that may be used by a service-based access WTRU for the initial access to a network on the fly. The user validation function may interact with the network for the provision and control of such number.

Security Domain Construct may be provided. Multi-security domain architecture in the WTRU may enable the hosting of multi-stakeholder (e.g., multi-operator,) multi-domain application execution environment in the WTRU. There may be several security domains on the device. These security domains may be organized (e.g., segregated) per stakeholder. The domains may be separated per virtualization dimension (e.g., type of virtualization as considered in this disclosures such as operator virtualization, NW resource virtualization into the cloud, WTRU resource virtualization into the cloud, network resource virtualization in the sense of network resource pooling across multiple network operators), and/or the like. In an example, the domains may be separated on the basis of security strength level. The security domain may be organized in a hierarchy. For example, the security domain may be separated on stakeholder basis then for each stakeholder, there may be sub-domains on the basis of the intended application (e.g., type of virtualization, security strength level, etc.). The security domains may be segregated on per network layer basis (e.g., access network versus service network).

The security domains may hold the various credentials in support of the security, authentication, integrity and/or privacy. Multiple security domains may be active simultaneously. The security domains may be instantiated on the fly. For example, when a user discovers a service and decides to avail of the service and/or purchase a subscription from a trusted entity (e.g., ID provider), one or more security domains may be instantiated on the fly to support the session.

Context Manager Function may be provided. The Context Manager Function may implement the logic of how various contextual information sources may be tied in to the decision process and/or control how the WTRU interacts with the network. Examples of such interaction may be a service discovery, service selection, the control of a service, operator network selection, a service provider selection, and/or any other stakeholder selection. In the case of network virtualization, the context manager may trigger or provide context information in support of service discovery, operator network selection, service provider selection and/or providing information on whether or not to initiate the virtualization of network resource or WTRU resources into the cloud.

Multi-Cloud Manager Function may be provided. The Multi-Cloud Manager Function may implement the logic for cloud network selection and may expose cloud configuration and/or cloud service control common API to the upper layer applications. The Multi-Cloud Manager Function may focus on inter-cloud communication logic and may abstract upper layer applications from individual cloud specific implementation. The Multi-Cloud Manager Function may interact with the cross stakeholder policy manager function for a consistent experience and/or seamless cloud service delivery across multiple cloud networks and in compliance with the policy and set rules the stakeholders utilized (e.g., including the user and the subscriber). The Multi-Cloud Manager Function may coordinate with the service virtualization function for the virtualization of service into the cloud.

The Cloud Manager Function may interact with the cloud controller for the control of the session with a specific cloud service or cloud network provider. The multi-cloud manager function may instantiate a cloud controller instance dynamically. The Cloud Manager Function may implement the logic of the IPX network selection. The cloud manager function may implement logic for the selection of internet based cloud versus IPX based cloud.

Cloud Controller Function may be provided. The Cloud Controller Function may be the function in the WTRU that controls the communication with individual cloud network. The Cloud Controller Function may manage the cloud context toward individual cloud network. The Cloud Controller Function may expose individual cloud network control APIs to the upper layer application.

Contextual Information Source may be provided. The Contextual Information Source may manage the various source of context information on the device and may abstract other applications of the detailed implementation of each context information source. The Contextual Information Source may interact with other drivers on the network. The Contextual Information Source may interact with the context manager.

Figure 15:
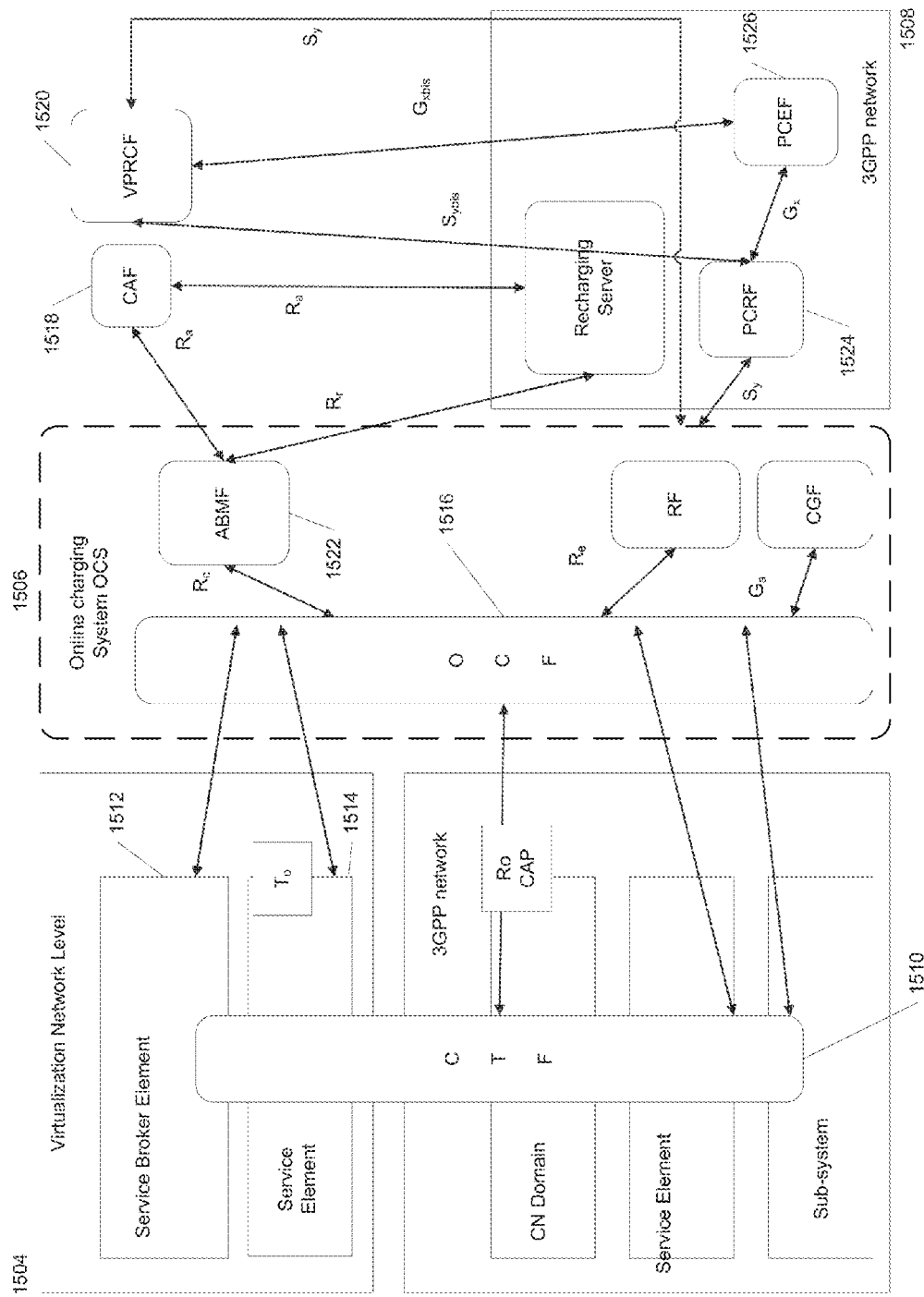
FIG. 15 illustrates an example of a logical online charging architecture.

FIG. 15 illustrates an example of a logical online charging architecture. As illustrated in FIG. 15, the virtualization layer 1504 service network elements and/or service broker elements 1512 may implement a charging trigger function (CTF) 1510. The charging trigger function in this layer may be similar to the 3GPP charging system. The virtualization layer service elements 1514 and/or service broker elements 1512 may produce charging data records and/or charging events and may forward such information to the Online Charging Function (OCF) 1516. The charging events may be forwarded to the OCF 1516, e.g., to obtain authorization for the chargeable event/network resource usage requested by the user. The CTF 1510 may delay the actual resource usage until permission by the Online Charging System (OCS) 1506 is granted. The CTF 1510 may track the availability of resource usage permission (e.g., quota supervision) during the network resource usage. The CTF 1510 may enforce termination of the end user's network resource usage when permission by the OCS 1506 is not granted or expires.

The OCS 1506 may be located in the 3GPP network, in the virtualization network, in both networks, and/or outside of both networks. As such, the online charging function may be a distributed function implemented in both the 3GPP network and in the virtualization. In that case, the equivalent functions in both domains may communicate over a well define interface. The reference point for the interface may be referred to as $T_o$. By way of example, the $T_o$ may be between a virtualization network element and the OCS. In addition to the virtualization layer policy and rules control function (VPRCF) 1520, in support of the logical charging architecture, a credit authority function (CAF) 1518 may be utilized. The credit authority function may be the function that implements the logic of ensuring that a user has sufficient funds/money (e.g., or the equivalent thereof such as financial units/credit units) to pay for the requested service. For example, the CAF 1518 may be located in a financial institution (e.g., banks, PayPal, credit card companies, etc.). An interface $R_a$ may be provided between the CAF 1518 and the account balance management function (ABMF) 1522, and may be based on the Diameter protocol. An interface may be provided between the CAF 1518 and the Recharging Server 1524. That interface may be denoted as $R_a$ by way of example and may be based on the Diameter protocol. The CAF may be distributed between the (virtualization) network (e.g., financial institution) and the WTRU.

Figure 16:
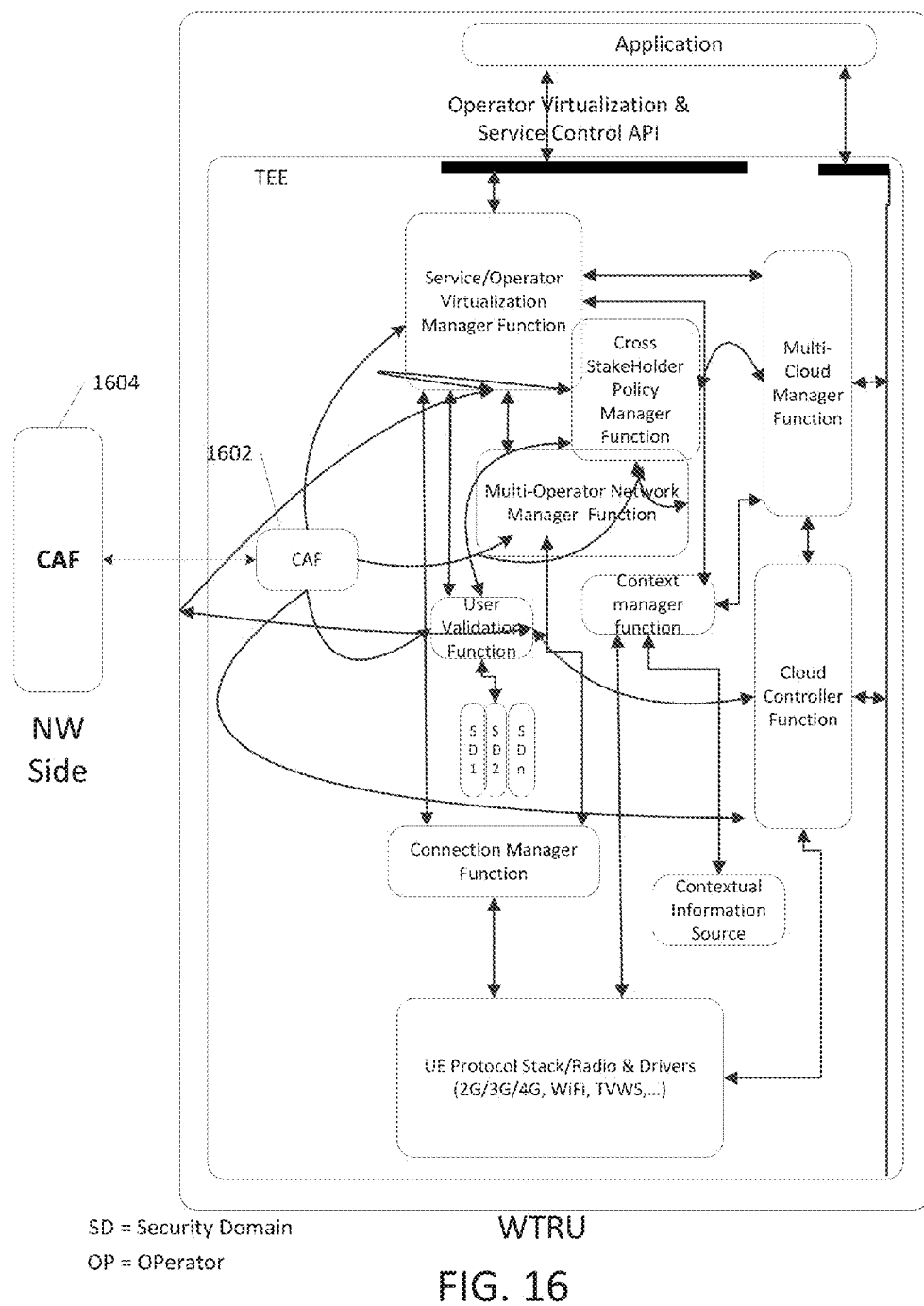
FIG. 16 illustrates an example of a distributed implementation of a credit authority function between a WTRU and the network.

FIG. 16 illustrates an example of a distributed implementation of a credit authority function between a WTRU and the network. The CAF in the WTRU 1602 may interact with other functions in the WTRU for the coordination and evaluation of the payment capability of services.

In an example, the CAF may be exclusively implemented in the network (e.g., as illustrated by CAF 1604). In another example, the CAF may be exclusively implemented in the WTRU 1602.

For example, the CAF function in the WTRU 1602 may implement virtual credit cards and/or virtual wallet payment logic. When the CAF is distributed between the network 1604 and the WTRU 1602, the CAF in the WTRU 1602 may coordinate with the CAF 1604 in the virtualization network for the payment. For example, a user of the device with a virtual credit card may not be the party who may pay for the bills (e.g., child may use the device but parents may pay the bill, or an employee may use the device but the employer may pay for the bill, etc.). In such scenario, there may be coordination between the CAF on the device 1602 and the CAF in the network 1604 for the payment.

The CAF function in a device 1602 may be equipped with a near filed communication (NCF) capability or similar capability. The CAF 1602 may provide the ability of the mobile payment for services and goods purchased offline (e.g., in physical stores). The CAF 1602 may provide feedback to the CAF 1604 in the network, for example, the detail of purchase items.

As illustrated in FIG. 15, an interface may be established between the VPRCF 1520 and the PRCF 1524 (e.g., 3GPP architecture policy and charging control function). This interface may allow the VPCRF 1520 to coordinate charging policy and rules with the PCRF 1524 of the various operators' networks providing service to the user. That interface may be denoted as $S_{ybis}$ by way of example. An interface may be provided between the VPCRF 1520 and the PCEF 1526. This interface may allow the coordination of the enforcement of the policy and charging rules between the VPCRF 1520 and the PCEF 1526 (e.g., policy and charging enforcement function) of the various operators networks providing service to the user. The service broker element may be the virtualization layer network element that acts as a broker of service between the service providers and the access networks providers.

Figure 17:
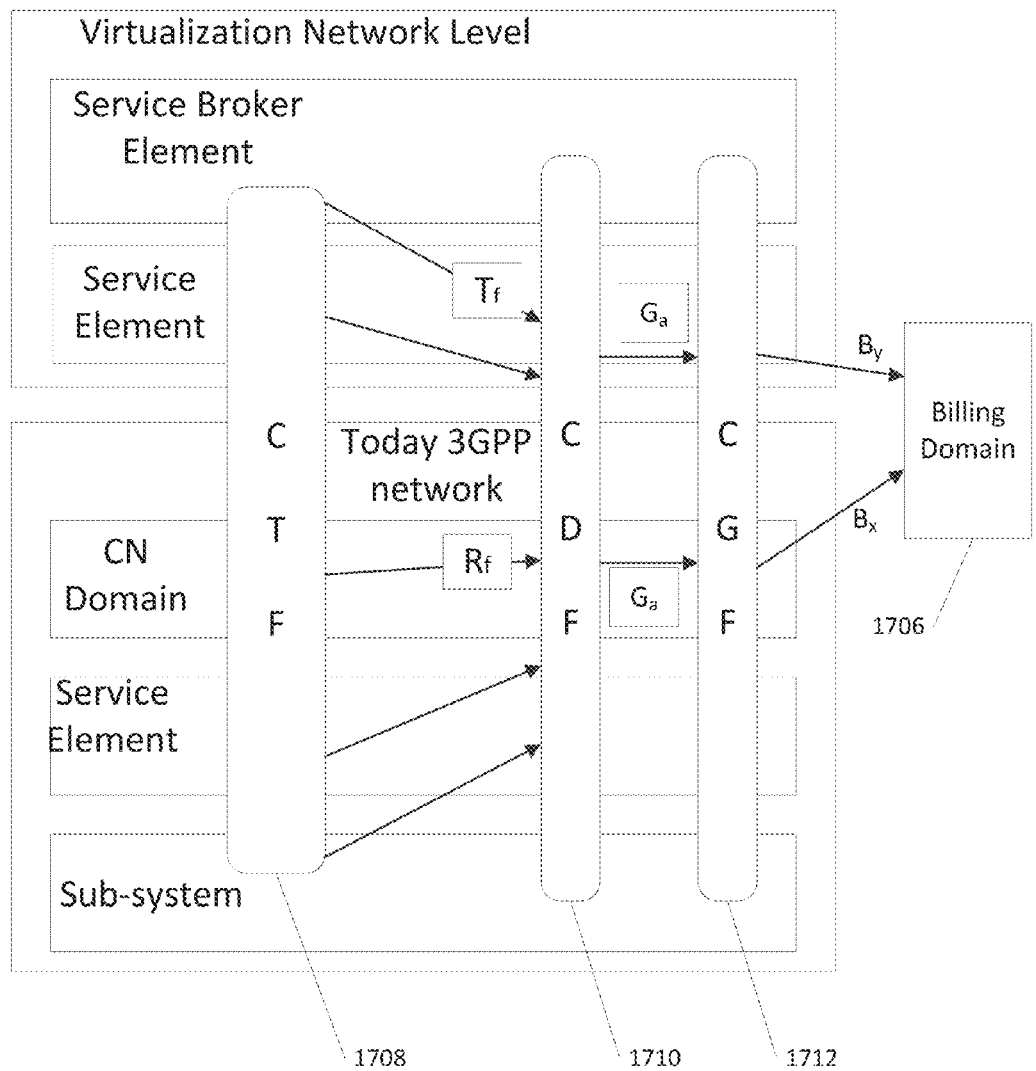
FIG. 17 illustrates an example of a logical offline charging architecture.

FIG. 17 illustrates an example of one or more logical charging functions, and the reference points between these functions and the billing domain. The virtualization layer service network elements or service broker elements may implement one or more of a charging trigger function (CTF) 1708, a charging data function (CDF) 1710, and/or a charging gateway function (CGF) 1712. The charging trigger function in this layer may perform functions similar to the 3GPP charging system. The virtualization layer service elements or service broker elements may produce charging data and charging events and may forward such information to the charging data function (CDF) 1710. The CDF may produce charging data records (CRDs) using the data received from the CTF 1708 and may forward these CDRs to the CGF 1712 for a transfer to the billing domain.

An offline charging reference point between the virtualization network elements and the CDF 1710 may be provided. A reference point may be defined between the CDF 1710 and the CGF 1712 in the virtualization network domain. The reference point defined between the CDF 1710 and the CGF 1712 in the virtualization network domain may be referred to as $G_a$ by way example. A reference point for CDR file transfer between the virtualization network layer CGF 1712 and the billing domain 1706 may be provided. That reference point may be denoted as $B_y$, by way of example. An end-to-end protocol stack for example including web based application protocols for the implementation of the APIs (e.g. RESTful/HTTP, SOAP/HTTP, etc.) may be provided.

The development of virtual network may be a long process and the initial phase may be a hybrid architecture built on top of the technology. IMS offers flexibility and may be used across multiple mobile network operators, fixed land operators, and/or Wi-Fi operators, and may offer flexible connection to various service providers. Therefore, IMS may be an important building block in virtual network architecture.

A virtual network architecture with IMS may be provided and examples of how to use this architecture in coordination with IMS to achieve operator agnostic, service agnostic, and/or resource agnostic operation may be described. For example, an IMS implementation of the proposed Virtual Network Architecture may be provided. The IMS architecture may include some or all of the functions of the proposed Virtual Network Architecture and may be considered as an intermediate implementation of the proposed virtual network architecture. For example, one IMS implementation may implement virtual network architecture on the network side without major changes to WTRU functionality. A cloud API for use with an IMS architecture virtual network may be provided. Support for Network Agnostic services, e.g., using the IMS virtual network architecture may be provided. Support for Service Agnostic using the IMS virtual network architecture may be provided. The network resource agnostic procedure using IMS may be provided. Although IMS may be used in examples and descriptions, the concepts may be applicable to other virtual network architectures.

Figure 18:
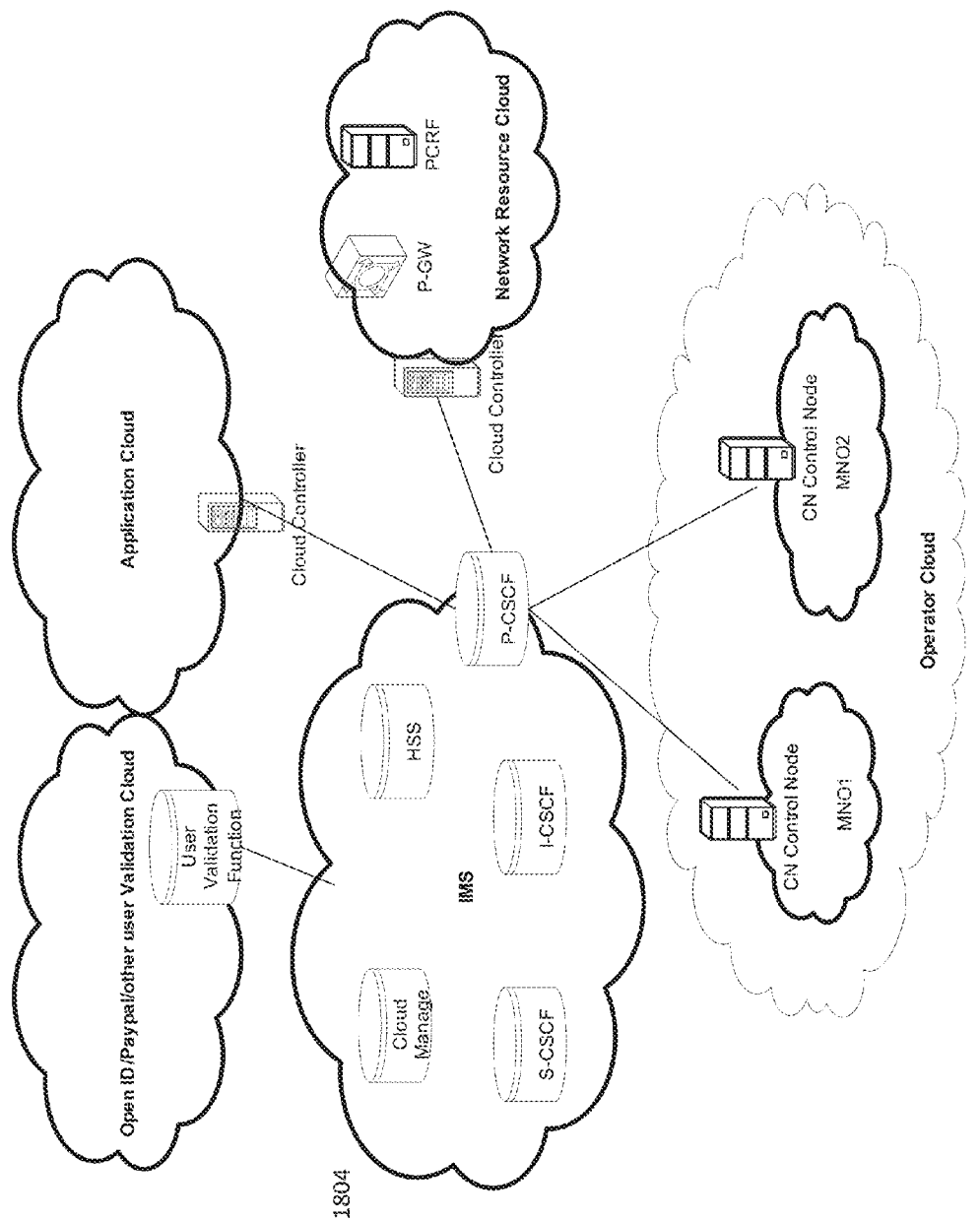
FIG. 18 illustrates an example of virtualized network architecture with IMS.

FIG. 18 illustrates example virtual network architecture with IMS 1804. The IMS system may be connected to multiple cloud operators. To enable the IMS system to support cloud computing, an IMS Cloud Manager (ICM) in the IMS system may be provided. The IMS Cloud Manager may be connected to the Cloud Controller of connected Cloud Operator(s) (e.g., MNO1, MNO2, etc. as illustrated in FIG. 18). The IMS Cloud Manager (ICM) may receive the service information from cloud operators and may negotiate a service contract with the cloud operators.

ICM may be a functional counterpart of the Cloud Manager as described herein. ICM may perform some or all of the functions described for the Cloud manager and may support the following functions. For example, the ICM may maintain a database of available services, the service price, the service requirements, and/or other relevant information. Each service provider (e.g., application, network resources, MNO, etc.) may register its service to the ICM. The ICM may function as a middle man between the service providers and the service requesters. To the services providers, the ISM may offer a way to validate the user's identity and/or provide a guaranteed payment method. To a service requester (e.g., a user), the ICM may negotiate the best deal suitable for the service request and may provide the service requester a way of acquiring suitable services without direct dealing with each individual service provider. For example, the service requester may send requests to ICM for certain types of services (e.g., cellular service). The request may include information on the type of the requested services, duration, QoS, location, validation, party, and/or other information. The ICM may use the interface with the user validation cloud to validate the user. The ICM may negotiate with the service provider for the requested services. Then IMS may inform the user about how to get the requested services.

The MNO operator may be a service provider that provides the cellular and other kind of services. Depending on the traffic load and other network conditions, the MNO may request resources (e.g., MME resources, P-GW resources, and/or RAN resources) from the network resource cloud, for example through the defined API from the IMS Cloud Manager (ICM). Each MNO operator may have a Cloud Control Node (MNOCCD) that may be connected to IMS. The MNO Cloud Control Node may be a functional counterpart of the Cloud Controller described herein and may be configured to perform similar functionality as was described for the Cloud Controller. The MNO Cloud Controller may serves as an interface between MNO operator and IMS cloud. For example, the MNO Cloud Control Node may be an access point for the MNO operator to other Cloud(s). The MNO Cloud Controller may allow an MNO operator to acquire extra network and/or RAN resources from a resource cloud, may provide an MNO operator's excess network and/or RAN resource to the resource cloud, and/or may control the manner in which the MNO operator's network and/or RAN resources may be accessed by other users.

In an example, the MNOCCD may register to the IMS system and may send resource request/release to the ICM. For example, the ICM may be responsible for finding suitable resources from a Network Resource Cloud and/or negotiating a price for the user. The MNO provider may use the IMS cloud function to obtain requested resources without knowing the location and/or the owner of the resource.

The Network Resource Cloud may be linked to the IMS system via its Network Resource Cloud Control Node (NRCCN). The MRCCN may be a functional counterpart of the Cloud Controller described herein and may perform one or more of the functions described with respect to the cloud controller. Each MNO operator or network/RAN holder may register its excess resource information with the MRCCN. The MRCCN may present these resources (e.g., PGW, MME, RAN, SNSN, PRCF, HSS, etc.) to the outside as available resource that may be used by other operators. The MRCCN may lease the resources through IMS system to the requested party.

The Application Cloud may be a cloud that may include various applications. For example, the Application Cloud may be connected to the IMS through an Application Cloud Control Node (ACCN). The ACCN may be provided by MNO or third parties. A user may access to the application the user has an account or lease it through IMS. The user validation cloud may be an aggregation or validation agency, for example, open ID, a bank, PayPal, etc.

Figure 19:
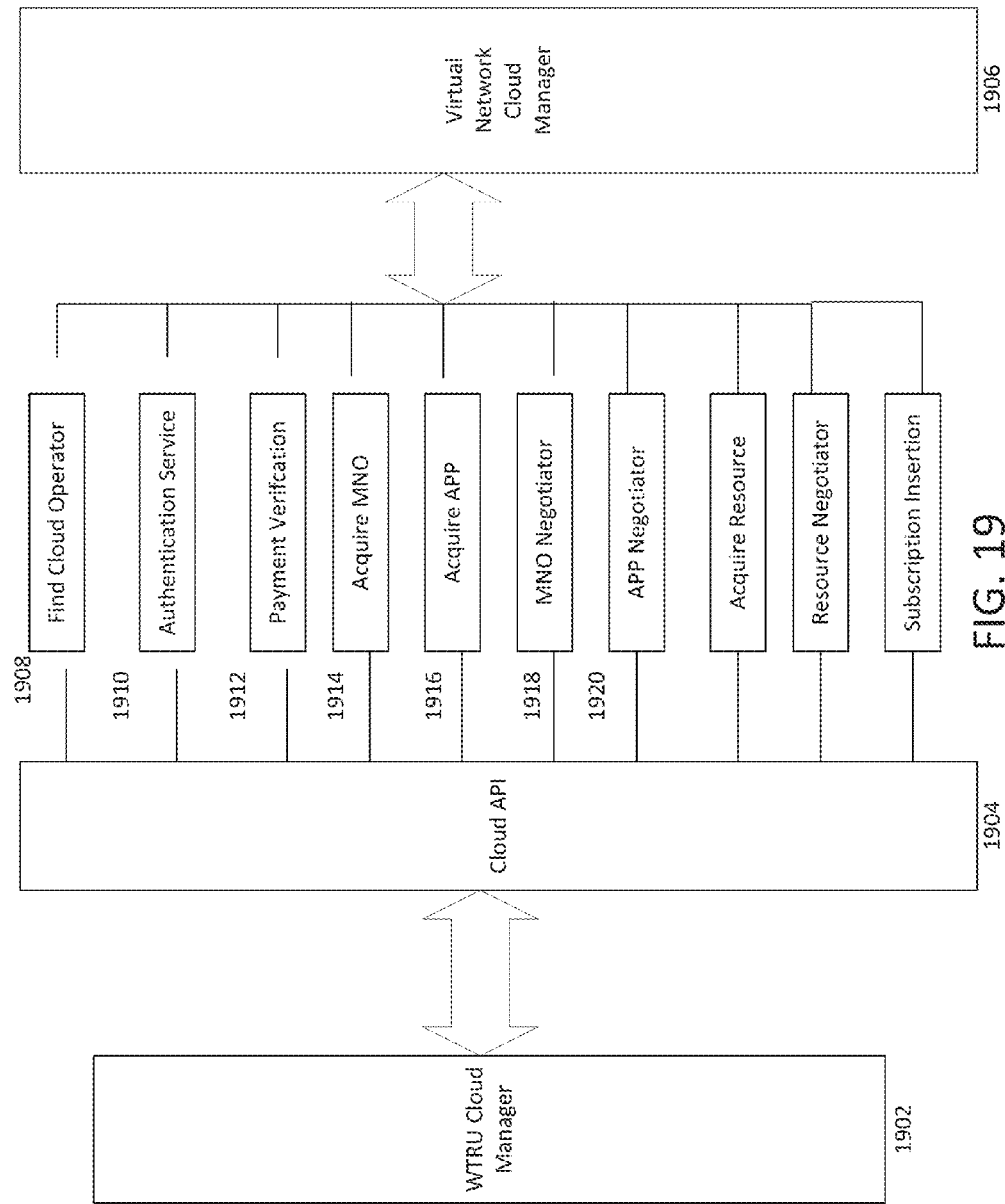
FIG. 19 illustrates an example of a cloud API for a virtual network architecture.

FIG. 19 illustrates an example cloud API for a virtual network architecture. The cloud API 1904 may be used by the WTRU Cloud Manager 1902 to obtain access to the services and/or resources provided by the virtual network. For example, Find Cloud Operator 1908 may return the found virtual network operators. For example, Authentication Service 1910 may provide the authentication services. For example, the Payment Verification 1912 may provide the payment verification service. For example, the Acquire MNO 1914 and Acquire APP 1916 may acquire the requested services, and the MNO Negotiator 1918 and APP Negotiate 1920 may negotiate for the requested services.

Figure 20:
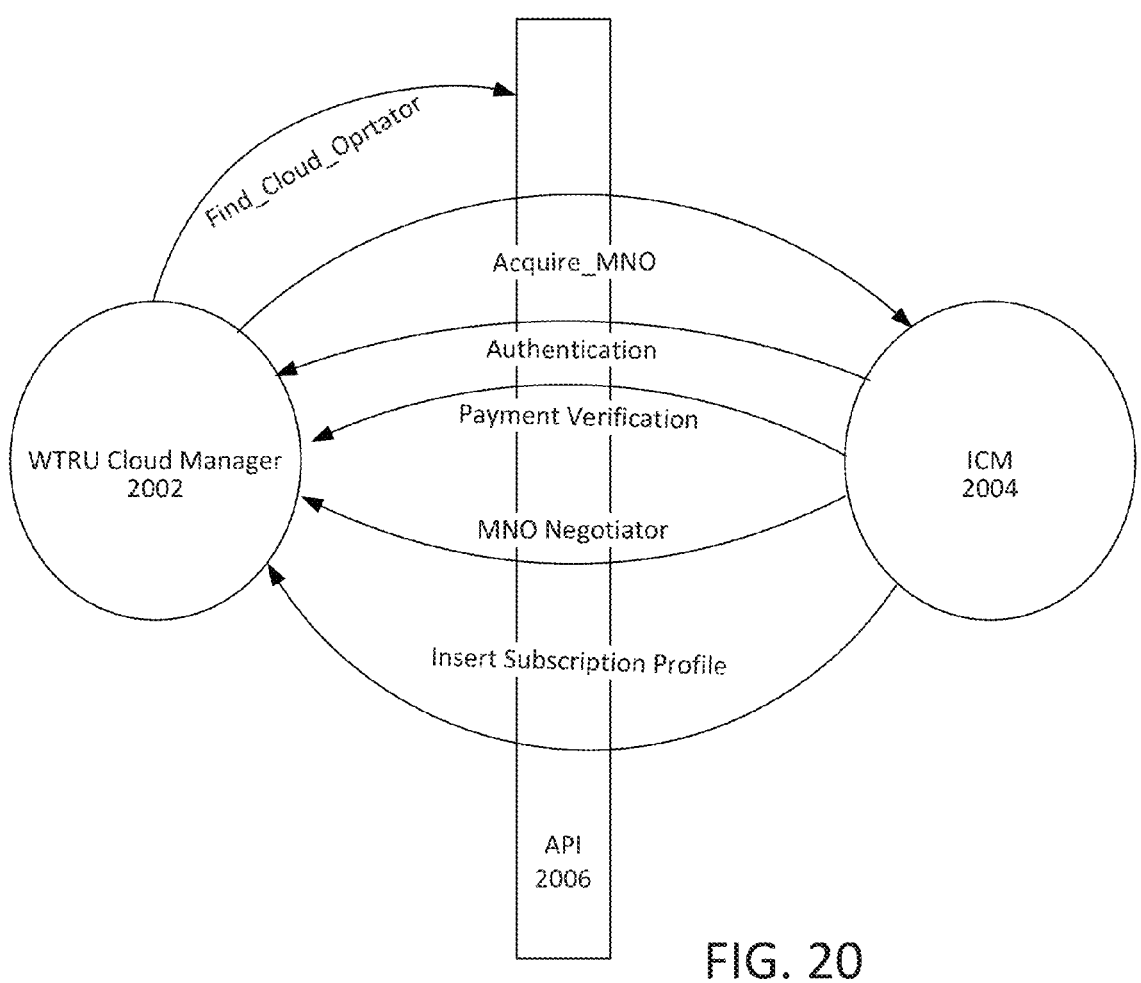
FIG. 20 illustrates an example of an API call flow for an operator selection in support of operator agnostic network access.

For purposes of description and explanation, an example of a network agnostic service may be considered. FIG. 20 illustrates an example of API for an operator selection in support of operator agnostic network access. In an example, the user or the WTRU may be allowed to select an operator on the fly without previous subscription to the specific operator. For example, an identification of each MNO that supports network virtualization architecture with IMS may be broadcasted, indicating that the MNO supports IMS based NW virtualization. A user who may lack a subscription to an MNO and may be willing to use the cellular service though virtual network operation may listen to the broadcast and select a virtual network provider.

When a user who may not have a previous subscription to an MNO is willing to acquire a cellular service, one or more of the following may be performed. For example, using an API function call sequence. As illustrated by example in FIG. 20, the WTRU Cloud Manager 2002 may call the Find_Cloud_Operator function. The Find_Cloud_Operator function may take one or more input parameters and may return the found cloud operator or operator list. The input parameters may include one or more of a target cloud operator list and/or a cloud selection criterion. For example, the target cloud operator list may include one or more of a favorite cloud operator list, a last used cloud operator, and/or any other list indication of cloud operators. The cloud selection criteria may include one or more of a best reviewed operator criteria, a ranking criteria, and/or other indication of operator quality. For example, an operator may broadcast its service review level, and the user may limit the search to the services that rank better than a certain criteria.

When the Find_Cloud_Operator returns the found operator list, the WTRU Cloud Manager 2002 may call the Acquire_MNO_Service function. The Acquire_MNO_Service function of the API 2006 may trigger the remove function call in the IMS cloud manager. The function parameters may include one or more of a service request (e.g., including one or more of a service type, a service duration, a Quality of Service (QoS), a region, and/or the like), a validation method, a payment option, and/or the like. The ICM 2004 may initiate another API call, for example the Authentication_User function. The Authentication_User function may remotely invoke the corresponding functions in $3^{rd}$ part authentication application (e.g., Open ID, WTRU Cloud Manager, etc.). The Authentication_User function may return an OK when the authentication is passed and a fail when authentication fails.

Then ICM may initiate another API call to verify the user's payment. The function called Payment_Verification may remotely invoke the corresponding function in $3^{rd}$ party application (e.g., PayPal, bank, WTRU Cloud Manager, etc.). The Payment_Verification function may return an OK when the payment is verified and a fail when payment is not verified.

The ICM may call MNO_Negotiator function to negotiate a network service for the WTRU. The MNO Negotiator function may remotely invoke the corresponding function in WTRU and/or MNO operators. The MNO_Negotiator function may return the selected MNO operator when negotiation with at least one MNO succeeds, or a fail when negotiations fail. After negotiation function(s) return success, the ICM may call the insert_Subscription_profile function to insert the user's subscription into MNO operator and the WTRU.

Figure 21:
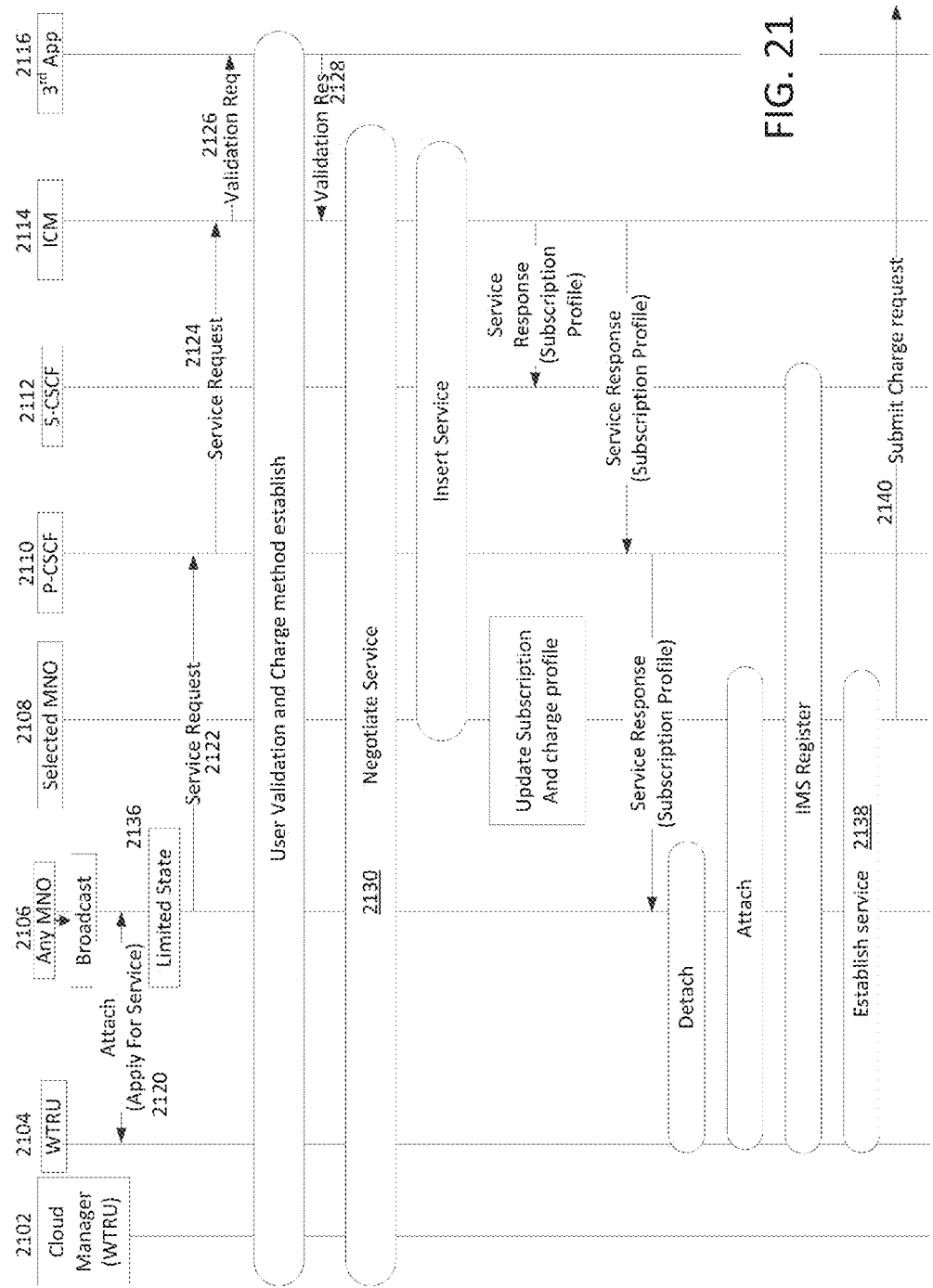
FIG. 21 illustrates and example of an API for an operator selection in support of operator agnostic network access.

FIG. 21 illustrates and example of an operator selection in support of operator agnostic network access. An API call may translate into multiple signals exchanges between WTRU and virtual network. As illustrated in FIG. 21, at 2120 the user or the WTRU 2104 may attach to the virtual network supported MNO 2106 with attach type, for example Access to Cloud Service type. The user or the WTRU 2104 may specify one or more of a selected P-CSCF, a selected IMS provider, a service request (e.g., service type, duration, QoS, Region, etc.), validation method, payment option, and/or the like in the message.

When the MNO 2106 receives an Attach Request (e.g., at 2120) with type Access to Cloud Service, the MNO 2106 may give the WTRU 2104 a temporary ID and admit the WTRU 2104 with limited service 2136. During this state, the network may limit the service the user can access. For example, the network may limit one or more of the time the WTRU 2106 may access the network, the APN the WTRU may access, the destination the WTRU may access, the priority of the WTRU's service (e.g., the WTRU may be limited to best effort IP services), the bearers, the WTRU may create, and/or the like. At 2122, the network 2106 may send a service request to a P-CSCF 2110. Based on the selected IMS system, the P-CSCF 2110 may select an ICM 2114 to handle the request. At 2124, the P-CSCF may send the service request to the ICM 2114.

When ICM 2114 receives the service request (e.g., the IE may be embedded in IMS message such as register request), the ICM 2114 may use a third party application 2116 to validate the user identity. The ICM 2114 may use the validation option in the request message to select a validation provider, and/or the ICM 2114 may contact the user to negotiate for the validation provider. The third party validation provider may be an Open ID provider and/or other validation service provider. At 2126, ICM may send a validation request to the third party application 2116. At 2128, the ICM may receive a validation response from the third party application 2116. After validating the user, the ICM 2114 may validate the user's payment options. The payment option validation party may either be a bank, a credit card company, PayPal, and/or other type of financial service. The ICM 2114 may establish a payment policy for the user. The WTRU Cloud Manager node 2102 may handle the cloud authentication and payment validation.

After ICM 2114 validates the user and payment, as illustrated in FIG. 21, at 2130, the ICM 2114 may negotiate service with different providers. The negotiation may occur between the ICM 2114 and the service provider's cloud control node and/or may involve the WTRU cloud manager node 2102. In an example, the ICM 2114 may negotiate service with IMS provider by selecting an S-CSCF 2112 for the user and may insert user profile into the S-CSCF 2112. The ICM 2114 may negotiate cellular services with one or more cellular service providers. The negotiation may consider one or more of the price of using the network, the usage of the network, the region the WTRU wants to access to the requested services, the service the WTRU has requested, the QoS, the network load, and/or the like. The negotiation may occur between the ICM 2114 and the service provider's cloud control node and/or may involve the WTRU Cloud Manager node 2102. Once the ICM 2114 selects an MNO 2108 for the requested service, the ICM 2114 may supply the subscriber profile and charge information to the selected MNO 2108.

The selected MNO 2108 may create a temporary subscription for the user. In an example, the MNO 2108 may create a link to the user subscription files stored in S-CSCF. The selected MNO 2108 may save the charge information for the user for which it may submit charge requests later. If the selected MNO 2108 and the access MNO 2106 for the WTRU 2104 are the same MNO, the MNO may change WTRU status to Normal Service and may remove limitations put on the WTRU. At 2138, the WTRU 2104 may access the MNO (e.g., the selected MNO 2108) for the service as negotiated. If the selected MNO and the access MNO for the WTRU are different, at 2132, the MNO may detach the WTRU. In the detach message, the MNO may include a subscription profile for cellular service.

The user may select the correct MNO based on the received subscription profile, via a service response (e.g., a service response). For example, the service response may be a Detach message. The selected MNO may authenticate the user itself, for example based on a temporary subscription and/or contacting the S-CSCF for authentication. At 2140, the MNO (e.g., the selected MNO) may submit the charge request to the right institute (e.g., bank, PayPal, etc.) using the determined charging information.

Figure 22:
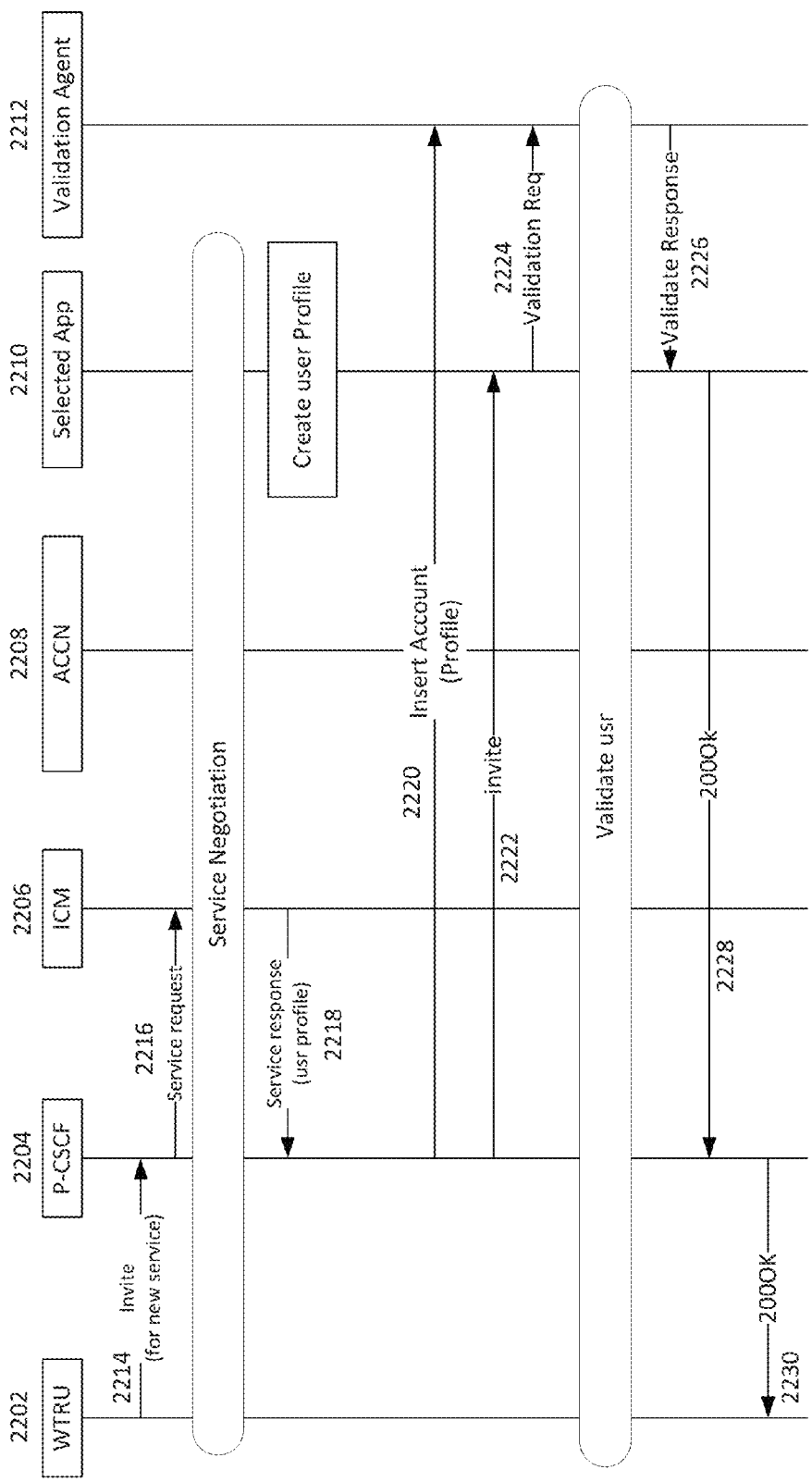
FIG. 22 illustrates an example of a service provider selection in support of service access in an operator agnostic network.

FIG. 22 illustrates an example of a service provider selection in support of service access in an operator agnostic network. For example, at 2214 a WTRU 2202 may send a service request using a modified or IMS message. The service request may refrain from indicating a recipient, e.g., when the WTRU may be unaware of the provider of the service. At 2216, the P-CSCF 2204 may forward the request to the ICM 2206, e.g., when the P-CSCF 2204 may receive the message. The ICM 2206 may contact the application cloud control node (ACCN) 2208 to negotiate for the requested services, e.g., based on the service(s) that have been requested. The negotiation may be based on the user request and/or predefined criteria. For example, the negation may take into account parameters such as one or more of the amount the service charges, QoS, the load of the service provider, and/or the like. The ICM 2206 may select a service provider to provider the requested service based on the negotiation parameters and/or the negotiation with one or more service providers. The negotiation may result in the creation of an account in the selected service for the application. The negotiation may result in the creation of a user profile in the selected application. The profile may include one or more of an access, right, an access level, an indication of allowed services, charging information, an identification of a validation agent (e.g., Open ID, etc.), and/or the like.

The negotiation may occur between the ICM 2206 and the ACCN 2208. In an example, the ACCN 2208 may function as an agent between the ICM 2206 and the service providing application 2210. The negotiation may occur between the ICM 2206 and the service providing application 2210, e.g., via the ACCN 2208. In an example, the ICM 2206 and ACCN 2208 may be agents, e.g., similar to the buyer's agent and seller's agent in the real estate transaction. The negotiation may occur between WTRU's Cloud Manager and the service providing application. At 2218, after negotiation is complete, the ICM 2206 may send a response to the P-CSCF 2204 which may include the information about the selected service application and/or user access information. At 2220, the P-CSCF 2204 may insert the access information into a validation agent (e.g., Open Id provider). At 222, the P-CSCF 2204 may forward the invite message to the service application based on the selected service application information. At 2224, the selected service application 2210 may send a validation request to the validation agent 2212. At 2226, the selected service application 2210 may receive a validation response from the validation agent 2212. the At 2228, the service application 2210, after validating the user, e.g., with a third party validation agent 2212, may grant the service by sending back a 200Ok message. At 2230, the P-CSCF may forward the 200Ok message to the WTRU 2202.

Figure 23:
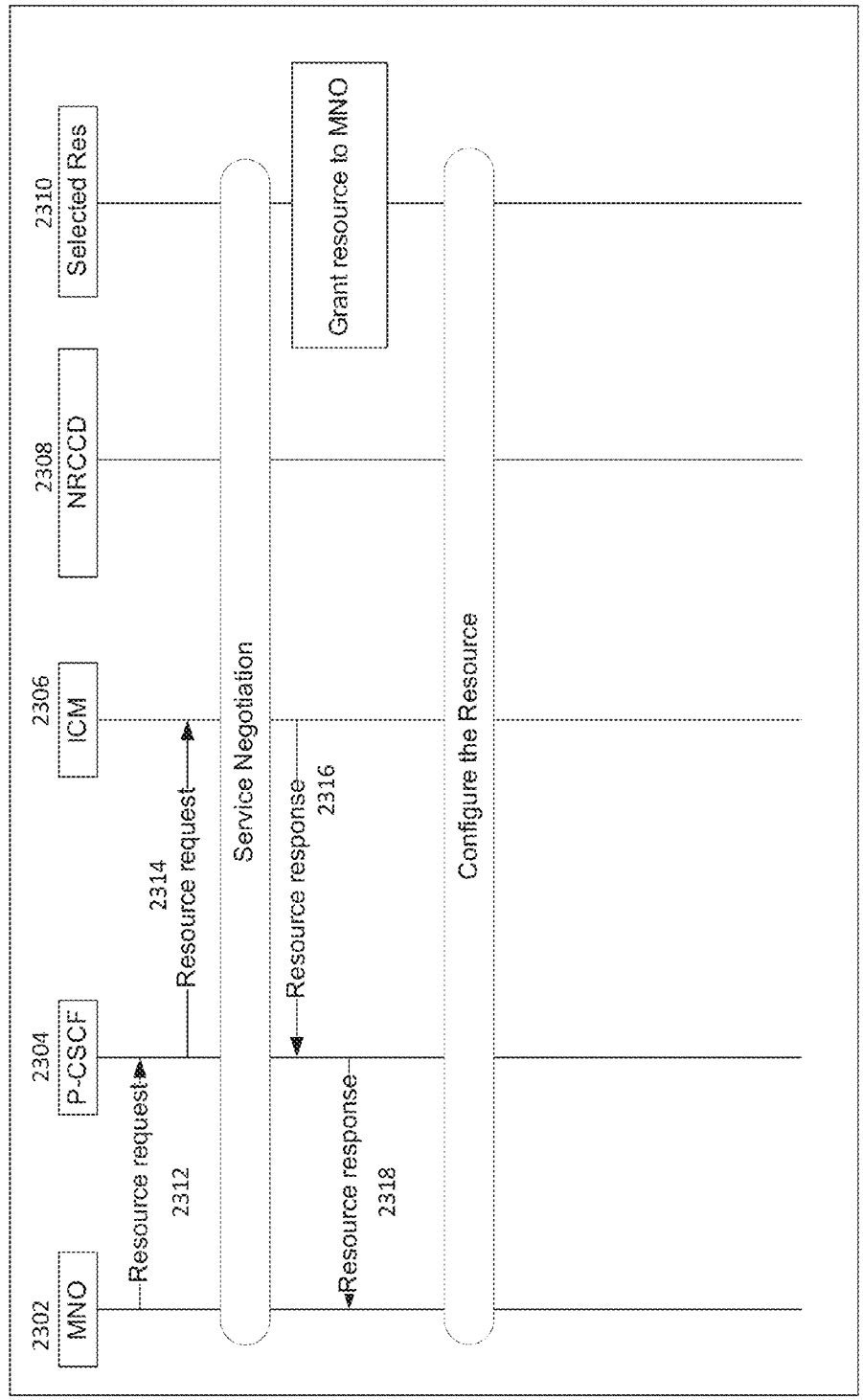
FIG. 23 illustrates an example signaling in an architecture that may support resources virtualization by means of pooling of resource in RAN sharing context or pooling or resource in the context of cloud computing.

FIG. 23 illustrates an example of signaling in an architecture that may provide resources virtualization, for example, by pooling of resources in RAN sharing context and/or pooling or resource in the context of cloud computing. For example, when the MNO desires additional resources, (e.g., MME, P-GW, etc.) the MNO may send a resource request to its P-CSCF. The request may include information on the requested resource. For example, the information on the requested resource may include one or more of the type of requested resource, the number of requested resources, the parameters associated with the requested resource (e.g., number of supported connections, etc.), the duration of the lease, the QoS, the maximum accept rates, the region, the supported protocols, and/or the like.

The examples illustrated in FIG. 21, FIG. 22, and/or FIG. 23 may be used individually for a specific task or may work together as the building blocks for a more complicated task. For example, a user or a WTRU that may not have any previous subscription to a network may want to access the network for a service (e.g., to access HBO or other media). FIG. 21 provides the operator selection while the FIG. 22 provides the service provider selection. FIG. 23 illustrates an example of how the operator may pool access virtualized network resources from either pooling resources from a set of disparate physical networks or pooling network resources from the cloud.

As illustrated in FIG. 23, at 2312 the P-CSCF 2304 may receive the request from a MNO 2302. At 2214 the P-CSCF 2304 may forward the request to an ICM 2306. ICM 2306 may negotiate with network resource cloud control node 2308 for the requested resources. The NRCCD 2308 may select resources, e.g., based on the request and/or user preferences. After the resources have been selected, at 2316 the IMS (e.g., in ICM 2306) may send a resource Response message to P-CSCF 2304. The P-CSCF may forward the resource Response message to the MNO 2302, and MNO 2302 may configure the selected resources for its own use.

The paradigm that prevails in offering of services, delivered through both fixed and mobile networks, may rely on an operator-specific access and operator-independent service delivery. Operator-specific access may occur when network access may be tied to a specific network operator, e.g., through a subscription-based scheme where a user may hold a subscription to an Internet service provider (ISP), or a mobile network operator (MNO)), or through a pre-paid-based scheme such as, for example, where a user may buy credit that may be used a posteriori to access services provided by at least one of an ISP or MNO.

Operator-independent service delivery may occur when services may be provided (e.g., independently) from the network operator through multiple service providers such as, for example, social networking, (Facebook®, Twitter®), mailing services, (Google® Mail, Yahoo® Mail), stock quoting services, weather services, and wireless transmit/receive unit (WTRU)-based location services such as services provided by Android.

A user of an operator-specific access and an operator-independent service delivery may be forced to enter into a service contract or pay for services that the user has not received. Even when the user may not use the services paid for.

In the recent years, the landscape in the wireless and mobile communication industry has been evolving at an accelerated pace with an increasing flexibility of data services delivery on different devices with more and more integration between the different stakeholders of the industry. Some of the most recent revealing activities from the standardization landscape and industry trends perspective may include one or more of the following. For example, techniques may be provided for modified or enhanced network sharing with consideration of multiple core networks, e.g., sharing a common radio access network (RAN) that may be geographically split. The networks may share a common geographical area, common spectrum, with multiple RANs sharing a common core network mechanisms for efficiently sharing common RAN resources according to identified RAN sharing scenarios, (e.g., pooling of unallocated radio resources), techniques to verify that the shared network elements provide allocated resources according to sharing agreements/policies, and an indication of and potential actions upon overload situation in consideration of sharing agreements/policies. For example, the third generation partnership project (3GPP) study on interworking between mobile operators using the evolved packet system (EPS) and data application providers (MOSAP). The global system for mobile communication association (GSMA) one application programming interface (API) initiative where an effort is underway to define a commonly supported set of lightweight and Web friendly APIs to allow mobile and other network operators to expose useful network information and capabilities to Web application developers, thereby creating an ecosystem conducive to a rapid and innovative service development and deployment across multiple network operator platforms under a uniform framework. Smart phones, tablets, and cloud computing are converging in the rapidly growing field of mobile cloud computing. Multi-subscriber identity module (SIM) card standby terminals, which are phones that until recent years have been largely eschewed by the larger phone manufacturers partly due to their close ties with mobile phone networks that may prefer that customers use one network exclusively. Manufacturers such as Nokia and Samsung have started producing these phones, which may target customers (e.g., from developing countries).

These trends may lead to a change in a paradigm where the user may take a center stage with more control pushed from the network/operator to the device. The user may choose desired services regardless of which MNO may offer the services. The user may choose the services with or without a cellular subscription.

A service delivery paradigm may be provided, where one or more of the following aspects may be provided. For example, services may be provided to an end-user based on subscriber needs and not MNO capabilities. For example, ubiquitous network accessibility may be provided. Services may be delivered anywhere, anytime and to any user, e.g., based on user credentials and the user's ability to pay without reliance on a MNO as a middle man, without a prior subscription or a prior service agreement and thereby avoid network limitation and enabling access to multiple networks, better quality of service (QoS), (e.g. higher data rates), and/or better network utilization. For example, the end-user may be charged, while roaming, based on the services that she/he demands and not on the location where these services are delivered. For example, a consistent user experience where the underlying network and service complexity may be hidden to the user while satisfying the requirements above. Network Operators may profit from services running across their networks. The user accessing any service, anywhere, anytime based on the user credentials and the user's ability to pay without a prior subscription to an operator. One or more models may be provided that may allow service providers to offer services that include both the service and the access network, (e.g., Google °, Yahoo®, Apple® or Facebook®), network operator to offer network resources for services providers, and equipment vendors to offer professional services, e.g., including operating the network.

FIGS. 12A, 12B, and 12C illustrate an example of an end-to-end architecture of a virtualized network which may include a WTRU architecture and a network architecture. The architecture may be a multi-dimension virtualization architecture which may be described as architecture of a network of networks. For example, the architecture may include a RAN, a core network (CN), a service network and a cloud network. As described herein, in one of the dimension, the operators may be virtualized. In a dimension, the service providers may be virtualized. In a dimension, the network resources, (computation resources, storage resources, networking logic, protocol and algorithms logic), may be virtualized into the cloud. An example of use case in support of such network resources virtualization in the context of the radio access network may be the case of reconfigurable radio systems. The architecture using three dimensions of virtualizations may offer an operator agnostic and/or technology access agnostic and/or service provider agnostic network and service access.

In a dimension, the network resources may be virtualized in the sense of dynamic resource pooling across multiple networks. One exemplary use case for this scenario may be RAN resources, (spectrum, radio resource block, cells), sharing. In another dimension, the WTRU resources, (computation resources, storage resources, networking logic, protocol and algorithms logic), may be virtualized into the cloud. Again, an example of use case in support of such network resources virtualization in the context of the RAN may be the case of reconfigurable radio systems.

In a dimension, the services, (e.g., business logic), provided to the users or other business support services, (e.g., charging and billing support system, operator support system), may be virtualized into the cloud. These dimensions may be integrated and activated together as depicted in FIGS. 12A, 12B, and 12C, may be activated individually, or may be activated in any combination.

The end-to-end virtualized network architecture FIGS. 12A, 12B, and 12C may support operator virtualization and cloud computing. Although not explicitly shown in the FIGS. 12A, 12B, and 12C, the virtualization architecture may include a credit authority function (CAF). The credit authority function may serve as the function that implements the logic of guaranteeing that a user has money, (or the equivalent thereof, e.g., financial unit/credit unit), to pay for the requested service. For example, the CAF may be located in a financial institution, (e.g., banks, PayPal, credit card companies).

Service delivery to the WTRU may be provided using one or more of the following techniques. For example, a WTRU may have a subscription and may be provided with a SIM-like universal integrated circuit card (UICC). For example, a WTRU may have a subscription but may not be provided with a SIM-like UICC. For example, a WTRU may not have a subscription and may not be provided with a SIM-like UICC. For example, a WTRU may not have a subscription but may be provided with a SIM-like UICC.

Each of the deployment techniques may be enabled by one or more of the following use cases. For example, a Credit card (CC)-based subscription may be provided. In such a case, a subscriber may obtain a credit card from a financial institution (FI). A SIM-enabled CC may be provided to the subscriber. An MNO and an FI may implement bank-transaction-based dynamic charging. In an example, a pre-paid (e.g., generic, non-operator-based) subscription may be provided. In such a case, the subscriber may purchase a loadable USIM-enabled debit card, or the subscriber may purchase a prepaid credit through a PayPal account. The MNO may implement bank-transaction-based dynamic charging. For example, use of a surrogate MNO may be provided. The subscriber may subscribe to a surrogate network operator and avail to services from other network operators or service providers using its subscription with the surrogate network operator. For example, a third party authentication may be provided. A user may purchase services from different networks from which it does not have a subscription. A third-party may authenticate the network to the subscriber, and the subscriber to the network. The subscriber may purchase services from the network operators, e.g., via a PayPal account, or CC, e.g., after the authentication may be performed. In the context of the architecture in FIGS. 12A, 12B, and 12C, a third party authentication entity may be one or more of an Internet protocol (IP) provider, a service broker, a financial institution, or any entity that operates from the virtualization layer level. For example, a home network assist subscription may be provided. The subscriber may be roaming in a visited network. The subscriber may purchase service directly from the visited network operator, e.g., to avoid high roaming charge from the subscriber's home network operator. The subscriber's home network operator may authenticate the visited network and the subscriber. The subscriber may purchase services from the network operators, e.g., via a PayPal account or a CC, e.g. after the authentication.

A SIM may be referred to a subscriber identity module application, (e.g., running on a 3GPP integrated circuit card (ICC) such as a UICC). The SIM may be a 2G SIM, a 2.5G SIM, a universal mobile telecommunications system (UMTS)/long term evolution (LTE) SIM (i.e. USIM), ISIM (e.g., IP multimedia subsystem (IMS) SIM), removable user identity module (RUIM)), SIM application toolkit and the like.

The operator virtualization may be referred to as a multi-operator device access or service-based network access or operator agnostic wireless access or operator and access technology agnostic access or operator and service provider agnostic access or operator and service provider and technology agnostic access. The operator visualization may be achieved with or without prior subscription to the network operator(s) whose network(s) is being accessed and/or with or without a SIM card/UICC from the operator(s) whose network(s) is being accessed. For example, a service-based network access may be indicated in to a WTRU, e.g., via system information (SI) broadcast.

Figure 24:
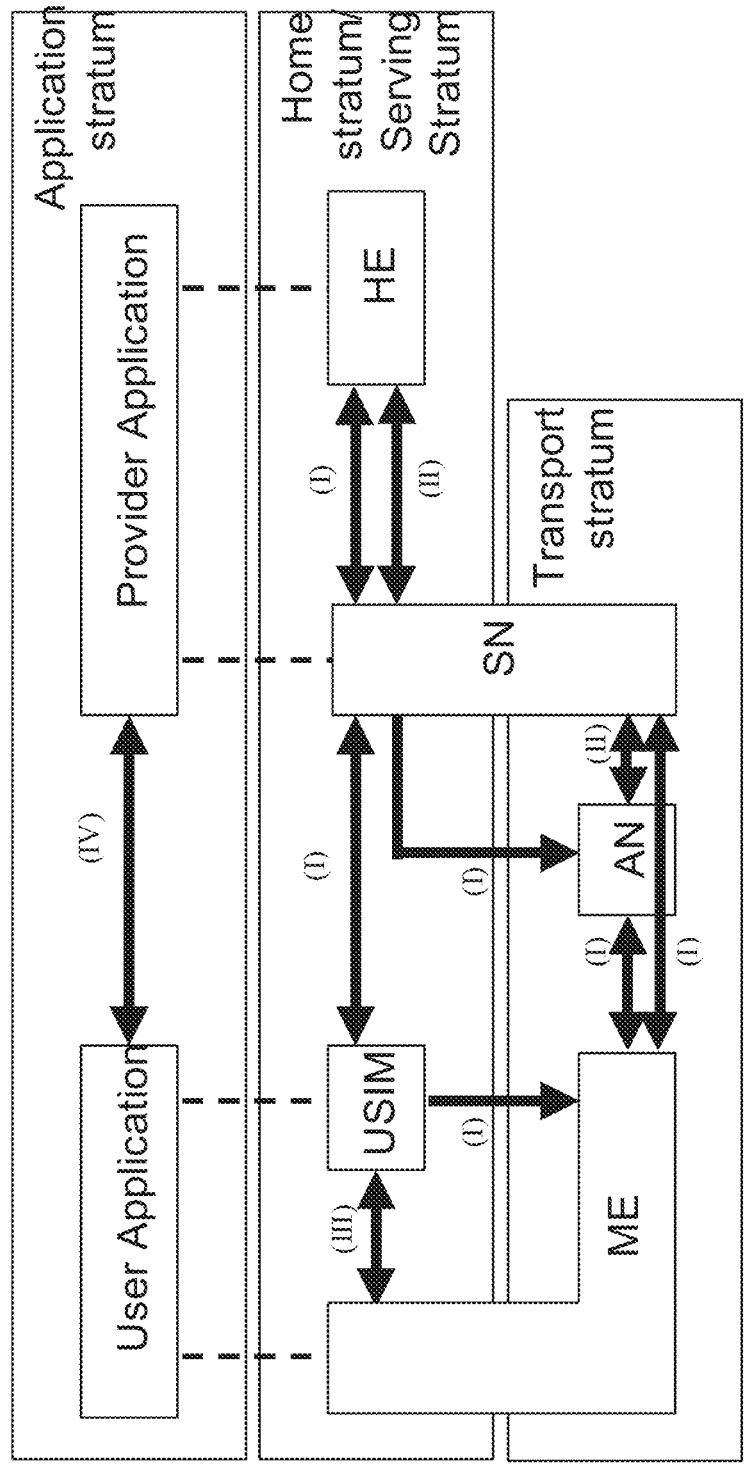
FIG. 24 illustrates an example of an overview of a third generation partnership project (3GPP) security architecture.

FIG. 24 illustrates an example of a third generation partnership project (3GPP) security architecture. For example one or more (e.g., five) security feature groups may be provided. Each of the feature groups may meet certain threats and accomplish certain security objectives. For example network access security may be provided. A set of security features may provide one or more users with secure access to services that may protect against attacks on the (radio) access link.

Network domain security may be provided. One or more of network domain security features may be provided that may enable nodes to securely exchange signaling data, user data (e.g., between an access network (AN) and a serving network (SN), and/or within an AN). The network domain security may provide protection against attacks on the wireline network.

User domain security may be provided. One or more of user domain security features may be provided that may secure access to mobile stations. Application domain security may be provided. A set of security features may be provided that may enable applications in the user and in the provider domain to securely exchange messages.

Visibility and configurability of security may be provided. One or more features may be provided that may enable a user to inform himself whether a security feature is in operation or not and whether the use and provision of services should depend on the security feature.

The requirements/policies relating to security may include one or more of the following features. User Identity confidentiality may provide protection of user permanent identity (IMSI) from eavesdropping. User location confidentiality may be provided. User un-traceability may be provided, such that an intruder may not deduce whether different services are delivered to the same user by eavesdropping. Entity (data origin) authentication may be provided. Device authentication may be provided. The device may be a genuine and not a clone. An example may be the authentication of a SIM by challenge response. The SIM may be associated to a given user and as such, the user may be identified regardless of the WTRU that is used. User authentication may be provided. User authentication may refer to authentication of the end user and/or the person who may be using the end user device. The USIM may be made available to devices/protocols/applications dependent, logically, by a user personal identification number (PIN) input or physically, by a policy of removal and insertion. The entry of a PIN may be needed before access is allowed to a specific application. Network authentication may be provided. A user may corroborate that he is connected to the network he intended and/or is authorized by a trusted authority to connect to the network. Application authentication may be provided, which may relate to the application domain security and may be used to check the authenticity of the application software. Transaction authentication and non-repudiation may be provided. For some business transactions that may be carried out using the mobile device, the transaction may be digitally singed by a user's private key, e.g., where there may be a need for non-repudiation, e.g., to prevent a False Denial of the sending of the Message, the content of the message, or the time of the message. Data Confidentiality (e.g., ciphering) may be provided. The property that information (e.g., signaling and/or user data) may not made be available or disclosed to unauthorized individuals, entities or processes. Data Integrity (e.g., signaling and/or user data) may be provided, which may check that the data including the signaling data has not been altered in an unauthorized manner. Security visibility and configurability may be provided, which may enable the user to be informed of security related events and configure one or more security features.

One or more families of security (e.g., authentication, ciphering and integrity protection) mechanisms may be provided. A security mechanism may be based on a secret shared between the communicating entities (e.g., the network and the subscriber module such as SIM/USIM/ISIM). A security mechanism may be based on key pairs (e.g., a public key and/or a private key) and one or more digital certificates. For example one or more authentication protocols may rely on a pre-shared secret between the two communicating entities. The shared secret based approach may make use of symmetric cryptographic algorithms where the algorithms and keys for ciphering/deciphering and the algorithm and keys for encryption/decryption may be identical on both ends, e.g., at the WTRU end and at the network end, which may be the security method adopted by the 3GPP systems, e.g., including IMS.

Figure 25:
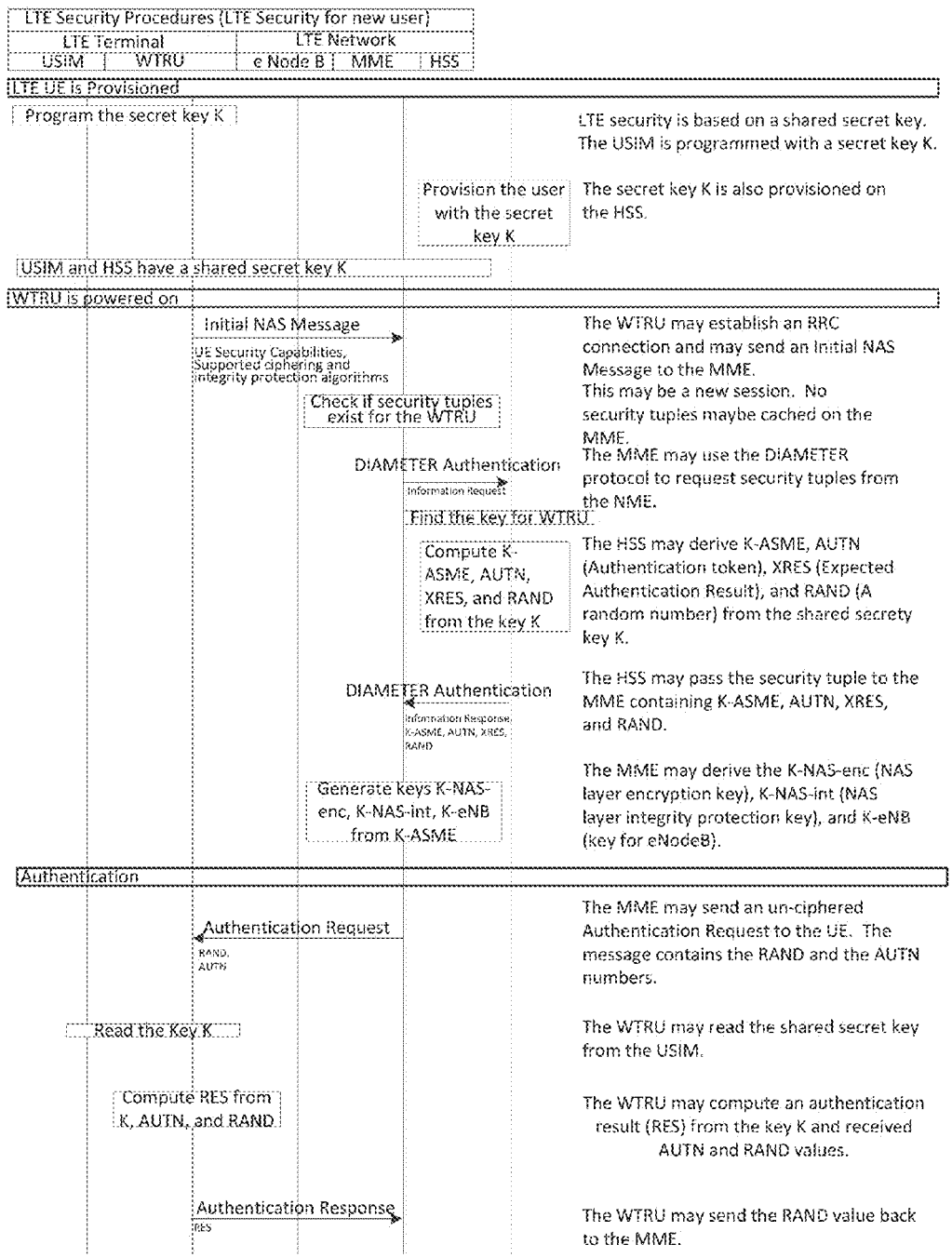
FIG. 25 illustrates an example of an evolved packet system (EPS) authentication and key agreement procedure.
Figure 26:
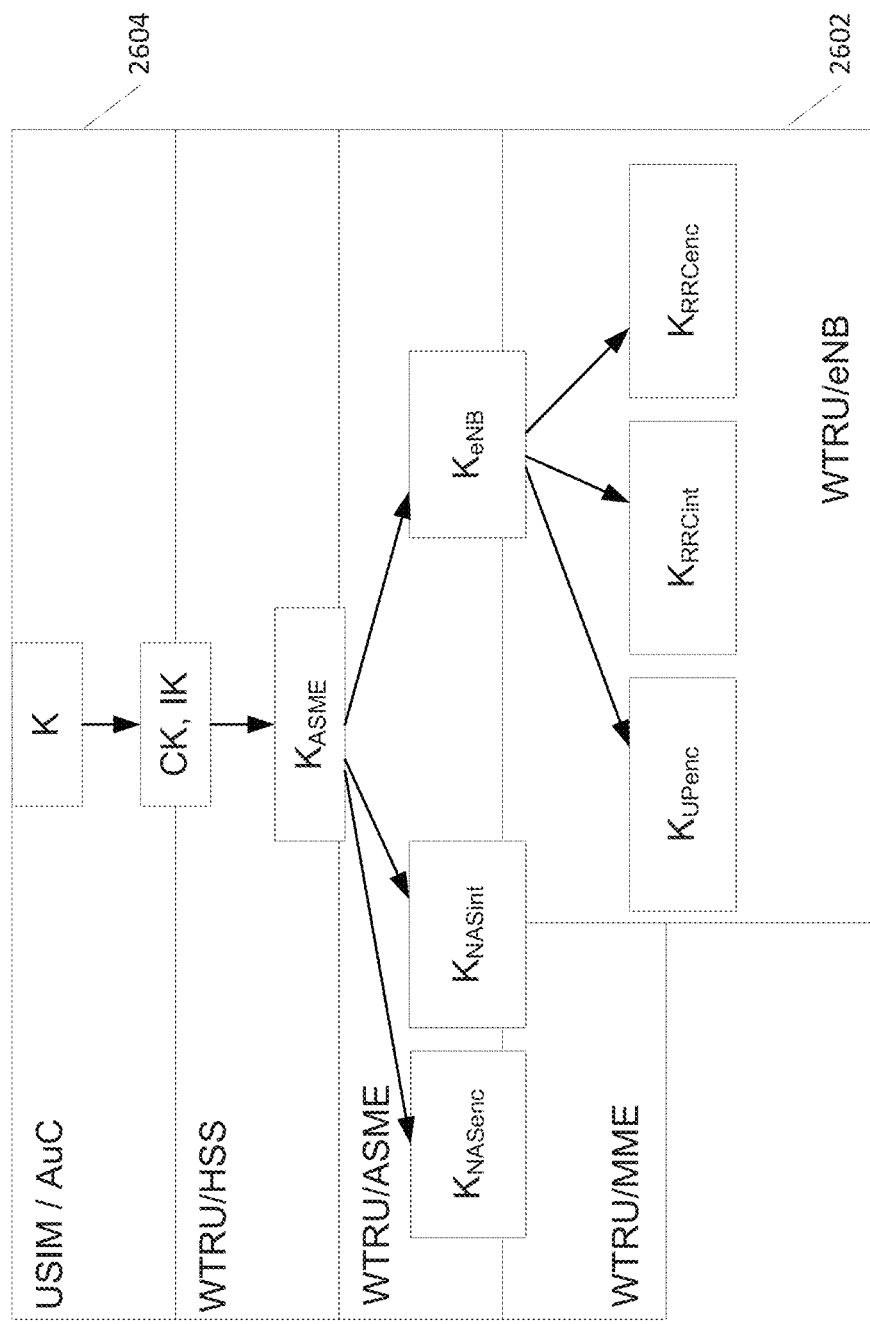
FIG. 26 illustrates an example of the key hierarchy in EPS.

FIG. 25 illustrates an example of an evolved packet system (EPS) authentication and key procedure. As illustrated in FIG. 25, a secret key K may be programmed in a WTRU. The WTRU may use the programmed key for authentication. FIG. 26 illustrates an example of the key hierarchy for EPS. As illustrated in FIG. 26, the AKA may run based on the knowledge of a secret key K. The secret key may terminate with the generation of the ciphering and integrity base keys (CK, IK). As illustrated in FIG. 26, the derivation by the WTRU 2602 and the network of the actual keys, (e.g., $K_{NAS\ enc}$, $K_{NAS\ int}$, $K_{UP\ enc}$, $K_{RRC\ enc}$, $K_{RRC\ int}$), that may be used for ciphering and integrity following the completion of the AKA. The secret key K may be made available to, and shared between the SIM located in the WTRU and the authentication center (AuC) located in the network 2604, (e.g., the user's home environment).

Figure 27:
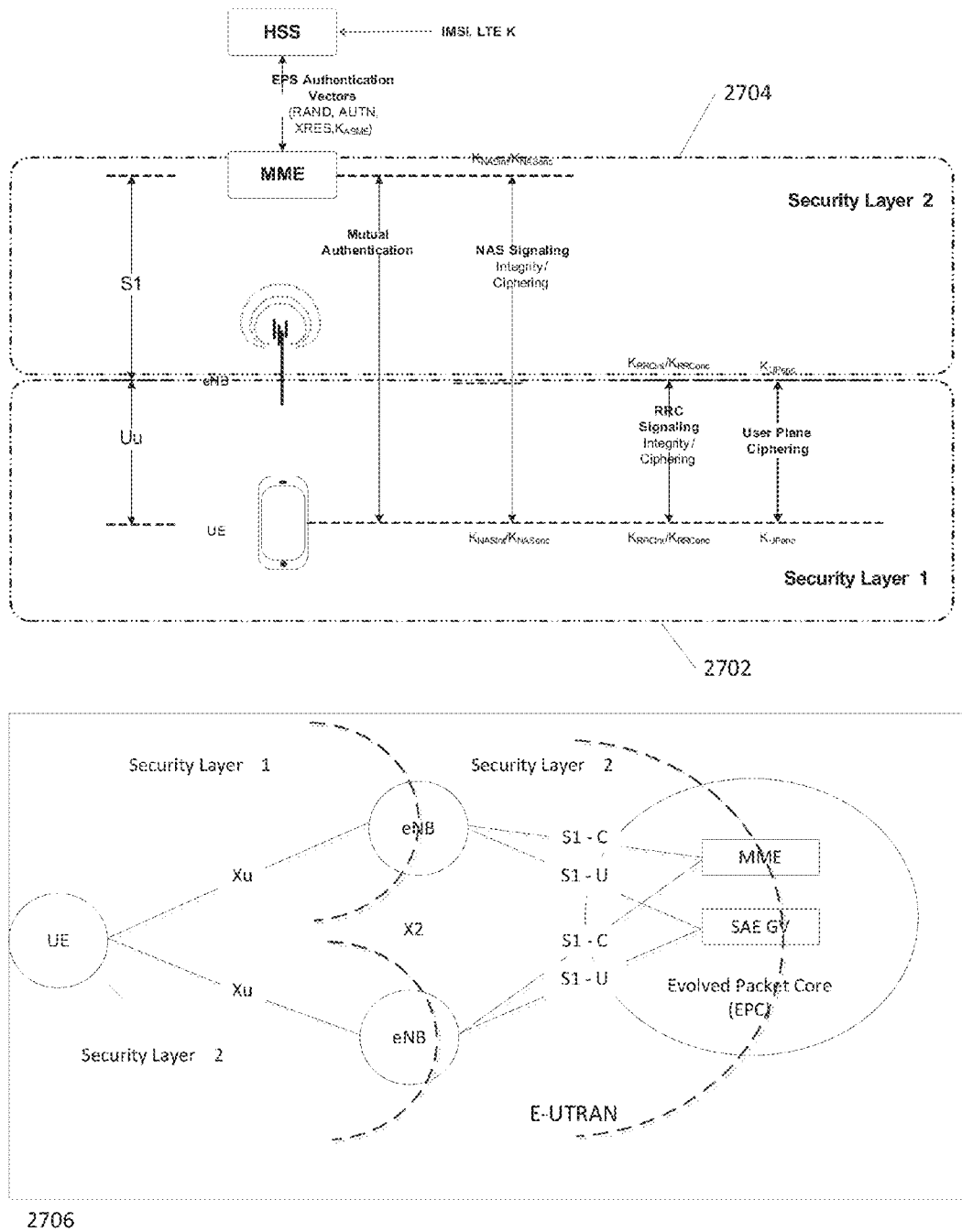
FIG. 27 illustrates an example of one or more security layers in an evolved universal mobile telecommunications system terrestrial radio access network (eUTRAN).

FIG. 27 illustrates one or more security layers in an evolved universal mobile telecommunications system terrestrial radio access network (eUTRAN). As illustrated in FIG. 27, the EPS may have one or more (e.g., two) layers of protection instead of one layer perimeter security, similar to UMTS. The first layer 2702 may be a eUTRAN (radio resource control (RRC) security and user plane (UP) protection). The second layer 2704 may be an evolved packet core (EPC) network, (e.g., a non-access stratum (NAS) signalling security).

The security mechanism, e.g., based on key pairs (e.g., a public key and a private key) and digital certificates may use asymmetric cryptographic algorithms (e.g., RSA). For example, the public key may be used to encrypt a message and the corresponding private key may be used to decrypt the message. Secured Web or IP based services or WiMAX may use such security mechanism.

In the application security domain, for example, the 3GPP may specify frameworks that mobile applications may rely upon for authentication between a server and a client (e.g., the WTRU) with the specification of a Generic Authentication Architecture (GAA). The GAA may include a generic bootstrapping architecture (GBA) and a framework for support of subscriber certificates (SSC).

An application independent mechanism may be based on the 3GPP AKA mechanism, e.g., to provide a client and an application server with a common shared secret. This shared secret may be used to authenticate the communication between the client and an application server.

A digital certificate may be issued to a mobile subscriber. Once a mobile subscriber has a key pair (e.g., a public key and a private key) and has obtained a certificate for it, the subscriber may use the certificate with the corresponding key pair, to produce digital signatures in, for example, m-commerce applications. The subscriber may also use the certificate with the corresponding key pair to authenticate to a server, (e.g., in transport layer security (TLS) security).

For example the virtualized network architecture as illustrated in FIG. 12A, FIG. 12B, and FIG. 12C and the deployment scenarios described herein may be provided to determine one or more of discovery, network operator discovery, service discovery, service provider discovery, or the discovery of any entities, (e.g., FI, service broker, trusted authority) operating at the virtualization layer (e.g., after power up, in idle mode or in connected mode), or the procedures for a network (including, e.g., system information/parameters). Assumptions on what is an idle mode or connected mode may be provided.

Techniques may be provided to determine the procedures (e.g., including system information/parameters) for network selection (e.g., RAN/Cells/Access Point, core networks, PLMN, etc.), service selection, network operator selection, service provider selection or for the selection of any of the entity operating at the virtualization layer.

Techniques may be provided to determine how one or more network entities may provide information to aid the WTRU in executing system access procedures towards the inviting/attracting network, (e.g., virtualized service network or cloud through the RAN).

Techniques may be provided to determine the procedures that may be involved (e.g., including system information/parameters) to register to a network (e.g., to gain service-based network access), to register to a service provider and avail of the desired service or services.

Techniques may be provided to determine how a user, a subscriber, or a WTRU may control the access to the network or the services, and vice versa, (e.g., how the network may control the access of the user, the subscriber, or the WTRU to the network or to the services, or how the service provider may control the access of the user, the subscriber, or the WTRU to the network or to the services).

Techniques may be provided to determine how a user interface may look like or the system menu may look like and what a user may see on its device screen and how a user may use the user interface to control the services and networks/operators and/or other virtualization layer entities available for service offering.

A WTRU may have subscription and/or may be provided with a SIM-like UICC. It may be desirable to determine who may provide the subscription to the WTRU. The subscription may be provided by one or more of a PLMN operator (e.g., an MNO), or a Virtualized Layer Service provider (e.g., mobile virtual network operator (MVNO), service broker, ID provider) or a cloud service provider, (e.g., service broker, ID provider). Techniques may be provided to determine who may provide the SIM-like UICC. The SIM-like UICC may be provided by one or more of an PLMN or a virtualized service network or a cloud.

Techniques may be provided to determine what may be the SIM-like UICC contents that may enable the system/service access under the virtualized network environment, (e.g., maybe other operations as well).

Techniques may be provided to determine how a WTRU may be authenticated and identified when requesting services in a particular network, given that the WTRU does not belong to a particular operator, how the virtualization network may be authenticated by the WTRU, and how the WTRU may obtain the secret key needed for the execution of the AKA procedure. The WTRU may not hold a UICC, SIM or the like. The WTRU may be known to a grantor or financial institution which may guarantee authenticity.

VN may be referred to as virtualized network or virtualized service network. A cloud may represent the virtualized cloud networks. The VN and the cloud may include the contexts of network sharing, RAN or operator's CN collections/assemblies, and the like.

Systems, methods and instrumentalities may be provided to describe supporting system selection, system access, and/or system registration. A security architecture and the security mechanisms for a secure delivery of services in a virtualized network, (e.g., operator agnostic network access) may be provided. Network access security, user domain security, security visibility and security configurability may also be provided.

The parameter information as described herein may be broadcasted, (e.g., the RAN system information broadcast). The parameter information may be broadcasted publicly to each of the WTRU population, or signaled via other basic cellular services such as the broadcast/multicast control (BMC), the multimedia broadcast/multicast service (MBMS), and the like. The parameter information may be conveyed to individual WTRUs, e.g., via dedicated signaling (e.g., application, non-access stratum (NAS) or access stratum (AS)), via a SIM-like UICC device upon a WTRU subscription, or over the air (OTA) activation schemes, (e.g., open mobile alliance (OMA) device management (DM) over-the-air (OTA)). The push and pull mechanisms may be utilized as invoking mechanisms.

One or more of the following parameters may be provided to WTRUs and nodes in the relevant RANs/CNs (e.g., via various interface level control messages), e.g., if the virtualized network (VN) or the Cloud is on top of the operator's CN. For example, the presence or absence of one or more of certain VNs or clouds in active operating status may be indicated, to which a WTRU may have a subscription to, or may want to subscribe online, or through which a WTRU may connect to and/or interact with other communication devices, or from which a WTRU may obtain services and applications, and the like.

The presence of a particular VN or Cloud may be represented by the system broadcasting the VN-Id/Cloud-Id, name and/or addresses, which may be associated with the VN network access and/or network registration. The VN network access and/or network registration may include one or more of the following. For example, on direct WTRU/VN contact/registration, the registration may be routed via the base-station or CN node (e.g., an MME node) to which the WTRU may be initially connected to. For example, a WTRU may register with the VN, e.g., via CN/MME, the MME may relay the WTRU registration to VN. In an example, a WTRU may register with the VN, e.g., via a network entity/gateway (e.g., VN network element) for which the VN may provide the entity-name, ID, address, and the like, e.g., the network entity may be a routable address that may be chosen based on for instance the physical or topological location of the point of attachment to the network. The addressed or identity may be pre-provisioned on the WTRU or downloaded, e.g., over the air (OTA).

The presence of a particular VN or Cloud may be represented by an indication that the particular VN or Cloud may support unsubscribed WTRU access and services and/or the details of unsubscribed WTRU operating rules (e.g., the WTRU may provide a permission-number to register or the WTRU may be checked before registration), and the access cost structure. A WTRU that may be provisioned with a wildcard international mobile subscriber identity (IMSI) number to allow initial access to the WTRU's VN entity, e.g., as if it were the WTRU's home subscriber server (HSS)/home location register (HLR). Once the WTRU is in contact with the VN, which may be an HSS/HLR (e.g., the virtualization layer subscriber server (VSS) as illustrated in FIG. 12B), the WTRU may use a key derivation mechanism to acquire a configuration that may allow the WTRU to register with a network, e.g., using mechanisms based on 3GPP (e.g., Release 12 and below).

The presence of a particular VN or Cloud may be represented by the address and or the identity of the supported public key infrastructure (PKI) portals of the supported virtualization networks, (e.g., service brokers, ID provider, financial institutions or any other entities implementing the virtualization network functions). The presence of a particular VN or Cloud may be represented by public keys and associated digital certificates of the supported virtualization networks.

The range of the RAN/CN that may be under the home coverage of the VN or the Cloud may be provided to the WTRU. A white list of the CNs (e.g., PLMNs and/or Area Ids) and/or a list of RANs (e.g., Cell-Ids) and their associated radio access technology category (e.g., GSM/UMTS/LTE), or a blacklist of those that are not allowed to access. For each individual RAN/CN, the RAN/CN may indicate one or more of the VN or Cloud identifications they belong to (as for virtualized network sharing). The RAN/CN may indicate the policies aimed at WTRUs with subscription or without subscription for accessing from the listed cell/area/network. The RAN/CN may indicate the privilege or priority level for WTRU operation and the expected QoS provisioning (e.g., in consideration of the load and congestion level of the RAN and CN network). The RAN/CN may indicate the charging rate to various WTRUs on their subscription category as home or neighborhood or foreign or unsubscribed (e.g., charging for connectivity or charging for service/application).

The range of the RAN/CN that is under the neighborhood coverage of the virtualized network or the Cloud may be provided to the WTRU (e.g., WTRU may pay higher price to access). A white list of the CNs (e.g., PLMNs and/or AreaIds) and/or a list of RANs (e.g., Cell-Ids) and their associated radio access technology category (e.g. GSM/UMTS/LTE), or a blacklist of those that are not allowed to access. For each individual RAN/CN under the neighborhood coverage, it may indicate one or more of the VN or Cloud identifications they belong to (e.g., for virtualized network sharing). The range of the RAN/CN under the neighborhood coverage may indicate the policies that may be aimed at subscribed WTRUs with subscription or without subscription for accessing from the listed cell/area/network, the privilege or priority level for WTRU operation, and/or the expected QoS provisioning (e.g., in consideration of the load and congestion level of the RAN and CN network). The range of the RAN/CN under the neighborhood coverage may indicate the charging rate to various WTRUs on their subscription category as home or neighborhood or foreign or unsubscribed, or charging for connectivity or for a service and/or an application.

The range or the individual RANs/CNs that may be under the foreign coverage may get the access and service from the virtualized network or the Cloud directly from the foreign network. The service by the foreign network may be provided to the WTRU with a higher price. A white list of the CNs (e.g., PLMNs and Area Ids) and/or a list of RANs (e.g., Cell-Ids) and their associated radio access technology category (e.g., GSM/UMTS/LTE), and/or a blacklist of those that are not advised to access may be provided. For each individual RAN/CN that is under the foreign coverage, it may indicate one or more of the VN or Cloud identifications they belong to (e.g., for virtualized network sharing). It may indicate the policies aimed at subscribed WTRUs with subscription or without subscription for accessing from the listed cell/area/network. The range of the RAN/CN under the foreign coverage the privilege or priority level for WTRU operation and the expected QoS provisioning (e.g., in consideration of the load and congestion level of the RAN and CN network). The range of the RAN/CN under the foreign coverage the charging rate to various WTRUs on their subscription category as home or neighborhood or foreign or unsubscribed (e.g., charging for connectivity or charging for service/application).

The virtualized network control entity, entities or function, (e.g., the virtualization layer network manager function (VNMF), virtualization layer security, authentication and privacy control function (VSAPCF), virtualization layer service and application control function (VSACF), credit authority function (CAF), and the like), or network element or stakeholder implementing the virtualization function may be provided to the WTRU, to which the WTRU may connect to, e.g., the virtualization entity (or entities) that the WTRU may use as a portal for its registration into the VN or Cloud. The WTRU may be provided with name or address, (e.g., fully qualified domain name (FQDN)), or a network entity identification. One or more of the following may be provided to the WTRU allowed one or more access/registration methods (e.g., direct-signaling, signaling-via-CN, interact with or determined by RAN, so that the RAN may provide VN selection function to route request messages to the correct VN entity).

The virtualized network service entity, (e.g., the VSACF) may be provided to the WTRU, which the WTRU may contact to locate and obtain the desired services and applications. The name or address (e.g., FQDN), or a network entity identification of the virtualized network service entity may be provided to the WTRU. One or more allowed access methods (e.g., subscribed-direct-invoke, online-purchase, and the like) may be provided.

One or more network addressable institutions (e.g., financial, trust or security), entities, (e.g., ID provider, banks, PayPal, credit cards institutions) that the VN or Cloud may trust for the WTRU (e.g., unsubscribed with the VN or Cloud) may be provided to the WTRU. The WTRU may interact to gain authorized access to the VN or Cloud, their network identity, name, address, and other information for contact.

One or more other network entities or gateways may be provided to a WTRU. A directory service function may be provided to help the WTRU for one or more of the following. For example directory service function may be provided to find the home network entities, (e.g., the home network control and the home network service entities) with the subscribed VN or Cloud from one or more areas including roamed areas of any networks. For example, directory service function may be provided to find one or more of the financial institutions, the services and applications that may be available from a particular VN or Cloud, the name or the address (FQDN) or the network entity identification of each of the network entities, the VN(s) and/or Cloud(s) the directory service node may serve, or one or more allowed access methods.

Each VN or Cloud may publish one or more of the services and applications it may provide to WTRUs and the operating information including charging related information, which may include the pricing for the WTRUs accessing from the home, the neighborhood and, foreign coverage areas and the unsubscribed WTRUs. Services or applications may be represented by their respective Service-IDs or Application-IDs or names and other invoking information.

The network policies and their valid areas may be provided to the WTRU. Such policies may include discovery information to assist the WTRU to conduct efficient discovery of operators and/or access technology and/or services and/or service providers and/or any other stakeholders in the validity area associated with these information. The policies may further include one or more of an inter-operator mobility policy (IOMP), an inter-operator routing policy (IORP), an inter-system routing policy (ISRP), security, authentication and privacy control policy and rules across stakeholders, charging policies, virtualization layer rules for idle radio access technology (RAT)/frequency selection priority in idle mode and RAT/inter-frequency handover in active mode, QoS policies, or policy conflicts mediation and resolution rules, (e.g., rules for prioritization and preemptions across policies of various stake holders).

Each cell (e.g., of a RAN) or the PLMN may publish an indicator on whether the cell or the PLMN may support the operations of the virtualized network or mobile cloud. This support of a VN or Cloud may be general, e.g., the VN or the cloud may support operations to each of the VNs or each of the Clouds and may not be affiliated to a particular VN or Cloud. The information may be broadcasted in the system information or individually signaled to the WTRU, (application, NAS, AS), or even via the SIM-like UICC device upon WTRU subscription or over the air (OTA) activation schemes, (e.g., OMA DM OTA). Push and pull methods may be valid invoking mechanisms as described herein, which may allow the WTRU to select any supporting cell or RAN node and gain access to any service hosted at the virtualization layer or any virtualization network on the fly.

To individual subscribed WTRUs, one or more of the following parameters may be relevant and may be provided (e.g., via subscription and the SIM-like UICC input). For example, a ticket to access the network may be provided. This may be in the form of a network WTRU identification (e.g., VN-WTRU-Id), which may be in the form of a normal WTRU ID such as the IMSI, MSISDN, etc. with a special recognizable coding or an extension for the subscribed VN-Id or Cloud-Id. The ticket may be provided e.g., via a special identification that may be other than the WTRU-Id, e.g., the IMSI or mobile station international subscriber directory number (MSISDN), and the like.

A certificate or a credential to prove the WTRU's identity and subscription in conjunction with the ticket may be provided. The certificate may be used to derive security credentials and other operational privileges.

The network related information such as the home VN-ID or Cloud ID, and the subscribed VN network entities, (e.g., the VNMF or the VSACF) may be provided. In the forms of a network entity-Id, IP-address, access point name (APN) or other direct or indirect addressing/routing identities or names may be provided.

In support of the dynamic VN extension (or inclusion), the SIM parameters may include one or more of the following from the VN. For example, the SIM parameters may include a list of VN-Ids the WTRU-subscribed VN may or may not have visiting/roaming agreement with. For example, the SIM parameters may include a VN extension enabling indicator. A WTRU with the VN extension enabling indicator in its SIM-like UICC device may have the privilege to request the subscribed VN for a VN inclusion or extension action to include or bring the visited cells/RAN/CN, which may not be under the scope or coverage of its current VN, under the subscribed VN coverage for the requesting WTRU. For example, when the WTRU is powered up in an area that the VN supporting PLMN does not exist, or the WTRU is moved to an area that is outside of the boundary the VN supporting PLMNs (e.g., CNs and RAN). A WTRU with the VN extension enabling indicator may include it in the request messages to the RAN or to the CN or PLMN or to the subscribed VN as an indicator for dynamic VN extension for the WTRU.

For example, the SIM parameters may include an assigned VN extension WTRU privilege code may be encrypted by the subscribed-VN. The WTRU may send the WTRU privilege code to demonstrate its granted authorization for requesting a dynamic VN inclusion service. The code may indicate the privilege level the WTRU may have when performing the dynamic VN extension, e.g., WTRU treatment in the visited network in terms of connectivity priority, QoS to the subscribed VN while connected locally, WTRU's ability to use local network services (e.g. location service, proximity service, and the like), and/or whether there is a time control in terms of accessing via the local network. A special address or routing path may be used for a request to be sent to the correct VN network and/or a connection management node.

One or more virtualized Network Access models may be provided. The models may be described for how the WTRU may access and perform registration with the desired/subscribed VN/Cloud. The local network (e.g., the Cell/RAN/PLMN) support for virtualized network or Cloud environment may be categorized into the following situations.

A cell/RAN/CN or a local network (PLMN) may support the virtualized networking operation. The cell/RAN/CN or a local network (PLMN) may support the WTRU's various requests and may route the requests to appropriate places/entities for VN access, which may be totally transparent or may act in between to localize the support. The VN support here may not be affiliated to any particular VN/Cloud. WTRUs employing this kind of Cells/RANs or local networks may obtain specific credit or trust from certain access authorization center to proceed with the access with a list of available VNs/Clouds.

A Cell/RAN/CN or a local network (PLMN) may belong to one or more of VNs and/or Clouds. WTRUs access to these kind of Cells/RANs or local networks may be limited to the list of VNs/Clouds supported by the access network and the associated CNs.

There may be the hybrid of the two, e.g., the cells/RANs/PLMNs may belong to some particular VNs (e.g., operating with the VNs with subscription) while accommodate the general VN operation support to each of the VNs, (e.g., where WTRU may obtain VN access authorization from online-request to some special institution and/or entities).

Figure 28:
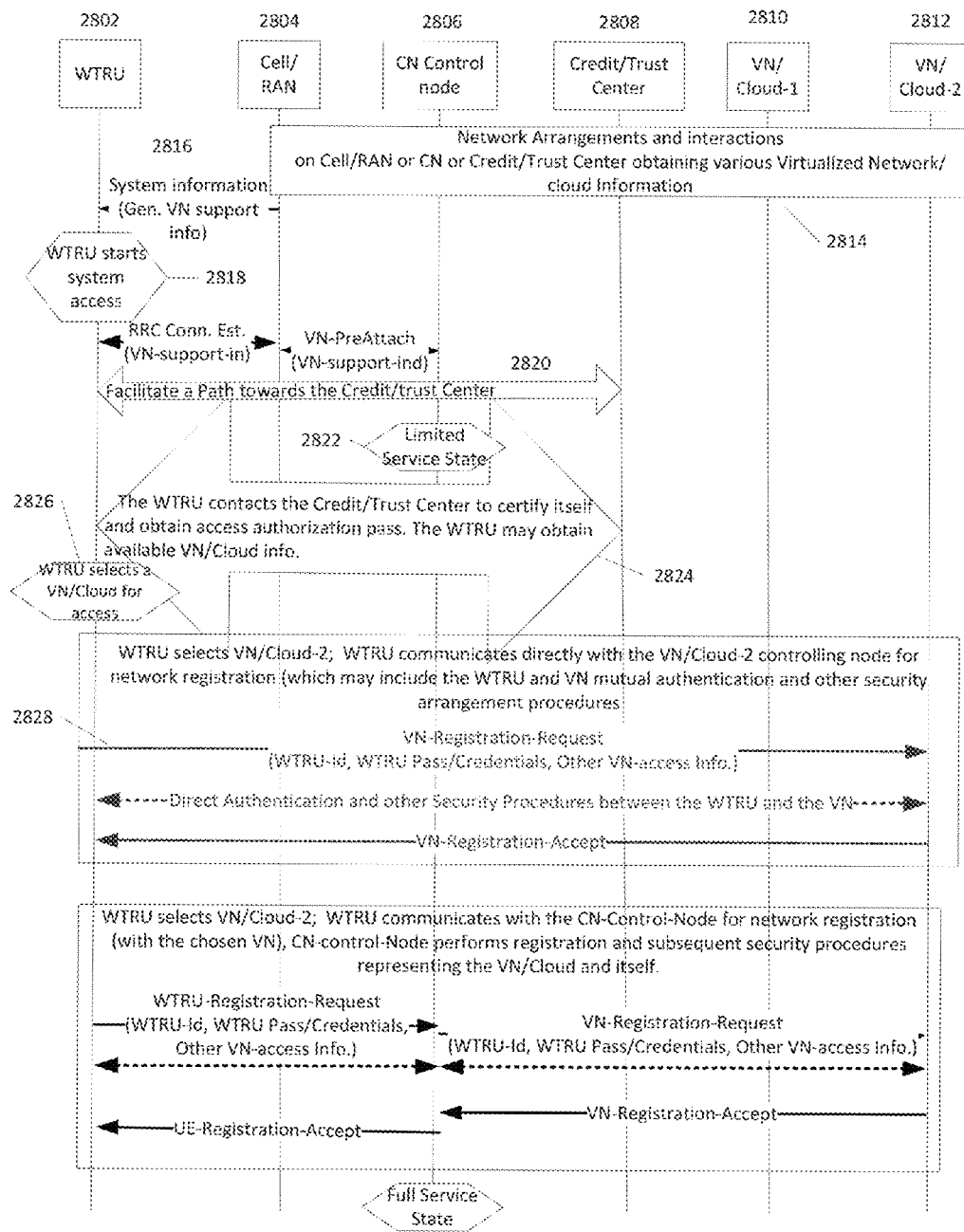
FIG. 28 illustrates an example of providing access via a general virtualized (service) network (VN) supporting cell.

FIG. 28 illustrates an example of providing access, e.g., via a general virtualized network (VN) that may support a cell in a network including a WTRU 2308, a cell/RAN 2804, a CN control node 2806, a credit/trust center 2808, a VN/Cloud-1 2810 and a VN/Cloud-2 2812. The VN 2810/2812 and the Cell/RAN 2804 or local network, the VN 2810/2812 and the credit/trust center 2808 may communicate under a network arrangement, e.g., to populate the VN access information (e.g., at 2814). At 2816, the Cell/RAN 2804 may broadcast the general VN operation support indicator and other general support information, e.g., in the system information broadcast. At 2818, a WTRU 2802 may start to access a VN 2810/2812. The WTRU 2802 may indicate its intention for VN access in a PreAttach message in the RRC connection establishment procedure/messages. At The Cell/RAN 2804 or local network, upon the PreAttach Request (VN-access indication) may enter the limited path service state and configure the relevant radio bearers for the WTRU 2802 to support a limited path service towards the Access Credit/Trust Center (e.g., at 2820 and 2822). At 2824, the WTRU 2802 may contact the Access Credit/Trust Center 2808 with the WTRU identities, the WTRU/user credit information or the trust information to the Credit/Trust Center 2808. The WTRU 2802 may obtain the Pass or the Credential for the designated system access, if the system access is granted. The WTRU 2802 may obtain a list of available VNs/Clouds information from the Credit/Trust Center 2808, or the WTRU 2802 may obtain this information from another network node with the granted system access Pass/Credentials. At 2826, the WTRU 2802 may select one from the available VN list based on its need and other considerations such as the charging rate, the availability of one or more of the services/applications, and the like. At 2828, the WTRU 2802 may send the network registration (e.g., for the selected VN/Cloud-2 to continue the system access).

Depending on the setup or configuration of the general-VN-support Cell/RAN 2802 or local network as well as the WTRU registration message indicator, the Cell/RAN 2804 or the local network may handle the registration, forward the message to the chosen VN directly and let the WTRU and the VN communicate directly (e.g., the result of the direct WTRU<->VN communication may grant the WTRU to work in the whole coverage of the VN without handshaking with the local network (PLMN) when it roams around; or the CN control node 2806 may perform the network registration, representing the VN and itself, (the result may be the WTRU 2802 may be supported in the coverage of one single local network—PLMN); or the VN may assign a different local network (PLMN) for the WTRU 2802 to use for the access to the chosen VN. After registration, the WTRU's status in the network may be modified to the "Full Service" state if the WTRU still uses this cell/CN or local network.

As opposed to the WTRU making a selection of the VN, the WTRU 2802 may request one or more services without indicating the service provider. The underlying supporting communication network, (e.g., the mobile operator network), may make the selection of the service provider and the associated virtualization network.

The WTRU 2802 may select the VN and may indicate the specific service provider. The WTRU 2802 may indicate a service or list of services the WTRU may desire. The WTRU 2802 may indicate one or more communication attributes including, e.g., QoS, service level requirements, security requirement, price, user preferences. The VN (e.g., an VNMF, or an VNMF in coordination with other virtualization functions such as CAF, VSAPCF, VSACF, virtualization layer subscriber server (VSS) or network elements implementing these functions), may turn select a supporting underlying communication network that may be the same as the network from which a WTRU request may be received from, or may select a different supporting underlying communication network based on the input from the WTRU 2802 and the policies of the virtualization network.

Figure 29:
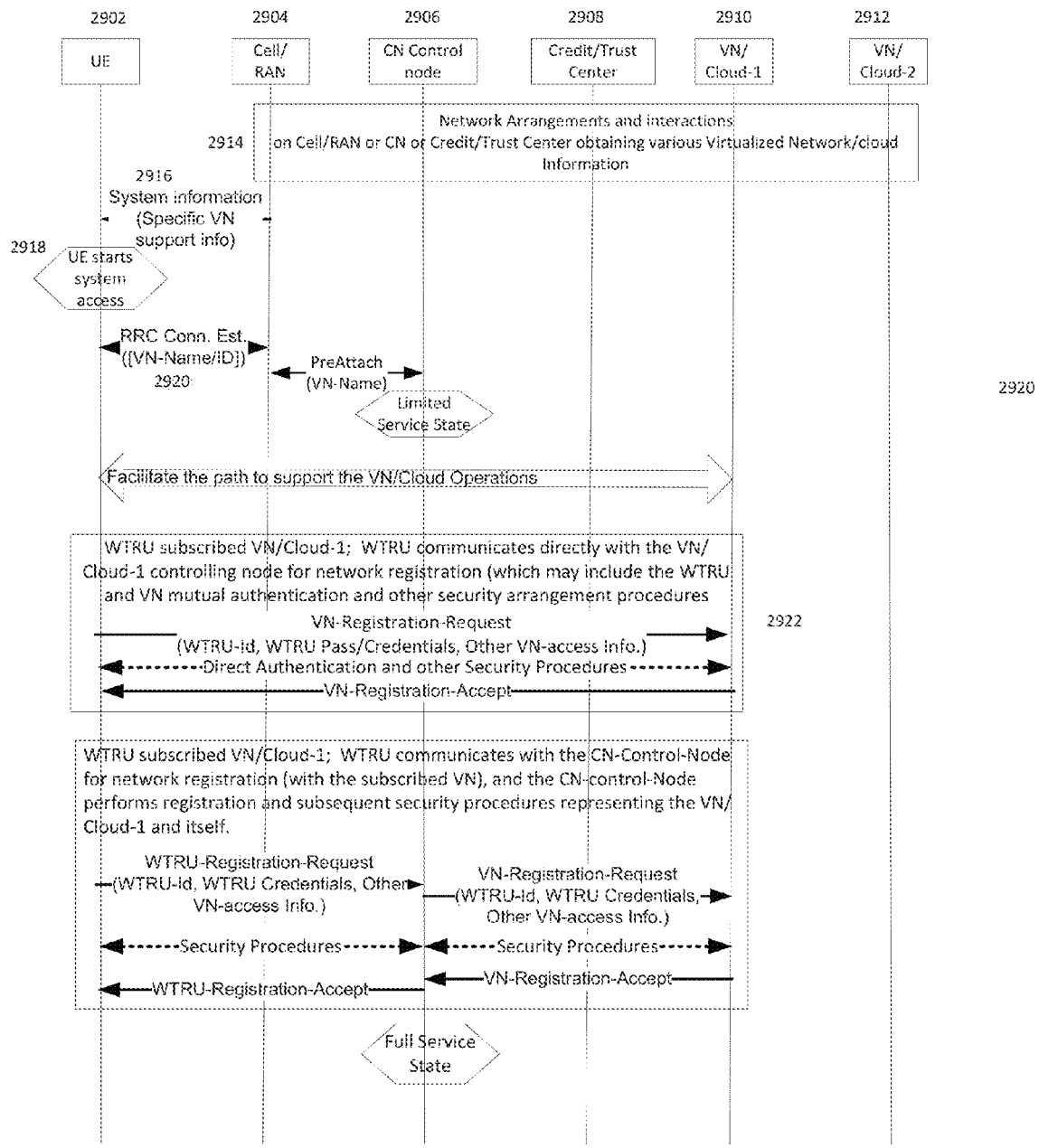
FIG. 29 illustrates an example of providing access via a specific VN supporting cell.

FIG. 29 illustrates an example of providing access, e.g., via a specific VN supporting cell in a network including a WTRU 2902, a cell/RAN 2904, a CN control node 2906, a credit/trust center 2908, a VN/Cloud-1 2910 and a VN/Cloud-2 2912. At 2914, the VN 2910/2912 and the Cell/RAN 2904 or local network, the VN 2910/2912 and the Credit/Trust Center 2908 may communicate under the network arrangement to populate the VN access information. At 2916, the Cell/RAN 2904 may broadcast the specific VN operation support indicator with the particular VN support information such as the VN-Name/ID or other access information in the system information broadcast. At 2918, the WTRU 2902 may start to access the particular VN. At 2920, the WTRU 2902 may indicate its intention for the subscribed specific VN access (e.g., including the VN-Name/Id, the WTRU VN-access Code, and the like) in the PreAttach Request message embedded in RRC connection establishment procedure/messages. The PreAttach Request message may be embedded in other types of messages (e.g. NAS message, an Internet Protocol message, an Application message, etc.). At 2922, the Cell/RAN 2904 or local network, upon the PreAttach request with VN-Access information, may configure the relevant radio bearers for the WTRU 2902. At 2922, the CN may have limited path service to support the WTRU VN/Cloud operations. The WTRU 2902 may send the network registration message to continue the system access to the subscribed specific VN/Cloud.

Depending on the setup or configuration of the general-VN-support Cell/RAN 2904 or local network and the WTRU registration message indicator, the Cell/RAN 2904 or the local network may handle the registration, forward the message to the chosen VN and let the WTRU and the VN communicate directly (e.g., the result of the direct WTRU and VN communication may grant the WTRU to work in the whole coverage of the VN without handshaking with the local network (PLMN) when it roams). The CN control node 2906 may perform the network registration, represent the VN and itself, (e.g., the result may be the WTRU may be supported in the coverage of a local network (PLMN)). The VN may assign a different local network (PLMN) for the WTRU to use for the access to the chosen VN. After registration, the service limitation on WTRU may be removed, e.g., if the WTRU uses this cell/CN or local network.

Techniques for a WTRU system and service access to VN, e.g., RAN/CN may be provided. A mobile device may access the VN or Cloud from one or more of the operator network (PLMN) or CN and RAN that belong to the VN or has contracted the VN to provide or support the network access for the VN or Cloud.

A WTRU, e.g., subscribed with a VN or Cloud, may perform one or more of the following actions, e.g., for system access (registration) with a VN or a Cloud. The WTRU may select an PLMN that may be in the list for the VN. The WTRU may select/reselect a cell that may belong to or may be shared by a PLMN. The WTRU may perform network registration with the VN (e.g., a subscribed VN) or the Cloud. The WTRU may include the VN's access specific information (e.g., VN-ID, VN-indicator, a VN-permission-number, the security-credentials, the VN-privilege/priority-number, access-location-info, available-access-network-nodes), in the initial WTRU network registration message.

For example, for networks based on 3GPP architecture, a special IE (e.g., including the above parameters) may be provided or an indicator may be reserved for the VN registration in an ATTACH or an ATTACH-like message for VN network registration. Recognizing the IE or the indicator, the network node (e.g., evolved Node-B (eNB) or mobility management entity (MME)) may connect (e.g., directly connect) the VN's network and connection management node, (e.g., VNMF), (if a specific APN is given for example). The network may use the access-location-info and the available-access-network-nodes information to redirect the WTRU to a different network nodes group, e.g., for the benefit of WTRU low cost operation or the benefit of network congestion control or load balancing, and the like.

The presence of the VN-Id or VN-Indicator may prompt the CN-controlling node to have the request forwarded to the VN network (e.g., together with the VN-WTRU-Id) connection management node directly, e.g., when the CN-controlling node (e.g., the MME node) receives such a registration request.

The subsequent VN-security-authentication node in the VN may check the VN-WTRU-Id and the WTRU credential against a subscriber database, together with the CN-controlling-node to perform the WTRU authentication and AKA. The VN may create its own security keys, select authentication and encryption algorithms and get back to the CN-controlling node for the WTRU authentication and key agreement procedure sequences. The advantage of a specific VN authentication may be that the authentication and subsequent security key agreement may bring valid security parameters allowing the WTRU travelling in any of the supporting PLMNs of the VN with no further security blocks.

A WTRU that may desire to request a VN service or desire to run a VN application may issue a NAS SERVICE REQUEST-like request (e.g., a VN level SERVICE-ACTIVATION primitive or an IE to the SERVICE REQUEST request), such that the service or application brought up may be active and interacting with the WTRU across different PLMNs. The WTRU may include in the request message the VN-Id, the Service-ID or Application-ID, or the WTRU may specify the APN name of the application gateway. The CN control node may base on the presence of the VN-Id and the VN Service-ID or application ID to check with the VN, (the VN service and application node directly or via the VN-network connection management node). The VN service and application node, e.g., if the requested service or application checked available may notify the VN-network and connection management node.

The VN-network management node may notify the CN-controlling node to set up the service and application traffic path between the WTRU and the VN-service and application node, by way of one or more of the following. For example, the RAN node to the CN-Gateway node (e.g., via commands from the CN control node) and the CN-gateway node to the VN-service-application node (e.g., via commands from the VN-network management node). For example, the VN-service and application may be responsible to run the services or the application or to further connect and interact with the node that stores the service or application the WTRU requested. The return message to the WTRU may list the available VN services and applications to the WTRU, e.g., if the direct invocation of the VN service and application fails.

System access in VN/Cloud support Cells/CNs may be provided. A WTRU may camp on a cell or PLMN and may learn (e.g., via system information acquisition or other signaling method) that it may support the non-affiliated or general VN/Cloud operations. The WTRU's system access may take one or more of the following approaches.

For example, for a VN/Cloud subscribed WTRU, the system access may indicate, e.g., in its RRC Connection Establishment, the intention of to be connected to the subscribed VN/Cloud. The cell/RAN or PLMN may handle the access towards the subscribed VN/Cloud. The WTRU may indicate its VN-capability in the RRC Connection Request (or the RRC Connection Setup Complete) message. The WTRU may indicate its subscribed VN/Cloud Name/ID in the RRC Connection Setup Complete message (e.g., together with the NAS message of network registration).

The cell/RAN may pass the registration message (e.g., NAS or other protocol message) directly to the VN/Cloud based on the VN/Cloud Name/ID it has received in the RRC Connection Setup Complete message, e.g., if the cell/RAN is configured to do so. The cell/RAN may mark the network registration message. The CN node (e.g., the MME) may interact with the VN/Cloud for the WTRU's virtualized network registration.

An unsubscribed WTRU may contact a system access authorization entity (e.g., a financial institution, a credit or trust organization, a government agency, and the like) with its paying or credit/trust information to obtain the ability (e.g., a certificate, a pass-number, etc.) for VN/Cloud system access. The WTRU may receive (e.g., from the system access authorization entity) a list of available VNs/Clouds it is now capable of accessing and their individual access information (e.g., the available services/applications, the charging information, the network coverage information and the specific access instructions and the like).

The WTRU (e.g., on behalf of the end-user) may select a VN/Cloud based on the end-user's purpose of this system access and the received information. The WTRU may perform the network registration to the VN or Cloud it has selected with the obtained certification or pass-number. The WTRU may send its registration message to the VN/cloud to start the system access, which may include the authentication and key agreement steps between the WTRU and the VN/Cloud, e.g., directly or via a CN node or an RAN node.

For a WTRU that has registered with a VN, the WTRU may perform a VN/Cloud selection of one or more VN/cloud that the WTRU may not have yet registered. The WTRU may perform a network registration to the selected VN/Cloud for a VN/Cloud access. The WTRU may indicate its already-VN-registered status and/or the registered VN/Cloud Name/ID in the registration request message.

An alternative WTRU registration with the VN or Cloud may be to have a different set of WTRU registration primitives such that the WTRU may issue a VN registration primitive (e.g. VN-REGISTER) going from the WTRU directly to the VN-network and connection management node for virtual network registration.

The WTRU NAS or a WTRU VN protocol layer may have a primitive to carry the VN-REGISTER over directly to the VN network management function node (e.g., VNMF). In the message, the VN-ID or the Cloud-ID, the VNMF or the Cloud entity ID/address/routing information may be provided. An WTRU may perform network registration to obtain a service or to run an application, the network registration and the service/application invocation may be requested at the same time and/or in the same request message (with the service-ID or the application-ID). For example, an unsubscribed WTRU may register with a VN for the sole purpose of running an application or obtaining a service there. In this co-request message, the WTRU may use one or more of the following options for specifying how the registration to the VN is kept with respect to the invoked service or application. The registration may be terminated as soon as the obtained service or activated application terminate; or the registration may be kept for a specific length of time specified in the message. The registration may be terminated if the VN does not receive some periodic refreshing from the registered WTRU.

The RAN (ENB) or the CN (MME) may forward this VN-REGISTER message to the VN entity specified or implied in the message. The VN entity may perform the registration and interact with the WTRU directly for authentication and security verification and other registration tasks. In the case of register/activate co-request, the SERVICE-ID and/or the APPLICATION-ID may be used to bring up the service or activate the application. A data path may be established by the VNMF, e.g., via the CN controlling entity and RAN to the WTRU.

WTRU Operator Virtualization and Service Control API may be provided. For WTRU Operator Virtualization and Service Control API, a set of application programming interface primitives may be placed between the WTRU end-user interface and Application and the Service/Operator Virtualization Manager Function. Service/Operator Virtualization Manager Function may provide one or more of a list of available Virtualized Service Networks, a list of available virtualized Cloud Networks, a list of available Services/Applications, selection of one or more Service/Application to run, registration with a subscribed virtualized Service Network, register with a subscribed virtualized Cloud Network, registration with a subscribed Operator's Network, or registration with a virtualized Service Network or Cloud Network with Credit.

A WTRU (e.g., under a subscription) may be assigned one or more WTRU operating identities and WTRU addresses and the like. The WTRU operating identities and WTRU addresses may help the network recognize and interact with the WTRU of a particular category or status. The virtual network may provide to the subscribed WTRU, the home network address and the preferred network contact points or entities from which the WTRUs may be home network managed favorably and may be made aware of the offered services and applications as their preferred choices. The virtual network may embed this preferred operating information to the subscribed WTRU on a SIM-like UICC device.

A WTRU may be subscribed with a VN or a Cloud, e.g., for home coverage. The WTRU may obtain a SIM-like UICC device from the subscribed VN or Cloud. Once a WTRU is subscribed with a VN, it may be considered to have subscribed with each of the CNs (and have each of the access rights to their cells—full area coverage) under the coverage of the VN or Cloud. The WTRU's SIM-like UICC device may have additional information for each of the CNs (different PLMNs) under the VN or Cloud. Each of the PLMNs may be treated equally in terms of system or service access by the subscribed WTRU. When accessing the VN, the WTRU may look for a network attach point cell among multiple detected cells given the preference of a lightly loaded PLMN on a cell with good radio coverage or service QOS or past quality of experience (QOE) or cost or price of service or other network policies or user preferences or settings.

A WTRU may be subscribed, with relative lower prices than in the above case, to a VN or Cloud and to one or more of the CNs under the coverage of the VN or Cloud (e.g., subscribe to the VN with partial area coverage). For example a WTRU may subscribe with a VN and two of its PLMNs within which the WTRU may enjoy higher priority/QoS services than in other PLMNs of the same VN.

The WTRU's SIM-like UICC device may have the VN and one or more PLMN's information. One of the PLMNs may be configured to be the primary PLMN, e.g., in terms of VN system and service access. The one or more PLMNs may be considered as a group having higher access priority for the WTRU than other PLMNs of the VN outside to the group. For the same token, the primary PLMN in a group may have a higher access priority for the WTRU than the PLMNs from other groups.

When the WTRU performs the system access, the WTRU may give the preference to access the primary PLMN's cells first and the cells for the PLMNs of the rest of the group second and the last for the non-grouped PLMNs in terms of the cell selection or reselection. An extreme signal strength or signal quality difference (e.g., 3 dB in signal quality) may override the access priority configured to the SIM-like UICC device of the WTRU.

A VN or a Cloud may cover more than one operator's CN (e.g., PLMN) and the VN or the Cloud may interact with mobile device user/customers directly. The VN or Cloud may issue a SIM-like device for its comprehensive services to the VN subscribers.

The SIM-like device to a WTRU may have one or more of the following parameters for VN operations. For example, the SIM-like device may include a VN indicator or a VN-ID that may identify (e.g., uniquely identify) the VN the SIM-like device is issued, and the WTRU may work under its coverage. For example, the SIM-like device may include a VN-WTRU-Id. The WTRU-Id may be issued by the VN or the Cloud. The WTRU-Id may be used solely or in conjunction with other WTRU-IDs, such as the IMSI or international mobile station equipment identity (IMEI) and the like. For example, the SIM-like device may include a list of operators CN-IDs (i.e. PLMN-IDs). The WTRU may connect through for obtaining services from this VN or Cloud. For example, the SIM-like device may include PLMNs (e.g., that may not be one directly contracted but are friendly to WTRUs subscribed from this VN) that the WTRU may visit or roam into with reasonable cost.

For example, the SIM-like device may include a list of VN-Ids that the subscribing VN may have visiting/roaming agreement with. For example, the SIM-like device may include VN specific security seeds, (master key, keys, encryption algorithms, other security parameters).

One or more other access techniques may be provided. In a virtual network system, the subscription to the VN may not cover the subscriptions of each of CNs (MNO) of the VN. A WTRU may have subscription to the virtual network, but may not have subscription to a physical mobile network (e.g., MNO/CN). A WTRU may not need any previous subscription to the selected MNO to access for the service it may want to obtain and the VN may dynamically choose any MNO/CN to serve the WTRU based on the type of the service the WTRU requests, user's service preferences, and/or user's location.

The WTRU may support a virtual network operation and may have a SIM-like UICC from the virtual network operator or cloud service provider. The virtual network operator or cloud service provider may have a special PLMN-ID or an operator-ID assigned to it. The special PLMN-ID may be set as the WTRU's home PLMN.

The MNOs which support the virtual network and operation may broadcast the special PLMN-ID/VN-Id/cloud ID in its RAN. The virtual network supporting WTRU may select a cell for system access based on the broadcasted PLMN.

When performing network access, a WTRU may select a MNO/CN which supports the VN or Cloud service provider and the eNB may be based on the PLMN-Id the WTRU provided to select the MME from the MMEs of the MNO. When the WTRU registers to a cloud service provider, the cloud service provider may employ its Virtualization layer Network Manager Function (VNMF) as a virtual MME to the RAN. The eNB may select the VNMF as if it is a MME.

When a WTRU sends an Attach Request, the message may be routed to the VNMF. The VNMF may poll WTRU's subscription file from a virtualization layer subscriber server (VSS) and trigger the virtualization layer security, authentication and privacy control function (VSAPCF) to authenticate the WTRU.

In the Attach Request message, if the WTRU attaches to the VN or Cloud, the WTRU may use an APN assigned to the VN or cloud provider in the embedded PDN CONNECTIVITY REQUEST. The cloud service provider may create a virtual default PDN connection for WTRU which may be terminated in the cloud, e.g., when the authentication is performed. The virtual default PDN connection may be in the Cloud and may not give WTRU connectivity to outside. The virtual MME (e.g., VNMF and/or VSS) may terminate the location/tracking area update procedure for the WTRU.

When the WTRU decides to access a certain service, the WTRU may trigger use PDN connectivity request to request a PDN connection for the requested service. When the VNMF or virtual MME receives the PDN connectivity request, it may trigger the service negotiation process with the supporting service providers, e.g., the MNOs. The VNMF may select one or more of service providers and/or operators for the requested service, e.g., based on the user policy stored in the Virtualization layer Policy and Rules Coordination function (VPRCF) and other criteria, e.g. the MNO's load, coverage, QoS, and charge rate.

The WTRU may be positioned for the cloud to select a service provider for the user. The VNMF or virtual MME may trigger WTRU to do a PLMN search and report the results, including the signal quality of each provider, to the VNMF or virtual MME.

A Cloud VNMF may select one provider for RAN and another provider for CN to support the service request by the user, e.g., when the Cloud VNMF selects one or more service providers/operators for the requested service. The Cloud VNMF may negotiate and/or sign a service agreement with the RAN and CN provider. The Cloud VNMF may create the packet data network (PDN) connection on user's behalf. For the CN operator, the WTRU may be roaming in its network and it may treat the Cloud operator as a virtual RAN operator. For the RAN operator, the WTRU may treat the Cloud operator as a virtual CN operator. The Cloud operator may act as an interface between the RAN operator and CN operator. An interface v-s1u (e.g., Virtual S1-U interface) and v-s1c (e.g., Virtual S1-C) may be introduced between Cloud operator and RAN/CN operators.

The VNMF in Cloud operator may select different CN operators for different WTRU services, e.g., when the Cloud network provider may work as an interface between CN operators and RAN operator.

Figure 30:
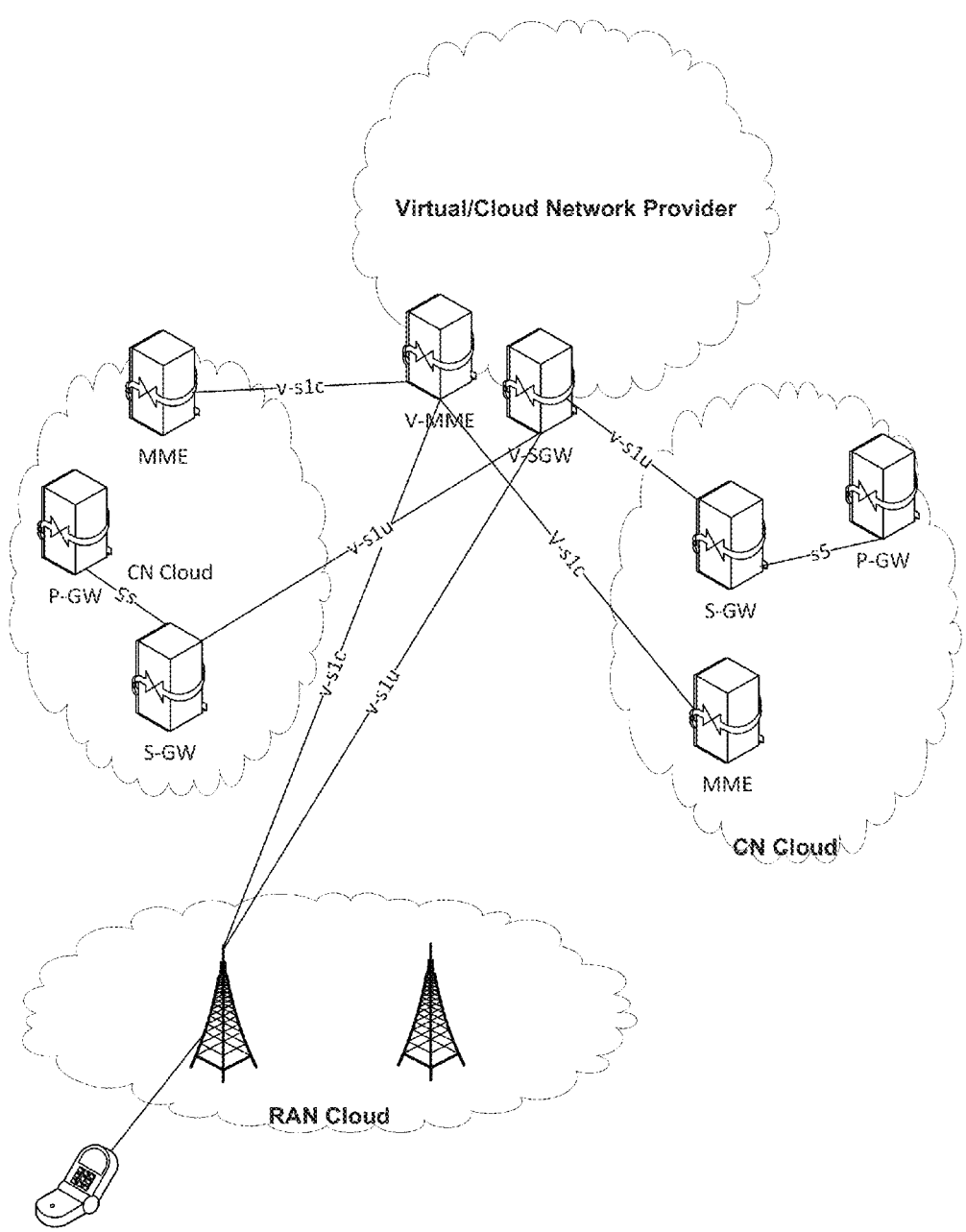
FIG. 30 illustrates an example of a cloud network selecting a different core network (CN).

FIG. 30 illustrates an example of a cloud network selecting a different core network (CN). If the Network Cloud selects a different RAN from the RAN which the WTRU is currently connected to, the virtual-MME may hand over the WTRU from the undesired RAN to the desired RAN.

If a WTRU subscribing with a particular VN powers up in an area such that no cell or radio access network (RAN) belonging to or supporting VN operation may be found, and the WTRU has the VN Extension Enabling Indicator enabled, (e.g., in its SIM-like UICC device), the WTRU may be able to request the subscribed-VN to include the currently camped/connected access network (cell/RAN) into its service and connection coverage via one or more of the following steps.

For example, the VN controlling node (e.g., VNMF) may negotiate with the visited network on the operation management issues once it receives one or more of the WTRUs VN Extension Enabling indicator, VN Extension WTRU Privilege Code, VN-Id, or VN-UD-Id. The WTRU may include in its RRC Connection Request (or the RRC Connection Setup Complete or an equivalent) message one or more of the VN Extension WTRU Indicator, the VN Extension WTRU Privilege Code, the VN-Id, or the VN-WTRU-Id to indicate its intension of applying the coverage of a certain VN from the visited cell/RAN/CN.

The WTRU may include in its network registration (e.g., ATTACH REQUEST or a VN communication primitive which may be forwarded to the VN) one or more of its VN Extension Enabling Indicator, a VN Extension WTRU Privilege Code, a VN-ID, VN-UD-Id, the requested service category (and maybe the urgency level), the identities of the radio access network or the PLMN that is under request to be included in the VN, or the address or routing path for the request (part of the ATTACH REQUEST) to be forwarded to the VN network and connection management node.

The WTRU may indicate the network registration message be sent to a specific network entity advertised by the VN or the network registration to the CN's controlling node. From the visited network, the base-station (eNB or NodeB) may accommodate the visiting WTRU when it receives one or more of the VN Extension Enabling Indicator, the VN Extension WTRU Privilege Code, the VN-Id, or the VN-UD-Id.

The base-station may forward the network registration message to the specified network entity or the VN's VNMF. The registration may happen over the visited cell/RAN as a VN extension. The base-station may forward the registration message to the visited CN controlling node (e.g., an MME/ serving general packet radio service (GPRS) support node (SGSN)) and the CN controlling node may route the network registration message to the VN's controlling node VNMF.

If a VN subscribing WTRU in Idle mode is drifted to an area where no cells/RAN belonging or supporting the VN and the WTRU may maintain the connectivity and registration from the subscribed VN (e.g., to receive paging), the WTRU may reselect a visiting cell/RAN, performing the Tracking/Routing/Location Area Update by including one or more of the VN Extension Enabling Indicator or the VN Extension WTRU Privilege Code, the VN-Id, the VN-WTRU-Id in the RRC Connection Request/RRC Connection Setup Complete message or an equivalent and the tracking area update (TAU)/routing area update (RAU)/location area update (LAU) message.

The WTRU subscribing the VN may invoke a VN service from the visited network cell/RAN by including one or more of the VN Extension Enabling Indicator or the VN Extension WTRU Privilege Code or VN-Id or VN-WTRU-Id in the SERVICE REQUEST or an equivalent service invocation message towards the subscribed VN.

A WTRU may have a virtualized network subscription but may not want to be wholly owned or dictated by the SIM-like UICC device assigned by the network. There may be a choice for a WTRU to subscribe to more than one network but not be owned by a SIM-like device from that network. A WTRU may subscribe to another network online for particular connectivity or services.

A WTRU may subscribe to a network, a virtualized service network or a Cloud or a multiple of them from other communication means, (e.g., walk to an operator's agency, over the Internet, by regular telephone service, and the like). The subscription may take place before the WTRU is using the subscription for system and service access.

A WTRU may register with one or more VN and/or Cloud and the subscription(s) may leave the subscription record in the non-volatile memory of the WTRU. The record may include the subscribed VN-ID or Cloud-Id. The record may include the credentials for the WTRU to register to the subscribed VN or Cloud and to obtain services or run applications. The record may include the network directory service node/entity ID/Address/access method.

A WTRU may use the subscribed VN-Id or the Cloud-Id to locate cells/RAN that may be affiliated with a VN or a Cloud. The WTRU may use the obtained credentials (e.g., from a subscription) to register and/or security check with a VNMF or with a MME which may perform the registration and security verification with the WTRU on behalf of the VNMF. The WTRU may obtain the network connectivity and acquire the available services and applications, or invoke (e.g., directly invoke) the desired service/application acquired previously at system information acquisition.

For the WTRU instantaneous online subscription to a VN when the WTRU decides to make a call or to invoke a service or to run an application from the VN or Cloud that it has not subscribed, one or more of the following may apply. For example, an Idle mode WTRU may read the system information and find the directory service node entity and cells that may allow unsubscribed WTRU access. For example, a WTRU may connect to the accessible cell through which to query the directory service node entity (e.g., which may or may not need WTRU network registration to provide list of services/applications) to find out about the services and applications of one or more of the VN or Cloud, subscribed or not.

The WTRU may connect to the cell/RAN leading to the VN (or Cloud) and perform the registration and invoke the service. The WTRU may perform the registration and service invocation, (e.g., combine the content and semantics of the ATTACH and SERVICE requests or the SIGNAL that may bring up a service/application together). The registration may last when the invoked service or services on the VN or Cloud are active.

To fully support the user-centric mobile management approach, one or more WTRUs may not have a subscription from a network or operators so as not to be restricted to any specific networks/operations or their services/application. The WTRUs may want to be serviced anywhere and by anyone network at anytime. An unsubscribed WTRU, (e.g., a WTRU with no particular subscription to any particular network (e.g., virtual or not)) may access any network at anytime. A portion of the unsubscribed WTRUs may have a SIM-like UICC device (e.g., a card and/or a reader).

The WTRU may be equipped with a SIM-like UICC device (e.g., a card and/or a reader) from the phone manufacturer instead of from any of the network operators (an CN, an VN or a Cloud). The UICC card may have information for emergency call parameters, emergency point-to-point (P2P) call parameters or other primitive WTRU IDs and primitive functional parameters.

The phone manufacturer may provide information (e.g., limited information) over the UICC card to aid the WTRU to subscribe or register online for the virtual network operation and service. One or more of the following may apply. For example, the card may include an unsubscribed WTRU-Id, which may be used for the unsubscribed registration action.

For example, the card may include information to aid the WTRU for online subscription/registration/verification. The information may be created by the phone manufacturer based on the information obtained from the user or provided by the user on purchase. The card and the UE may be inter-locked. Detach one from the other may generate security alert/alarm. One or more of the following may be provided: the financial institution(s) (name, ID, address, access method) from which the user may connect to obtain credit for system access and registration to a cell/RAN, CN of a VN or a Cloud with a unsubscribed status, the access information of the financial institution such as the identities of the PLMNs and the RAN (cells), APN names, IP addresses, and the like, and security credentials that are created (e.g., encrypted) from user's input to communicate with some financial institution for online subscription or registration activation or verification of WTRU status.

The card may include one or more default network entities indicated by one or more parameters (e.g., an ID, an address, an access code, and the like). When the WTRU first powers up in a network, the WTRU may connect to one of the default network entity to receive information about system access and about the available services/applications and the like.

When the WTRU powers up, the WTRU may select a cell that may support the unsubscribed WTRU access. The WTRU may perform a registration with the financial institution or with the default network identity. The WTRU may include in the registration message its credential or unsubscribed-WTRU-id and the FI name/ID or the default network entity ID.

The access from unsubscribed WTRUs with a SIM-Like UICC may be divided as follows. The WTRU may select a Network Cloud Operator. A Network Cloud Operator may authenticate the WTRU and payment option. The WTRU may apply for a temporary subscription to the network cloud operator and download the subscription file. The WTRU may apply for temporary subscriptions from multiple network cloud operators. The WTRU service/operator virtualization manager may manage the multiple virtual NE subscription files. Based on WTRU service request, it may select a subscription file to access the network.

A WTRU may make a virtual network selection, e.g., based on the services the virtual network may provide, the cost the virtual network may charge, the coverage area and the QoS the virtual network may offer. For the unsubscribed WTRU, if it does not have access to a cellular network may receive the information about a service provider use other networks (e.g., IEEE 802.11 based networks) to receive these information of the service provider.

One way is to configure the RAN may be to broadcast the services, rate and other information of the MVNO. The RAN may support multiple MVNO and therefore may broadcast information for each of the MVNOs.

A type of access to retrieve service information from the MNVO/MNO may be provided. A WTRU may send an NAS or an RRC message to the accessing network to request for service information. The RAN may route the request message to the virtual MME based on the selected PLMN, (e.g., the PLMN for the Cloud Operator). The virtual MME/VNMF may respond with the service information that may include a list of services provided, e.g., when the virtual MME/VNMF receives the request message, based on the message type and information requested. The rate for each service provided may include the rate for different date and time periods, the QoS the provider provides, rating of the services provided, Location/Region of the service provided and basic service charge, and the like.

The WTRU may select a virtual/cloud network provider for the required service, e.g., when a user triggers a service request based on the nature of the service and the service information of the virtual/cloud network provider. The WTRU may select a virtual/cloud network provider as its default network provider for basic access service. The selected virtual/cloud network provider may provide the WTRU with a global reachable address or number, (e.g., MSISDN). The WTRU may be reachable from the outside via the selected virtual/cloud network provider.

The WTRU may trigger a registration mechanism (e.g., a new registration mechanism) to the selected virtual/cloud network provider. The virtual/cloud network provider may use third party service to authenticate the user and establish payment options, e.g., if the WTRU is new to the selected virtual/cloud network provider.

The virtual/cloud network provider may grant the requested service by inserting a temporary subscription to its HSS, e.g., after the virtual/cloud network provider authenticate the WTRU and establish the payment options. The WTRU may download the temporary subscription profile to its SIM-like UICC.

The WTRU may apply multiple subscriptions from one or more virtual/cloud network providers for different services. The WTRU may store multiple subscriptions into its SIM-like UICC. For each service, the WTRU may select a network and use the corresponding subscription for system access.

To fully support the user-centric mobile management approach, WTRUs may not need to have a subscription from any network or operators so as not to be restricted to any specific networks and/or operators, or bound to their services and/or applications. The WTRUs may desire to be serviced anywhere and by any one network at anytime. An unsubscribed WTRUs (e.g., a WTRU with no particular subscription to any particular network (e.g., virtual or not) may access a network, e.g., if the network provides support for the access by unsubscribed WTRUs and there is a suitable financial means for paying the network support and services, and an approach of securing the safe networking against the misdemeanors and maliciousness.

For the unsubscribed WTRUs without a SIM-like device, network discovery, network selection, registration and subsequent service invocation and other operations may depend on information provided by networks in various ways over the networks. One or more techniques for the unsubscribed WTRUs without a SIM-like UICC device to handle in terms of system access and network registration may be provided. The techniques may include, for example, initial power-up and network selection, subsequent power-up and network selection, etc.

On its first power-up, the WTRU may operate on a default method to select a cell and register with the selected network via the routing to a designated network entity on the selected VN or a default network entity trusted by the selected VN (e.g., in the system information block (SIB)) for performing the network registration, e.g., via that entity and further acquiring other operating parameters.

A WTRU may not have subscribed (e.g., no subscription information may have been provided), with any CN, VN, or Cloud. The WTRU may not have had a SIM-like UICC device with any information or predefined preference and when the WTRU powers up the first time (e.g., there may be no stored information). The WTRU may have to read the broadcast information from one or more of the detected RAN/Cells to find out about their VN or Cloud ID, and their available services or applications (e.g., name, ID, charging info, etc.) for WTRUs or the name and address (e.g., APN) of the network entities that may have the availability information about the services and applications. The WTRU may determine the operating privileges or priorities towards different categories of WTRUs (e.g., home, neighbor, foreign and unsubscribed), the support of the unsubscribed WTRU access; current network load conditions, QoS offerings, and/or prices the network may charge to WTRUs for different subscriptions. The WTRU may obtain radio conditions with each detected cell/RAN.

For an unsubscribed WTRU, e.g., based on the obtained system information, the WTRU may distinguish the cells with master VN that may support unsubscribed WTRU access. The WTRU may detect and collect a list of one or more of the supporting VNs and their affiliated RAN/Cells. The WTRU may select a suitable VN or Cloud from the collected VN (and their affiliated RAN/Cells) list by comparison using on one or more of following criteria. For example the WTRU may choose a VN or a Cloud with the available RAN/CN based on the availability of the desired services/applications to the unsubscribed WTRUs. For example the WTRU may choose a VN or a Cloud with the available RAN/CN based on the pricing, e.g., the pricing of the desired services or applications or the pricing of the desired connectivity and networking or both. For example, the WTRU may choose a VN or a Cloud together with the available RAN/CN based on network performance, e.g., towards a network with the lowest network load so the WTRU may obtain connectivity and services with the best QoS. For example, the WTRU may choose a VN or a Cloud together with the available RAN/CN based on the network coverage, (e.g., towards a network that may have the most of the available cells around), so the WTRU may be least interrupted due to network switch (e.g., WTRU handover (HO)). The WTRU may choose a VN or a Cloud together with the available RAN/CN based on the power consumption consideration (e.g., when the WTRU is relatively stationary, e.g., at home or office).

Uplink transmission may use the least power (e.g., choose the cell/RAN the WTRU has the closest distance towards its base station). The RAN may use a longer discontinuous reception (DRX) cycle, or the cell may have the lowest background noise level (e.g., insignificant inter-cell interference and additive Gaussian white noise (AWGN)). A VN or a Cloud may be chosen together with the available RAN/CN, e.g., based on user preferences, or with the available RAN/CN based on network policies and their valid areas. Such policies may include discovery information to assist the WTRU in efficient discovery of operators and/or access technology and/or services and/or service providers and/or any other stakeholders in the validity area associated with these information, inter-operator mobility policy (IOMP), inter-operator routing policy (IORP), inter-system routing policy (ISRP), security, authentication and privacy control policy and rules across stakeholders, charging policies, virtualization layer rules for idle RAT/frequency selection priority in idle mode and RAT/inter-frequency handover in active mode, QoS policies or policy conflicts mediation and resolution rules (e.g., rules for prioritization and pre-emptions across policies of various stake holders).

The WTRU user (or a network selection routine) may determine to alter the above described selection criteria order and/or the selection criteria combination, (e.g., choosing a VN based on the service availability and the network performance).

The WTRU may select a VN or a Cloud based on the above selection criteria. Then WTRU may then select a cell/RAN that belongs to the chosen VN or Cloud and start a connection with the selected cell/RAN. The WTRU may start network registration directly with the VNMF from the chosen cell.

During the RRC connection, (or other radio resource control level), establishment, the unsubscribed WTRU may indicate its unsubscribed WTRU status either by an unsub-scribed-WTRU-Id or an indicator. The WTRU may indicate the VN-Id or VNMF-Id in the RRC connection complete message. In the registration procedure (e.g., ATTACH or ATTACH-like), the WTRU may include the VN-Id and/or the VNMF-Id or addresses and/or an indication of intension to directly register with the network management entity (e.g., VNMF). For example, the eNB or the base station, based on the VN-Id or VNMF-Id or other indications, may route the WTRU network registration request to the VNMF, or to a default network entity, which may belong to the VN or belong to a group of VNs or a universal one, for handling unsubscribed WTRU registration since the WTRU has indicated its unsubscribed status in the initial RRC Connection request stage. The default entity may forward the registration request to the VNMF.

In an example, the MME of the CN may receive the unsubscribed WTRU registration request. The MME may forward the registration message to the VNMF by the VN-ID or VNMF-ID or other indicators, or the MME may contact the VNMF for unsubscribed WTRU registration information and may perform the registration on behalf of the VNMF. The WTRU may carry out the network registration procedure with the VNMF or its equivalent in the VN or Cloud or with the MME (e.g., the MME may perform the registration on behalf of the VN).

On a WTRU power-up, the WTRU may have accumulated operating parameters for network accessing and registration from a previous registration and operation. The stored access information may dictate or direct the access and registration, e.g., if the WTRU has had the relevant information in the same geographical location or around.

The stored network access and registration information may include one or more of the following: location information, e.g., where the system and service access (e.g., including network finding, and selection, subsequent access and connection experience) had last performed and worked, the top-ranked successfully accessed cell/RAN, CN and VN or Cloud, their identities, addresses and access method and pricing information; the evaluation of the operational experience (e.g., quality of experience (QoE), successful rate, delay/QoS, pricing, and the like) with the last chosen network/cell; or a list of other cells/RAN, affiliated CN, VN and Cloud, their identities, addresses and access method and pricing information last detected or used, (e.g., the other cells are those that may allow unsubscribed WTRU access and may be ranked as the next top-N choices) for the same location or around.

On a WTRU power-up, the WTRU may locate its position, e.g., if there is stored access information obtained and stored previously, the WTRU may use the information for the system and service access. If the access attempt is not successful, the WTRU may select another one from the list of other cell/RAN, CN, VN or Cloud choices. The user may override the QoE or QOS values and shuffle the order of the selection choices within the stored information, or the WTRU/user may let the initial system and service access run again, (e.g., as in the first power-up). A VN may broadcast (e.g., via its affiliated cells/RAN system information broadcast) the available services and applications to the general WTRU population.

One or more network nodes and/or entities for the collection of available services and applications may be used for one VN or for a number of VNs. A network node and/or entity may appear to WTRUs as an APN.

A WTRU may reach the APN for one or more of the following purposes: for learning about the list of each of the currently available services and applications, for inquiring about the availability of a particular service or application and its cost of invocation based on the WTRU's level of affiliation with the particular VN, or for invoking a particular service/application from the WTRU's current network connection and location.

A WTRU may reach the APN using a service availability inquiry message or a service invocation request message at the NAS/CN level or at the VN/Cloud interface level or use an instance of API, after the WTRU has registered with the (WTRU subscribed) VN or from another VN that shares this APN. The request message may be sent over the control-plane or may be sent over the user-plane if a connection or a bearer exists over the U-plane.

A WTRU may make an inquiry to the available VN services and application in the network registration request message (e.g., ATTACH-like or an equivalent registration message), where an indicator may be set by the WTRU so that the VN may respond in the registration accept message with the list of available VN services and applications upon receiving the registration request with this indicator set and granting the registration.

A WTRU may obtain an available list of VN services and applications based on one or more of the following criteria. For example, a list of each of the available services/applications, a list of available services/applications that may fit to run on a particular WTRU based on the WTRU equipment (e.g., hardware and/or software) capabilities, (the WTRU may inform the VN about its capability), a list of available services/application of a particular service category (e.g., a category or a service topic such as travel related, health related, and the like), or a list of available services/applications that may be suitable to run from the WTRU's current network connection/location.

Based on the above choices, the WTRU may indicate (e.g., using indicators) the particular service/application listing choice(s) to the VN when the WTRU submitting a service availability enquiry to the VN/APN. The VN may return the WTRU desired list of available service/application based on the indicators in the list service request message from the WTRU. The WTRU may select the service/application based on the desirability or the user and the suitability of the equipment/network connection and/or the VN policies, e.g., when the WTRU receives the list of available VN services/applications.

To collect the list of each of the services/applications from one or more VNs/Clouds, a global VN service/application APN scheme may be deployed. There may have a number (or a few) of global service/application APNs. Each service/application APN may serve a service area. The several global APNs may be inter-connected and may update one another on the available services/application from their local providers, so that each of the global APN may have each of the service/application listing available and have the equipment (e.g., hardware and/or software) to run them.

Each of the global APNs may be uniquely identified, i.e., a global APN identifier/name may be defined. For example, the global APN may include or more of a Network Identifier, an Operator Identifier with an extension of a VN identifier such that the global APN name may look like a Network Identifier, a VN identifier, or an Operator Identifier. A WTRU may be configured with this set of global APN name for VN service/application access, e.g., via system information broadcast or dedicated signaling message or SIM-like configuration.

With the global APN, a WTRU may know the list of available services/application from many or any VN. From a global APN, one or more of the services/applications over different VN may be duplicates of other, e.g., in terms of functionality, but they may be run on a different price or over a different equipment requirement. The WTRU may compare based on the user desirability and the equipment suitability and select and obtain the service/application over a particular VN.

The virtualization layer (e.g., the virtualization stratum) as illustrated in FIG. 12B may be implemented by the core network domain strata and/or the application stratum and/or the access stratum or may be implemented as a distinct stratum (e.g., as an overlay stratum above the access network and core network strata). When the virtualization layer depicted in FIG. 12B is implemented by the core network domain strata and/or the application stratum, the security architecture depicted in FIG. 24 may be reused.

Figure 31:
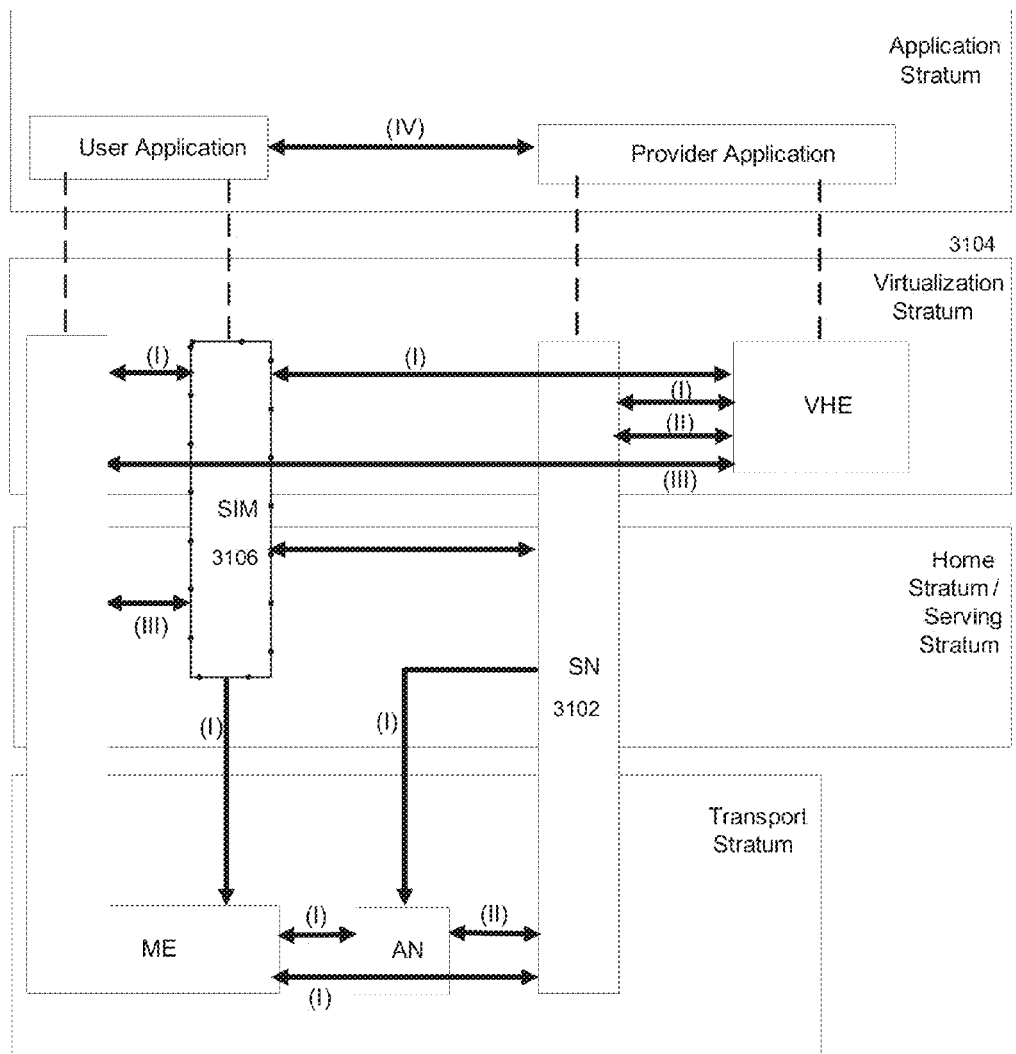
FIG. 31 illustrates an example of an overview of security architecture in a VN.

FIG. 31 illustrates an example of security architecture in a VN. A virtualization layer may be implemented by a distinct stratum or as a combination of a new stratum and the strata. The security architecture as illustrated by example in FIG. 31 may be provided. The role of the virtualization stratum home environment (VHE) 3104 as illustrated in FIG. 31 may be played by the virtualization layer subscriber server (VSS) and/or any entity or network node which implement the virtualization layer security, authentication and privacy control function (VSAPCF) and/or the virtualization layer network manager function and/or any of the virtualization layer functions as illustrated in FIG. 12B.

The SIM in FIG. 3106 may be a customary SIM or the like, (e.g., removable user identity module), or may be a service identity module especially designed for the delivery of service in a virtualized network or may be both, (e.g., a service identity module that co-exists with the subscriber identity module). An identity provider and/or a service broker and/or any entity operating at the virtualization layer, (e.g., financial institutions, credits cards or debit card institutions, PayPal, and the like), may deliver the service identity module. The SIM 3106 may be virtualized in the network, (e.g., its representation with dotted lines in FIG. 31). With a virtualized SIM, a download in full or in part of the virtualized SIM content on to the WTRU may not be performed. A part of the virtualized SIM may be downloaded. The virtualized SIM content may be downloaded on to the WTRU.

As illustrated in FIG. 31, network access security (I) may be the set of security features that may provide users with secure access to services, and may protect against attacks on the (radio) access link. Network domain security (II) may be the set of security features that enable nodes to securely exchange signaling data, user data, (e.g., between an access network (AN) and a serving network (SN) and within the AN), and protect against attacks on the wireline network. User domain security (III) may be the set of security features that secure access to mobile stations. Application domain security (IV) may be the set of security features that enable applications in the user and in the provider domain to securely exchange messages.

For example, if the SIM is virtualized into the network, the implementation of the user domain security feature, (e.g., user-to-SIM or alike access may secure access to mobile stations and may provide that the right user or users has access to the WTRU may be implemented), and may be expanded beyond the WTRU into the network. For example, user's security credentials such as password and/or biometric data may be stored into a network element of a virtualized network. The access of the user to the WTRU or to part of the WTRU (e.g., part of the WTRU functionality) or to a given security domain of the WTRU may be granted by the network element holding the previously stored user's security credentials after determination by the network element that there is a match between the security credentials stored in the networks and the security credentials provided by the user with the access request. Such access may be granted, e.g., after the WTRU and the virtualized network element have mutually authenticated each other.

As illustrated in FIG. 31, the network access security architectural scheme may be modified such that the virtualization stratum home environment (VHE) 3104 and the serving network (SN) 3102 may exchange the authentication and security credentials, (e.g., shared secret or secret master key, and the like), needed to secure the communication over the air interface between the WTRU and the SN. The VHE and the WTRU may exchange the authentication and security credentials (e.g., shared secret or secret master key, and the like) may secure the communication over the air interface between the WTRU and the SN. The security framework in virtualized network, (e.g., with an operator agnostic access) may be provided.

Virtualized network overlay public/private keys based framework may be provided. The virtualization stratum communication (e.g., in support of network access domain security) may be protected, e.g., using asymmetric cryptography with the deployment of public/private keys with digital certificates. This technique may be referred to as a public key overlay (PKO) approach. In this technique, the underlying serving communication networks may continue to use their native security. For example in the case of 3GPP network such as UMTS or LTE, the 3GPP AKA may be used in support of network access security while IPSec/ESP may be used in support of the network domain security. In the case of non-3GPP access such as WiFi/WiMax, the EAP and EAP-AKA may be used.

Virtualized network overlay shared secret based framework may be provided. The virtualized stratum communication (e.g., in support of network access domain security) may be protected using symmetric cryptography. Such a technique may be referred to as a shared secret overlay (e.g., SKO for shared key overlay). Like PKO, the underlying serving communication networks may continue to use their native security mechanisms.

Figure 32:
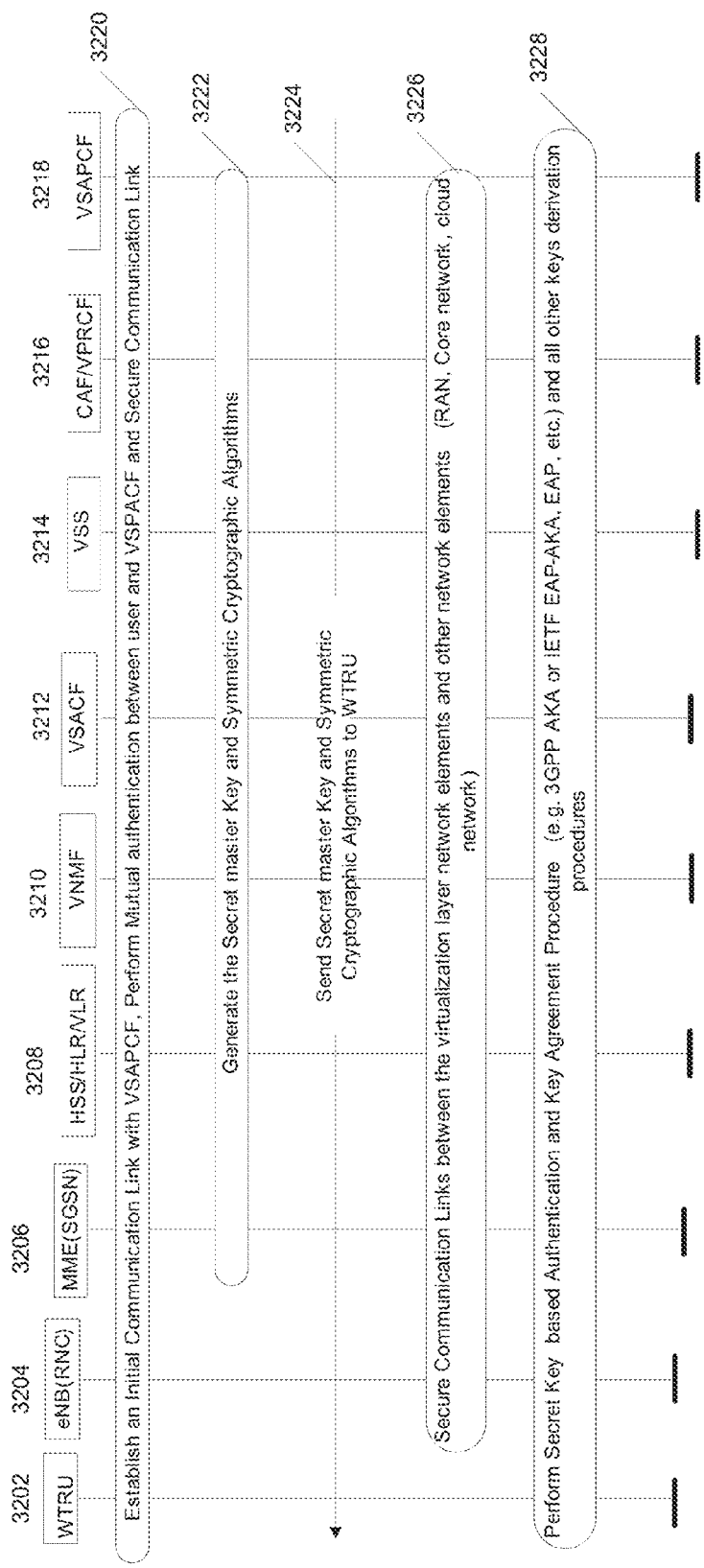
FIG. 32 illustrates an example of a public key overlay (PKO) authentication and security.
Figure 33:
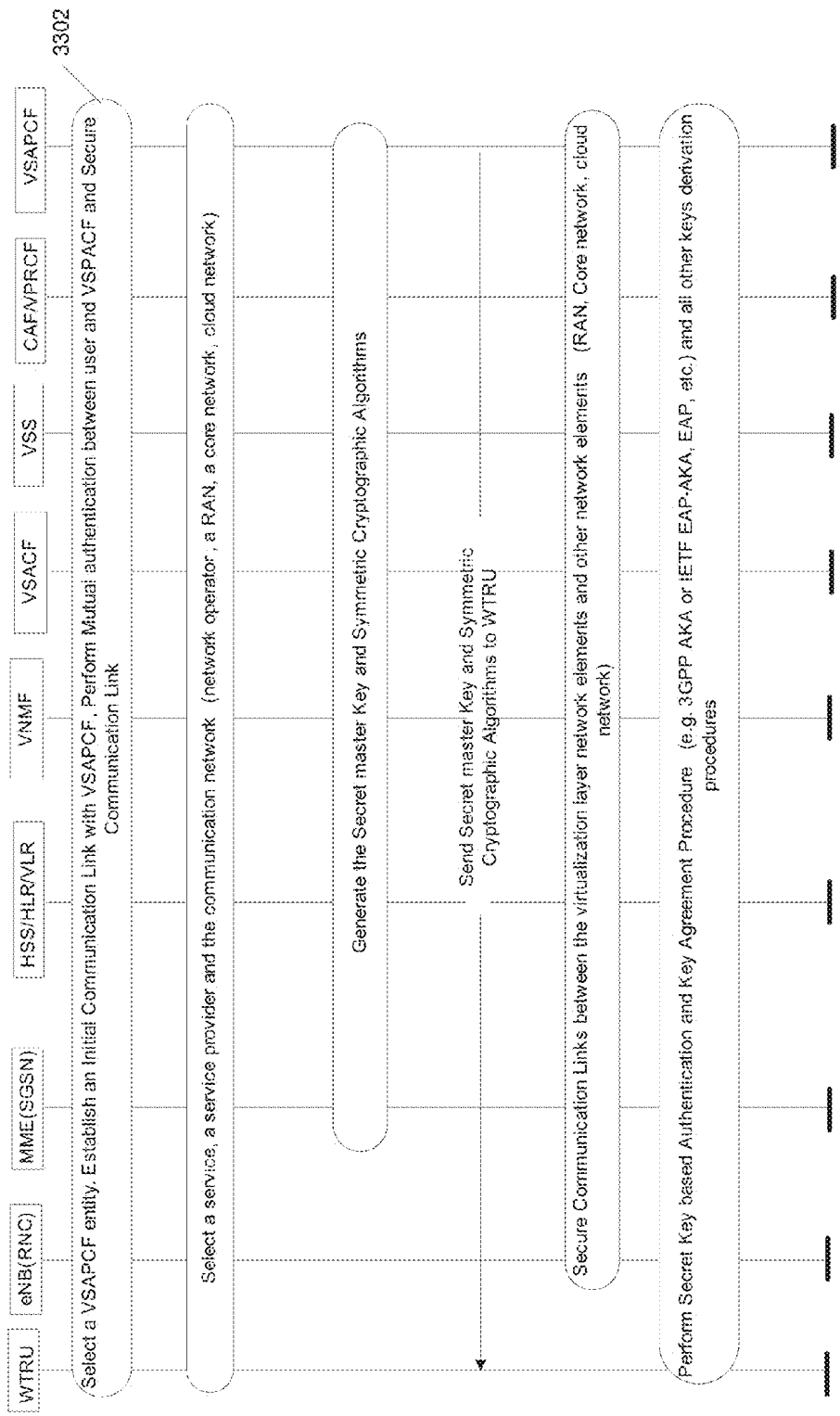
FIG. 33 illustrates an example of a public key overlay (PKO) authentication and security.

FIG. 31 and FIG. 32 illustrate examples of PKO authentication and security. FIG. 32 and FIG. 33 illustrate an authentication, keys and algorithms agreement (AKAA) between the WTRU and network in the context of an operator agnostic system access.

As illustrated in FIG. 32, at 3220 a communication link may be established between the WTRU 3202 and the virtualization layer security, authentication and privacy control function (VSAPCF) 3218 or the virtualization layer network manager function (VNMF) 3210 or any other entity of the virtualization network. The communication link may be a control plane signaling communication link or may be a control plane signaling and user plane traffic capable communication link or may be exclusively user plane traffic link (e.g., user traffic and/or application signaling traffic in user plane). Such communication link may be established through the network of the operator selected for servicing the WTRU 3202 or through other network of other operator. A mutual authentication between the user 3202 and the VSAPCF 3218 (or the VNMF 3210 or any other entity of the virtualization network) may be achieved through the use of security methods based on public/private keys with digital certificates (asymmetric cryptography). The communication between the WTRU 3202 and the virtualized stratum (e.g., VSAPCF 3218) may be secured based on based on public/private keys with digital certificates (asymmetric cryptography). The VSAPCF may be used here by way of example. Other functions of the virtualization layer as defined in FIGS. 12 A, 12B, and 12C or network elements (e.g., network node or server) implementing these functions or stakeholder implementing these functions (e.g., identity provider, financial institutions, service brokers, and the like), may be used and/or may be enabled to operate in coordination with the VSAPCF for a joint delivery as described herein.

As illustrated in FIG. 32, at 3222, the VSAPCF 3218, alone or in coordination with other entities of the virtualization layer and/or in coordination with the network elements (e.g., MME 3206, SGSN, HSS/HLR/visited location register (VLR) 3208) of the supporting core networks may generate the authentication and the security credentials (e.g., master secret key, symmetric cryptographic algorithms).

At 3224, the VSAPCF 3218, alone or in coordination with other entities of the virtualization layer and/or in coordination with the network elements (MME 3206, SGSN, HSS/HLR/VLR 3208) may take the decision to transfer the authentication and the security credentials (e.g., master secret key, symmetric cryptographic algorithms) to the WTRU 3202.

At 3226, the VSAPCF and/or any other function of the virtualization layer may initiate the security procedures to secure the communication links between the virtualization network elements and the supporting underlying communication network elements (e.g., RAN, core network, cloud network). The supporting underlying communication network elements (e.g., RAN, core network, cloud network) may initiate the security procedures to secure the communication links with the virtualization layer functions and the virtualization network elements implementing these functions. This step may relate to network domain security. For example, if the supporting underlying communication network elements selected to provide service to the user is same as the network initially used for the generation and distribution of authentication and security credentials and algorithms in steps 1-4 may not be executed. If the network elements selected to provide service to the user is different, a network domain security procedure may be executed.

At 3228, the VLR 3228 or the MME 3206 or any designated network element as per the specification of the underlying supporting network security procedure may initiate the secret key based authentication and key agreement procedure, (e.g., 3GPP AKA or Internet engineering task force (IETF) extensible authentication protocol (EAP)-AKA, EAP, and the like), toward the WTRU. In one embodiment, the underlying supporting communication network (e.g., mobile operator network) and the WTRU may rely on the authentication of the WTRU performed by the virtualization network and the authentication of the supporting underlying communication network performed by the virtualization network. As a result, the underlying supporting communication network and the WTRU may skip the mutual authentication step of the AKA procedure and each may perform the keys (CK, IK) generation step of the AKA procedure as well as the derivation of each of the other keys (e.g. $K_{ASME}$, $K_{NAS\ enc}$, $K_{NASint}$, $K_{UP\ enc}$, $K_{RRC\ enc}$, $K_{RRC\ int}$). The supporting underlying communication network and the WTRU may perform the AKA procedure as is, (e.g., may not skip the mutual authentication step).

As illustrated in FIGS. 32, 3222, 3224, and 3226 may assume that the underlying communication network (e.g., mobile network operator network) uses 3GPP AKA procedure or IETF EAP-AKA procedure may be the native network access security. The native communication network access security may include public/private keys based technique.

As illustrated in FIG. 33, 3320, may be broken into two steps Step 1a and Step 1b to highlight the fact that in one embodiment, (e.g., FIG. 32), the lower stratum network elements and/or network paths and/or network operators supporting the communication between the WTRU and the virtualization layer network entities may be the same as the ones selected for the service delivery to the WTRU, while in another embodiment (e.g., FIG. 33), the lower stratum network elements and/or network paths and/or network operators supporting the communication between the WTRU and the virtualization layer network entities may be different than the ones selected for the service delivery to the WTRU.

Figure 34:
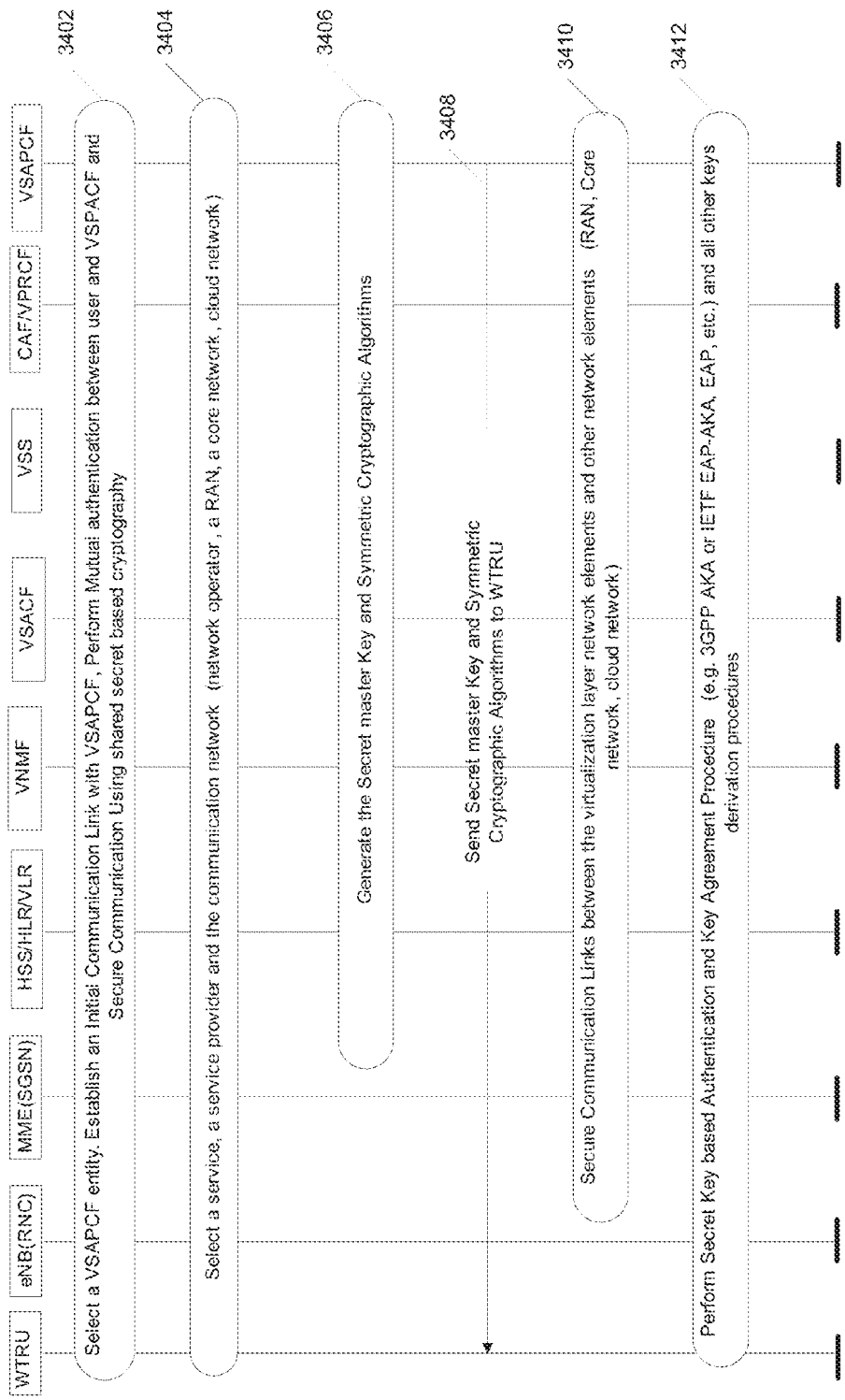
FIG. 34 illustrates an example of a secret key overlay (SKO) authentication and security procedures.

FIG. 34 illustrates an example of a high level secret key operations (SKO) authentication and security procedures. In this case, the selection of VSAPCF entity and establishment of an initial communication link with the VSAPCF (at 3402) may be similar to 3220 in PKO of FIGS. 32 and 3302 FIG. 33 with the difference that, in the SKO method, a share secret cryptography method may be used for the mutual authentication between the user and the virtualization stratum entities and for the derivations of the security keys used to secure (e.g., ciphering and encryption), the communication between the two entities. Other one or more actions of

3404, 3406, 3408, 3410 or 3412 as illustrated in FIG. 34 may assume shared secret cryptography and/or may be public key cryptography based.

Security procedures as illustrated by example in FIGS. 32-34 are described herein. In order to trigger the procedure to download the security credentials, (e.g., share secret or shared secret master key, symmetric ciphering algorithms, symmetric integrity algorithms), needed for the execution of the AKA procedure between the WTRU and the supporting underlying communication network to the virtualization layer (e.g., the virtualization network), the WTRU may initiate the Attach procedure by the transmission to the network of an Attach Request message. The request may include one or more unique identity (or identities) which can be used by the underlying supporting communication network to route the request to the virtualization layer. The request may include detailed information (e.g., service identity, QoS information, price information, and the like) about the service or services the user wishes to access. The stakeholder receiving the request at the virtualization layer may be the VNMF function, the VSS, the VSAPCF, the VSACF, the VPRCF, the CAF (virtualization layer credit authority function) or any virtualization network element or stakeholder (e.g., an identity provider, or a service provider or a service broker or a financial institution) implementing the one or more of the virtualization functions as illustrated in the FIGS. 12A, 12B, and 12C.

The supporting underlying network may transfer the received message to the virtualization layer. The supporting underlying network may interpret the received message in detail to initiate the download of the security credentials toward the virtualization layer on behalf of the WTRU, or may initiate a service registration or service request toward the virtualization network on behalf of the WTRU which may trigger the security credential download. The WTRU may send a request to the network to download the security credentials (e.g., share secret, ciphering algorithms, and encryption algorithms). The WTRU may combine the request to download the security credentials with other messages such as mobility management messages or session management messages. In a case where the security mechanism used is asymmetric cryptography based approach (e.g., public/private keys) the WTRU may include its public key and its digital certificate in the Attach Request message. The WTRU may include information related to asymmetric cryptography capability, ciphering/integrity setting and other session specific data that the virtualization layer may secure a communication with the WTRU.

The Attach mechanism and the corresponding Attach Request message described herein are exemplary. The mechanism used to initiate the download of the security credential for the execution of the AKA between the WTRU and the supporting underlying communication network to the virtualization network may be other appropriate mobility management such as Tracking Area Update procedure (e.g., using TRACKING AREA UPDATE REQUEST), Service Request Procedure (e.g., using SERVICE REQUEST) or Extended Service Request Procedure (using EXTENDED SERVICE REQUEST PROCEDURE) or Detach procedure (using DETACH REQUEST).

A technique may be provided to initiate the download of the security credential needed for the execution of the AKA procedure between the WTRU and the supporting underlying communication network of the virtualization network may be used. Such technique may use an attach request type or tracking update request message type, or a service request message type or a detach request type or a mobility management message type or a session management message type.

In the case where the Attach Request message or the like is transferred to the virtualization layer, the receiving virtualization network element may interpret the message and may initiate the generation of the shared secret (or the secret master key) together with the needed symmetric cryptography algorithms and may initiate the transfer of the generated security credential toward the WTRU. The generation of the security credentials and the transfer of these credentials to the WTRU may be accomplished by the virtualization layer network element that received the Attach Request message or the like alone or may be accomplished in collaboration with the other virtualization network elements and the network element of the supporting communication network.

The receiving node may forward the message to another virtualization network element that may interpret the message and initiate the generation of the shared secret (or the secret master key) together with the needed symmetric cryptography algorithms and may initiate the transfer of the generated security credential toward the WTRU. For example, the VNMF may receive the Attach Request or the like message. The VNMF may query the identity provider or the financial institution or the service broker who may implement part (or whole) of the CAF and VSAPCF and the VSS function, e.g., to validate the identity standing and/or the credit standing of the user.

Assuming the user has a subscription profile, the VNMF may query the VSS to get the service/subscription information of the user. The VNMF may then select based on the information retrieved from the other virtualization layer functions (e.g., CAF, VSAPCF, VSS, VSACF), the supporting communication network that may serve the user request. The VNMF may coordinate with the VSACF and other virtualization layer functions, based on the security profile and security requirements of the user and/or the supporting communication network and/or other virtualization stakeholder (e.g., service broker, Identity provider, financial institution, etc.) the selection of the service provider for the delivery of the service requested by the WTRU. The VNFM may coordinate with the VSAPCF, the VSS, the CAF, the VSACF and/or the underling communication network, the generation of the security credentials to be used for the establishment of the security contexts (authentication, ciphering and integrity) between the WTRU and the supporting communication networks selected for the delivery of the specific service to the user.

If an asymmetric cryptography (e.g., public/private keys) is use to secure the communication between the WTRU and virtualization layer for the download of the share secret (e.g. master key or pre-master key), the WTRU may be preconfigured with the public keys of the virtualization layer stakeholder (e.g., identity provider, service broker, financial institution, etc.) or entity or network element that has the ultimate responsibility to authenticate the identity of the user that may be attempting to receive a service thought the virtualized network.

The virtualization network layer may provide its public key to the WTRU in the response message to the WTRU request for the download of the security credentials to be used for the establishment of security context (e.g. AKA procedure) between the WTRU and the underlying supporting communication network. The public key may be sent in the clear e.g., unprotected and may not be part of the portion of the message content that may secured.

The supporting underlying communication network may broadcast the public keys of the supported virtualized network together with their digital certificate and/or their identities. The WTRU may include the public key and the digital certificate of the selected virtualization network in the Attach Request message. The virtualization layer network and the WTRU may use the exchanged information (e.g., public keys, digital certificates, respective signatures data, etc.) to authenticate each other and securely exchange the AKA security credentials to be used between the WTRU and the supporting underlying communication network.

In the case of non-transparent request message to the supporting underlying communication network, the supporting underlying communication network may select the virtualization network that may serve the WTRU. Such selection may be based on the detail information (e.g., service identity, QOS information, price information, security level, etc.) about the service or services the user wishes to access which is included in the Registration request (e.g., Attach Request) received from the WTRU. Such selection may be based on the network policies and/or user preferences received from the WTRU. The user preferences may be communicated to the network (e.g., in the registration and/or a service request message).

The registration request and the selection of the virtualization network may not include a service specific related information but may include information such as user preferences and information on QOS, SLA, price information, security requirements at a generic level with no tie to a specific service. The registration request may include the public key and the digital certificate of the user. Upon reception of the registration request (e.g., attach request) from the WTRU, the virtualization layer may signal to the WTRU its public key and digital certificate. The WTRU may use the received public key and digital certificate to initiate the download of the secret key needed for the execution of the AKA procedure and the establishment of the security contexts between the WTRU and the supporting underlying communication network (e.g., mobile operator network).

The selected virtualization network may signal its public keys and its digital key in the message carrying the AKA share secrets and other security credentials to be used between the WTRU and the supporting underlying network (e.g., mobile operator network). The public key and/or the digital certificate may be in the clear while the rest of the message may be securely protected by the virtualization network with the use of asymmetric cryptography (e.g., the information is ciphered and encrypted with the virtualization network private key). The virtualization secure (e.g., cipher and/or encrypt) the AKA share secret and other security credential and transfer it to the underlying supporting communication network. The underlying supporting network may add the public and/or the digital certificate of the selected virtualization network and transfer the packaged message with the AKA credentials received from the virtualization network to the WTRU.

The share secret and the cryptographic algorithms used between the WTRU and the supporting communication network (e.g., mobile operator network) that may be beneath the virtualization layer functions (e.g., VSS and/or VSAPCF and or VNMF, etc.) or any entity or network elements of the virtualization layer may be generated in many ways. The shared secret may generated exclusively by the virtualization layer alone. The virtualization layer function (e.g., VSS and/or VSAPCF and or VNMF and the like), or network entity/element may distribute the shared secret to the WTRU and to the support underlying communication network (e.g., underlying mobile network) using a secure communication. The distribution of the key may be real-time for example at the time of the registration/attachment of the WTRU to the network (e.g., network registration) and/or at the time of the request or consumption of a service (e.g., service registration) and/or at the time of a mobility event that may require the renewal/establishment or renewal of the security context between the WTRU and the supporting underlying communication networks (e.g. mobile network) to the virtualization layer/network.

The distribution of the key may be static or semi-static through provisioning procedure (e.g. OMA OTA DM based approach, wired interface, (e.g., Internet connection or direct point-to-point connection, e.g., Bluetooth, USB connection, WTRU terminal console, and the like). The exchanged shared secret, (e.g., share mater key), may be used in support of the AKA procedure between the WTRU and the communication network.

The supporting underlying communication network may generate the secret key and may distribute the secret key to the virtualization layer function (e.g. VSS and/or VSAPCF and or VNMF, etc.) or network entity or network element. The virtualization layer may send the shared secret to the WTRU using a secure communication (e.g., public/private keys security mechanism) between the WTRU and the virtualization layer.

The virtualization layer and the underlying supporting communication network may produce a share secret through some exchanges and algorithms. For example, the virtualization layer and the communication network may communicate to a third party network or server (e.g., using Diameter protocol) to retrieve a secret to be shared with the WTRU or some information that may be used to independently generate the share secret to be provided to the WTRU. The WTRU may provide in the registration request (or any other initial access message or mobility management message or session management message) input (e.g. public key, digital certificate, financial credential,) that may be used in the secret generation process. The virtualization layer may send the shared secret to the WTRU using a secure communication (e.g. public/private keys security mechanism) between the WTRU and the virtualization layer as described herein. Upon reception of the shared secret ciphered and encrypted by the virtualization layer, the underlying supporting communication network between the virtualization layer and the WTRU (e.g. mobile network) may transfer the ciphered and encrypted shared secret to the WTRU on the clear (i.e. without any additional security measure) using a NAS message. The secret key may be sent as a transparent NAS container by the mobile network. The secret may be sent to the WTRU on the clear as a user plane data without any additional security measure native to the user plane.

The security procedures (e.g., virtualization network access security) as described herein may apply in control plane and/or user plane. The security procedures (e.g., virtualization network access security) described herein may be implemented in part or in whole by an application layer.

User domain security may be provided. As described herein, the communication between the mobile station and the networks (e.g., with underlying supporting network and the virtualization network) may be secured. The proposed methods in the above section may not prevent fraudulent access to the network resources and services, e.g., when the user domain in comparison to the system, e.g., as illustrated in FIG. 24, is expanded into the network, e.g., as illustrated in FIG. 31. To prevent fraudulent access to network resources and/or services, the network resources and/or services may be used jointly with the techniques described herein.

The user may share a secret with the virtualization layer network element or stakeholder or server implementing one or more of the virtualization functions (e.g., VNMF, VSS, VSACF, VSAPCF, CAF, VPRCF, and the like). The shared secret may be a password (e.g., an alphanumeric password) and/or biological information. The shared secret may be integrated with the asymmetric cryptography security credential, (e.g., a public key, a user digital certificate) transmitted by the device to the virtualization network for comparison with the copy of the secret pre-recorded in the virtualization network. For example, the shared user's password and/or the shared user's biological information may be sent by the device to the network as a signature (e.g., a unique signature) in addition to the public key and the user digital certificate for the authentication of the user and/or the device by the virtualization network. In an example, the device may use the user's shared password and/or the user's shared biological information to generate the unique signature (e.g., through mathematical transformation) that may be sent with the user's public key and digital certificate to the virtualization network as part of the asymmetric cryptography (e.g., public/private keys) security procedure. In an example, the user's shared password and/or the user's shared biological information may be sent by the device to the virtualization network as a secondary signature in addition to the primary signature used by asymmetric cryptography security procedure.

The user's biological information may be a combination of one or more of the user's DNA (Deoxyribonucleic Acid), a fingerprint, hand geometry, an iris and retina, a voice, a keystroke, a signature, an earlobe, a nostril, a facial image, and the like. The biological information may be used in their original form or may be processed through an algorithm or a mathematical transformation, for example, to generate a sequence of binary digits (or any other numeral system representation) or sequence of alpha numerical characters or sequence of any other symbols which constitutes the template stored in the virtualization network and used for comparison with the input provided by the user during the authentication procedure. The biological information may be used individually or in a combination and furthermore may be combined with a password (e.g., an alphanumerical password) shared secret type in their basic/native form (image e.g., an earlobe, an analog signal e.g., a voice signal, etc.), or processed through an algorithm or a mathematical transformation to generate a unique shared secret (e.g., binary digit sequence or an alphanumeric characters sequence or a numeral system representation or a multimedia/graphical/image/audio representation and the like).

The shared secret in its native format or processed through a processing apparatus (e.g., algorithm or any mathematical transformation) may be generated (e.g., dynamically generated) by the WTRU based on the user input. The WTRU and the network may be able to negotiate the algorithms or mathematical function to be used, e.g., to process the share secret through one or more algorithms and/or mathematical transformation.

The network may positively authenticate the user if the share secret or the resulting transformation through a negotiated or pre-provisioned algorithms or mathematical function or the resulting unique signature send to the network by the user (for example as part of public/private keys cryptographic based procedure) matches the share secret stored or generated through some algorithmic transformation by the virtualization network. The network may fail to positively authenticate the user, e.g., if the share secret or the resulting transformation through a negotiated or pre-provisioned algorithms or mathematical function or the resulting signature send to the network by the user (e.g., public/private keys cryptographic based procedure) does not match the share secret stored or generated through some algorithmic transformation by the virtualization network.

A device equipped with an RF ID capability may generate the share secret based on the user input that may be scanned into the WTRU contactless.

A WTRU may negotiate (e.g., dynamically negotiate) security configurations (ciphering ON/OFF, integrity ON/OFF, security credentials strength, etc.) to be used for communication between the WTRU and the networks (e.g., underlying supporting communication networks of the virtualization network, virtualization network, cloud network, etc.). The WTRU may negotiate one or more different security configuration levels for each of the security domain as illustrated in FIG. 31. The WTRU may negotiate different security configuration for the layers within the security domain. For example, the network access security configuration setting may be different between for the access stratum and the non-access stratum (e.g., ciphering may be ON for the access stratum while it is turned off for the non-access stratum). The WTRU may negotiate the security configuration for each service individually or for a group of services. The user may trigger the security configuration negotiation with a user interface of the terminal (e.g., GUI, vocal/sound interface, haptic interface, and the like).

The user may trigger the security configuration through the setting (for example ahead of time prior to initiating communication with the network) of the user preferences or policies. These preferences or policies may be stored in the WTRU or in the network (e.g., VSS, VSACF, VSAPCF, VNMF, HSS, and the like). The network may initiate security configuration with the WTRU. As part of supporting the dynamic configuration of the security setting, the user may be informed upon a successful change on the security configuration. Such information may be provided to the user through the terminal user interface, (graphical user interface (GUI), vocal/sound interface, haptic interface, and the like).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit receive unit (WTRU), the method comprising:
   receiving a system information (SI) broadcast from a radio access network (RAN) node, the SI broadcast indicating that an operator of the RAN node supports service-based network access, wherein the service-based network access is RAN operator agnostic;

sending, via the RAN node, one or more of a service request to a virtual service provider to request the service, a validation method, or a payment method, wherein, the service request comprises one or more of a service type; a service duration, or a quality of service (QoS);

receiving a service response from the virtual service provider, the service response indicating a mobile network operator (MNO) to use for obtaining the service and subscription information for accessing the MNO, wherein the MNO is different than the operator of the RAN node;

establishing a first network connection using a first radio access technology;

utilizing the first network connection to communicate with a server virtualizing resources for a second radio access technology utilized by the WTRU; and accessing the MNO to obtain the service.

2. The method of claim 1, wherein the WTRU lacks a subscription with either the operator of the RAN node or the MNO.

3. The method of claim 1, wherein the service request is sent as part of an attach request.

4. The method of claim 3, wherein the attach request is of access cloud service type.

5. The method of claim 3, wherein the WTRU attaches to the RAN node in a limited state in order to determine an operator network to use for accessing the service.

6. The method of claim 5, wherein the limited state limits at least one of an amount of time the WTRU is allowed to be attached, a destination the WTRU is allowed to access, a priority associated with requests sent by the WTRU, or bearer parameters for the WTRU.

7. The method of claim 1, wherein the service response is received in a detach message.

8. The method of claim 1, further comprising authenticating with the MNO based on the subscription information received in the service response.

9. The method of claim 1, wherein the WTRU is a light WTRU.

10. The method of claim 9, further comprising communicating with a cloud WTRU, wherein the cloud WTRU performs a processor or memory intense function.

11. The method of claim 10, wherein the processor or memory intense function comprises one or more of re-authentications, or temporarily storing videos.

12. The method of claim 1, wherein the service request comprises a global access point name (APN).

13. The method of claim 12, wherein the global APN comprises one or more of a network identifier, a virtual network (VN) identifier, or an operator identifier.

14. The method of claim 3, wherein the attach request comprises an indication to support dynamic virtual network (VN) extension.

15. The method of claim 1, further comprising selecting a virtual network (VN) and indicating the selected VN in a PreAttach message.

16. The method of claim 15, wherein the PreAttach message comprises one or more of a VN capability, or a VN identifier.

17. The method of claim 1, wherein the service request comprises an access specific information of a virtual network (VN).

18. The method of claim 17, wherein the access specific information comprises one or more of a virtual network identifier (VN-ID), a virtual network indicator (VN-indicator), a virtual network permission number (VN-permission-number), one or more security-credentials, a virtual network privilege or priority number (VN-privilege/priority-number), an access location information (access-location-info), one or more of available access network nodes (available-access-network-nodes), a service identifier (service-ID), an application identifier (App-ID), a desired QoS level, or a price.

19. A wireless transmit receive unit (WTRU) comprising:
a processor configured to:
receive a system information (SI) broadcast from a radio access network (RAN) node, the SI broadcast indicating that an operator of the RAN node supports service-based network access, wherein the service-based network access is RAN operator agnostic;

send, via the RAN node, one or more of a service request to a virtual service provider to request the service, a validation method, or a payment method, wherein, the service request comprises one or more of a service type, a service duration, or a quality of service (QoS);

receive a service response from the virtual service provider, the service response indicating a mobile network operator (MNO) to use for obtaining the service and subscription information for accessing the MNO, wherein the MNO is different than the operator of the RAN node;

establish a first network connection using a first radio access technology;

utilize the first network connection to communicate with a server virtualizing resources for a second radio access technology utilized by the WTRU; and access the MNO to obtain the service.

20. The WTRU of claim 19, wherein the WTRU lacks a subscription with either the operator of the RAN node or the MNO.

21. The WTRU of claim 19, wherein the service request is sent as part of an attach request.

22. The WTRU of claim 21, wherein the attach request is of access cloud service type.

23. The WTRU of claim 21, wherein the WTRU attaches to the RAN node in a limited state in order to determine an operator network to use for accessing the service.

24. The WTRU of claim 23, wherein the limited state limits at least one of an amount of time the WTRU is allowed to be attached, a destination the WTRU is allowed to access, a priority associated with requests sent by the WTRU, or bearer parameters for the WTRU.

25. The WTRU of claim 19, wherein the service response is received in a detach message.

26. The WTRU of claim 19, further comprising authenticating with the MNO based on the subscription information received in the service response.

27. The WTRU of claim 19, wherein the WTRU is a light WTRU.

28. The WTRU of claim 27, wherein the processor is configured to communicate with a cloud WTRU, wherein the cloud WTRU performs a processor or memory intense function.

29. The WTRU of claim 28, wherein the processor or memory intense function comprises one or more of re-authentications, or temporarily storing videos.

30. The WTRU of claim 19, wherein the service request comprises a global access point name (APN).

31. The WTRU of claim 30, wherein the global APN comprises one or more of a network identifier, a virtual network (VN) identifier, or an operator identifier.

32. The WTRU of claim 22, wherein the attach request comprises an indication to support dynamic virtual network (VN) extension.

33. The WTRU of claim 19, wherein the processor is further configured to select a virtual network (VN) and indicate the selected VN in a PreAttach message.

34. The WTRU of claim 33, wherein the PreAttach message comprises one or more of a VN capability, or a VN identifier.

35. The WTRU of claim 19, wherein the service request comprises an access specific information of a virtual network (VN).

36. The WTRU of claim 35, wherein the access specific information comprises one or more of a virtual network identifier (VN-ID), a virtual network indicator (VN-indicator), a virtual network permission number (VN-permission-number), one or more security-credentials, a virtual network privilege or priority number (VN-privilege/priority-number), an access location information (access-location-info), one or more of available access network nodes (available-access-network-nodes), a service identifier (service-ID), an application identifier (App-ID), a desired QoS level, or a price.

* * * * *

UNITED STATES PATENT AND TRADEMARK OFFICE
CERTIFICATE OF CORRECTION

PATENT NO. : 9,693,366 B2
APPLICATION NO. : 14/039133
DATED : June 27, 2017
INVENTOR(S) : Pascal M. Adjakple et al.

It is certified that error appears in the above-identified patent and that said Letters Patent is hereby corrected as shown below:

On the Title Page

At page 2, item (56) under OTHER PUBLICATIONS, "3rd Generation Partnership Project (3GPP), Tr 22.852 V0.3.0" should be --3rd Generation Partnership Project (3GPP), TR 22.852 V0.3.0--.

In the Claims

In Claim 1, at Column 83, Line 9, "type;" should be --type,--.

Signed and Sealed this
Twentieth Day of November, 2018

Andrei Iancu
*Director of the United States Patent and Trademark Office*